(12) United States Patent
Nishimura et al.

(10) Patent No.: US 6,704,085 B2
(45) Date of Patent: Mar. 9, 2004

(54) LIQUID CRYSTAL DISPLAY APPARATUS HAVING SUPERIMPOSED PORTION OF COMMON SIGNAL ELECTRODE, DATA SIGNAL WIRING AND SCANNING WIRING VIA INSULATOR

(75) Inventors: Etsuko Nishimura, Hitachiota (JP); Makoto Abe, Hitachi (JP); Masatoshi Wakagi, Hitachi (JP); Ken-ichi Onisawa, Hitachinaka (JP); Kenji Okishiro, Hitachi (JP); Yoshiaki Nakayoshi, Oamishirasato (JP); Masahiro Ishii, Mobara (JP); Junji Tanno, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/943,141

(22) Filed: Aug. 31, 2001

(65) Prior Publication Data

US 2002/0149729 A1 Oct. 17, 2002

(30) Foreign Application Priority Data

Feb. 28, 2001 (JP) ........................................ 2001-055365

(51) Int. Cl.⁷ ............................................. G02F 1/1343
(52) U.S. Cl. ........................ 349/141; 349/138; 349/139
(58) Field of Search .......................... 349/84, 138, 139, 349/141

(56) References Cited

U.S. PATENT DOCUMENTS

| | | | | |
|---|---|---|---|---|
| 6,341,004 B1 * | 1/2002 | Kondo et al. | ................ | 349/141 |
| 6,384,888 B2 * | 5/2002 | Komatsu | ..................... | 349/141 |
| 6,404,474 B1 * | 6/2002 | Watanabe et al. | ........... | 349/141 |
| 6,417,906 B2 * | 7/2002 | Ohta et al. | ................... | 349/141 |
| 2002/0039162 A1 * | 4/2002 | Ohe et al. | .................... | 349/141 |

\* cited by examiner

Primary Examiner—Tarifur R. Chowdhury
(74) Attorney, Agent, or Firm—Antonelli, Terry, Stout & Kraus, LLP

(57) ABSTRACT

A liquid crystal display apparatus which has a large pixel aperture ratio, a high luminance and good yield without causing any signal delay on wiring or increasing any driving voltage. In a structure in which a capacity is formed on a superimposed part of a common signal electrode CE and at least one of a data signal wiring DL and a scanning signal wiring GL via an interlayer insulating film PAS, of insulating films included in the interlayer insulating film PAS, at least a layer OIL1 is selectively formed at least on a part of a region on a pixel electrode PX.

39 Claims, 36 Drawing Sheets

FIG. 36A
FIG. 36A'
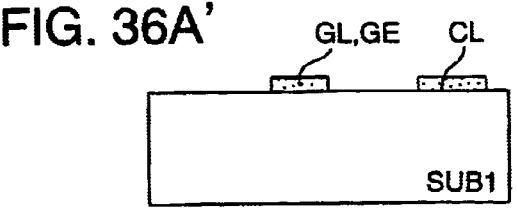
FIG. 36B
FIG. 36B'
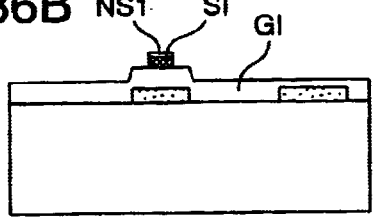
FIG. 36C
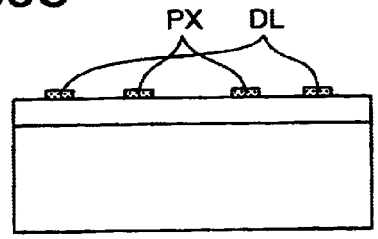
FIG. 36C'
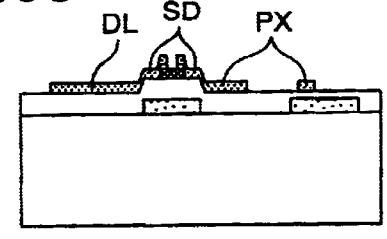
FIG. 36D
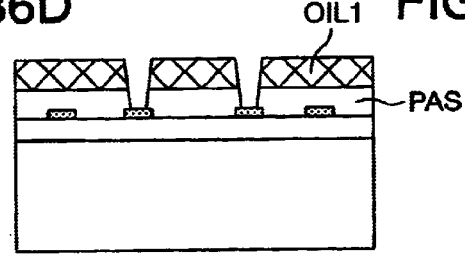
FIG. 36D'
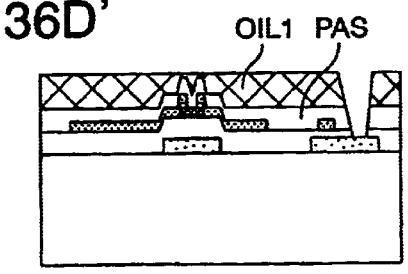
FIG. 36E
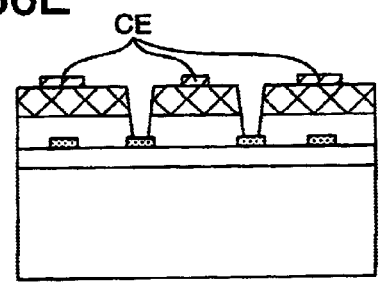
FIG. 36E'
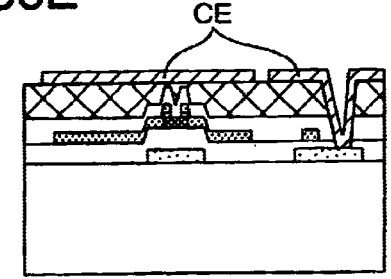

LIQUID CRYSTAL DISPLAY APPARATUS HAVING SUPERIMPOSED PORTION OF COMMON SIGNAL ELECTRODE, DATA SIGNAL WIRING AND SCANNING WIRING VIA INSULATOR

BACKGROUND OF THE INVENTION

The present invention relates to a liquid crystal display apparatus and particularly concerns a liquid crystal display apparatus using an in plane switching method.

An active-matrix liquid crystal display apparatus has been known that has a TFT (TFT: THIN FILM TRANSISTOR) element as a switching element in a display region constituting a pixel.

As for the active-matrix liquid crystal display apparatus, a structure has been adopted in which a liquid crystal layer is inserted between a pair of substrates and is sandwiched therebetween. On one of the substrates (TFT substrate), TFT elements, pixel electrodes, electrodes and wiring for a scanning signal and a data signal, and terminals connecting the wiring and an external driving circuit are formed. On the other substrate (CF substrate), a color filter and opposing electrodes are formed. A twist nematic display method has been adopted in which a longitudinal electric field is applied to provide display. The longitudinal electric field is substantially perpendicular to a substrate surface.

Meanwhile, JP-A-6-160878 specification discloses a liquid crystal display apparatus using an in plain switching method as a method for improving a viewing angle and contrast that have been problems of a liquid crystal display apparatus. In this method, a common signal electrode is disposed on a TFT substrate instead of an opposing electrode disposed on a color filter substrate, and a voltage is applied between a comb-shaped pixel electrode and the common signal electrode. Thus, electric field components, which are substantially in parallel with a surface of the substrate, are used for providing display.

The pixel electrode and the common signal electrode may be made of a metallic electrode wiring material. Further, as disclosed in JP-A-9-73101 specification, the electrodes may be made of ITO (INDIUM TIN OXIDE), which is used as a transparent pixel electrode in a twist nematic display method.

In the above liquid crystal display apparatus using an in plain switching method, a leaked electric field that is unnecessary for its display occurs between signal wiring and the pixel electrode or the common signal electrode, the signal wiring being adjacent to the pixel electrode or the common signal electrode, as well as between the pixel electrode and the common signal electrode.

The signal wiring being adjacent to the electrodes includes scanning signal wiring, which is extended in x direction and is disposed in parallel in y direction, and data signal wiring, which is extended in y direction and is disposed in parallel in x direction.

It has been known that cross talk resulted from a leaked electric field drives liquid crystal thereon and causes leakage of light. Such leakage of light results in a defect in picture quality (smear) that is a line appearing along the signal wiring.

A means for solving the above problem is specifically disclosed in, for example, JP-A-6-202127 specification.

However, the liquid crystal display apparatus is configured such that a shield electrode for shielding an electric field is disposed next to the signal wiring and a reference potential is supplied to the shield electrode from the outside. Hence, a large current is charged and discharged to a capacity between the shield electrode and a signal electrode, thereby overloading a driving circuit.

Therefore, the liquid crystal display apparatus is large in power consumption or the driving circuit is too large in size. Further, connecting means is necessary for applying a potential to the shield electrode, resulting in a larger number of steps and a connecting defect.

Moreover, the above method is seriously disadvantageous as follows: an opening area on a pixel that contributes to display is reduced by the placement of the shield electrode, resulting in lower luminance of the liquid crystal display apparatus.

Means for solving the above problem is specifically disclosed in Japanese Patent Application No. 10-543713 (WO98/47044) specification.

A structure is adopted in which corresponding to image signal wiring which is adjacent to and in parallel with a comb-shaped pixel electrode, a reference electrode is formed while being completely superimposed on a plane via an organic insulating film formed entirely on a substrate. Thus, unnecessary electric lines of force that are generated from the data signal wiring are mostly terminated on the reference electrode.

Therefore, it is possible to solve the problem of cross talk that is caused by electric field leakage peculiar to an in plane switching method.

According to the above method, it is possible to eliminate the necessity for a shield electrode, which has been conventionally disposed on both sides of the data signal wiring or on an opposing substrate to reduce cross talk. Hence, the opening area on a pixel can be increased.

The liquid crystal layer on the reference electrode acts as a self-shielding layer and it is possible to eliminate a light shield film (black matrix), which has been conventionally disposed to cover a gap between the data signal wiring and the shield electrode. Hence, an aperture ratio of a pixel can be further increased.

Also, an organic insulating film, which is provided as an interlayer film entirely on the substrate, is small in permittivity as compared with an inorganic insulating film, and the organic insulating film can be readily increased in thickness as compared with the inorganic insulating film. Thus, even in the case where the data signal wiring is entirely covered with the reference electrode, it is possible to reduce a parasitic capacity of the wiring formed between the data signal wiring and the reference electrode.

Therefore, since a load is lighter with respect to the data signal wiring, a data signal has smaller delay in transmission through wiring and a signal voltage can be sufficiently charged to a display electrode.

Consequently, it is possible to downsize the driving circuit for driving the data signal wiring.

However, the above-mentioned conventional art has another problem as follows. As described above, when a voltage is applied to liquid crystal to provide display, a potential difference applied between the pixel electrode and the common signal electrode is used.

According to the above conventional art, the common signal electrode serving as a reference electrode is formed on the top layer via the organic insulating film, which is entirely formed on the substrate, to reduce a capacity between the data signal wiring and the common signal electrode. The pixel electrode is disposed on a lower layer, so that the organic insulating film is disposed on the pixel electrode.

Therefore, between the pixel electrode and the common signal electrode, the organic insulating film forms another capacity connected in series with liquid crystal.

Hence, a potential difference applied between the pixel electrode and the common signal electrode is partially reduced by the capacity connected in series with the liquid crystal layer.

As a result, between the pixel electrode and the common signal electrode, in consideration of the voltage drop, it is necessary to apply a potential difference at or more than a desired voltage to be applied to liquid crystal.

Namely, another problem arises as follows: a capacity component connected in series with the liquid crystal layer is reduced due to the presence of the organic insulating film, which is formed to decrease a capacity between the data signal wiring and the common signal electrode, resulting in larger voltage drop caused by a capacity connected in series with liquid crystal. Consequently, liquid crystal requires a larger driving voltage.

An increase in driving voltage raises power consumption, which is inappropriate particularly for a portable liquid crystal display apparatus.

Further, when a driving voltage increases, an inexpensive low-voltage driver is not applicable. Hence, it is not possible to provide a liquid crystal display apparatus at low cost.

According to the above conventional art, in the liquid crystal display apparatus using an in plain switching method, the common signal electrode serving as a reference electrode for shielding an electric field is superimposed on the signal wiring via the interlayer insulating film. In this structure, it is difficult to reduce a parasitic capacity formed on a superimposed part of the signal wiring and the common signal electrode and simultaneously to increase a capacity connected in series with liquid crystal between the pixel electrode and the common signal electrode.

In contrast, when the pixel electrode is disposed on the organic insulating film, that is, on the top layer where the common signal electrode is disposed, it is possible to avoid the above-mentioned increase in driving voltage (Japanese Patent Application No. 10-543713 (WO98/47044) specification).

However, since the pixel electrode and the common signal electrode are disposed on the same layer, a short circuit is more likely to occur due to a patterning defect and so on between the pixel electrode and the common signal electrode.

Accordingly, a large space is required between the pixel electrode and the common signal electrode, resulting in a limit on the alignment of the pixel electrode and the common signal electrode.

Besides, in order to connect the pixel electrode and the source electrode of the TFT, it is necessary to form another through hole on the organic insulating film. Hence, a point defect is more likely to occur due to a connecting defect and so on. Also, since the through hole does not act as an opening, an aperture ratio decreases accordingly.

SUMMARY OF THE INVENTION

An object of the present invention is to provide an in plain switching liquid crystal display apparatus, in which a common signal electrode serving as a reference electrode for shielding an electric field is superimposed on at least one of data signal wiring and scanning signal wiring via an interlayer insulating film, characterized in that it is possible to reduce a parasitic capacity of signal wiring formed on a superimposed part of the data signal wiring or the scanning signal wiring and the common signal electrode and to increase a capacity connected in series with liquid crystal between a pixel electrode and a common signal electrode.

In order to attain the above object, the present invention is characterized by providing the following measures for a liquid crystal display apparatus, which includes a pair of substrates and a liquid crystal layer sandwiched between the substrates, the pair of substrates including a first substrate having a plurality of scanning signal wiring, a plurality of data signal wiring intersecting the scanning signal wiring in a matrix form, and a plurality of thin-film transistors formed on the intersections, wherein at least a single pixel is formed in each region surrounded by the plurality of scanning signal wiring and data signal wiring, each pixel includes a common signal electrode, which is connected to a plurality of pixels via common signal wiring, and a pixel electrode connected to the corresponding thin-film transistor, and a voltage applied to the common signal electrode and the pixel electrode generates in the liquid crystal layer an electric field having a parallel component predominantly to the first substrate.

(1) The common signal electrode and at least one of the data signal wiring and the scanning signal wiring are partially superimposed onto each other via an interlayer insulating film, and the superimposed part forms a capacity. At least one of insulating films included in the interlayer insulating film is selectively formed at least on a part of a region on the pixel electrode and at least in the superimposed part of the common signal electrode and at least one of the data signal wiring and the scanning wiring.

(2) The common signal electrode and at least one of the data signal wiring and the scanning signal wiring are partially superimposed onto each other via an interlayer insulating film. The superimposed part selectively forms a capacity. When SA denotes Equation 9 and SB denotes Equation 10 (m≧1), SA<SB is satisfied, where n indicates the number of layers of the insulating films included in the interlayer insulating film, $\epsilon_K$ indicates a permittivity of an insulating film on k layer, $d_K$ indicates a film thickness, m indicates the number of layers of insulating films disposed between the pixel electrode and a first alignment film disposed on the pixel electrode on at least a part of a region on the pixel electrode, $\epsilon_L$ indicates a permittivity of an insulating film of L layer, $d_L$ indicates a film thickness, and $\epsilon_{LC}$ indicates a permittivity of liquid crystal in a perpendicular direction to a director of liquid crystal.

$$\frac{1}{\sum_{k=1}^{n} \frac{d_k}{\varepsilon_k}} \tag{9}$$

$$\frac{1}{\left(\sum_{L=1}^{m} \frac{d_L}{\varepsilon_L}\right) + \frac{\sum_{k=1}^{n} d_k - \sum_{L=1}^{m} d_L}{\varepsilon_{LC}}} \tag{10}$$

(3) The common signal electrode and at least one of the data signal wiring and the scanning signal wiring are partially superimposed onto each other via an interlayer insulating film. The superimposed part forms a capacity. When SA denotes Equation 11 and SB denotes Equation 12 (m≧1), SA<SB is satisfied, where n indicates the number of layers of the insulating films included in the interlayer insulating film, $\epsilon_K$ indicates a permittivity of an insulating film on k layer, $d_K$ indicates a film thickness, m indicates the number of layers of insulating films disposed on the pixel electrode at least in a part of a region on the pixel electrode, $\epsilon_L$ indicates a permittivity of an insulating film on L layer, $d_L$ indicates a film thickness, and $\epsilon_{LC}$ indicates a permittivity of liquid crystal in parallel with a director of liquid crystal.

$$\frac{1}{\sum_{k=1}^{n} \frac{d_k}{\epsilon_k}} \quad (11)$$

$$\frac{1}{\left(\sum_{L=1}^{m} \frac{d_L}{\epsilon_L}\right) + \frac{\sum_{k=1}^{n} d_k - \sum_{L=1}^{m} d_L}{\epsilon_{LC}}} \quad (12)$$

(4) The common signal electrode and at least one of the data signal wiring and the scanning signal wiring are partially superimposed onto each other via an interlayer insulating film. The superimposed part forms a capacity. No insulating film exists between the first alignment film and the pixel electrode which are disposed on the first substrate. When SA denotes Equation 13 and SB denotes Equation 14, SA<SB is satisfied, where n indicates the number of layers of the insulating films included in the interlayer insulating film, $\epsilon_K$ indicates a permittivity of an insulating film on k layer, $d_K$ indicates a film thickness, and $\epsilon_{LC}$ indicates a permittivity in a perpendicular direction to a director of liquid crystal.

$$\frac{1}{\sum_{k=1}^{n} \frac{d_k}{\epsilon_k}} \quad (13)$$

$$\frac{\epsilon_{LC}}{\sum_{k=1}^{n} d_k} \quad (14)$$

(5) The common signal electrode and at least one of the data signal wiring and the scanning signal wiring are partially superimposed onto each other via an interlayer insulating film. The superimposed part forms a capacity. No insulating film exists between the first alignment film and the pixel electrode which are disposed on the first substrate. When SA denotes Equation 15 and SB denotes Equation 16, SA<SB is satisfied, where n indicates the number of layers of the insulating films included in the interlayer insulating film, $\epsilon_k$ indicates a permittivity of an insulating film on k layer, $d_K$ indicates a film thickness, and $\epsilon_{LC}$ indicates a permittivity in parallel with a director of liquid crystal.

$$\frac{1}{\sum_{k=1}^{n} \frac{d_k}{\epsilon_k}} \quad (15)$$

$$\frac{\epsilon_{LC}}{\sum_{k=1}^{n} d_k} \quad (16)$$

With the structures (1) to (5), even when reducing a parasitic capacity of signal wiring that is formed on a superimposed part of the data signal wiring or the scanning signal wiring and the common signal electrode, it is possible to independently increase a capacity connected in series with liquid crystal between the pixel electrode and the common signal electrode, thereby suppressing an increase in driving voltage.

To be specific, as described in (1), the interlayer insulating film formed on a superimposed part of the wiring and the common signal electrode, that is, the interlayer insulating film formed for reducing a parasitic capacity of wiring is not formed on the pixel electrode. Namely, the insulating film is formed selectively. Thus, it is possible to arbitrarily reduce a parasitic capacity of wiring separately from a capacity connected in series with a liquid crystal layer by increasing a thickness of the interlayer insulating film or changing the structure of the interlayer insulating film.

As described in (1) to (5), regarding a reduction in driving voltage, the insulating film on a region having the pixel electrode, that is, the insulating film forming a capacity connected in series with the liquid crystal layer is removed selectively.

Thus, liquid crystal exists on a selectively removed region. In order to obtain the effect of reducing a driving voltage, value obtained from Equation 18 needs to be larger than that Equation 17, where j indicates the number of layers of insulating films included in a selectively removed insulating film, $\epsilon_I$ indicates a permittivity of an insulating film on i layer, $d_I$ indicates a film thickness, and $\epsilon_{LC}$ indicates a permittivity of liquid crystal.

Here, $\epsilon_{LC}$ is a permittivity in parallel with a director of liquid crystal when $\Delta\epsilon$ is positive liquid crystal, and $\epsilon_{LC}$ is a permittivity in a perpendicular direction to a director of liquid crystal when $\Delta\epsilon$ is negative liquid crystal. Namely, a permittivity is obtained from the lower substrate to the upper substrate when a voltage is applied to the liquid crystal layer.

$$\frac{1}{\sum_{i=1}^{j} \frac{d_i}{\epsilon_i}} \quad (17)$$

$$\frac{\epsilon_{LC}}{\sum_{i=1}^{j} d_i} \quad (18)$$

The effect of reducing a driving voltage can be obtained only when the above equations are satisfied. Since $\epsilon_{LC}$ is 7 or more in a liquid crystal layer of a conventional liquid crystal display apparatus, considering the selectively formed insulating film is made of a material such as silicon nitride ($\epsilon$=6 to 7) and silicon oxide ($\epsilon$=3 to 4), in most cases, the selective removal of the insulating film makes it possible to increase a capacity connected in series with liquid crystal between the pixel electrode and the common signal electrode, thereby reducing a driving voltage.

Further, as a combination of the above methods, to be specific, the interlayer insulating film formed on a superimposed part of the wiring and the common signal electrode is configured as a lamination including a part of an insulating film serving as a gate insulating film, a part of an insulating film serving as a surface protecting film of the thin-film transistor, and another new insulating film. The new insulating film is formed selectively in a region on the pixel electrode. Moreover, an insulating film used in the conventional structure is formed selectively in a region on the pixel electrode and is formed selectively in the same region as the new insulating film.

Next, the following will discuss more specific structures for realizing the above structure.

(6) In the liquid crystal display apparatus described in any one of (1) to (5), regarding the interlayer insulating film and the insulating film disposed between the first alignment film and the pixel electrode that are formed on the first substrate at least on a part of a region on the pixel electrode, a difference is made at least in one of the number of layers of the insulating films, a film thickness of a material for forming the layer, and a permittivity of a material for forming the layer.

(7) In the liquid crystal display apparatus described in any one of (1) to (6), the interlayer insulating film is composed of a single layer and the single layer is selectively formed at least on a part of a region on the pixel electrode.

(8) In the liquid crystal display apparatus described in (7), the interlayer insulating film is a part of a first insulating film serving as the gate insulating film of the thin-film transistor or a part of a second insulating film serving as a surface protecting film of the thin-film transistor.

(9) In the liquid crystal display apparatus described in (7), the interlayer insulating film is a third insulating film other than the first insulating film serving as the gate insulating film of the thin-film transistor or the second insulating film serving as a surface protecting film of the thin-film transistor.

(10) In the liquid crystal display apparatus described in any one of (1) to (6), the interlayer insulating film is composed of two layers, and at least one of the layers is selectively formed at least on a part of a region on the pixel electrode.

(11) In the liquid crystal display apparatus described in (10), the interlayer insulating film is composed of two layers including a part of the first insulating film serving as the gate insulating film of the thin-film transistor or a part of the second insulating film serving as a surface protecting film of the thin-film transistor.

(12) In the liquid crystal display apparatus described in (10), in the interlayer insulating film, one of the layers is a part of the first insulating film serving as the gate insulating film of the thin-film transistor or a part of the second insulating film serving as a surface protecting film of the thin-film transistor, and the other layer is a third insulating film other than the first insulating film and the second insulating film. The third insulating film is selectively formed at least on a part of a region on the pixel electrode.

(13) In the liquid crystal display apparatus described in any one of (1) to (6), the interlayer insulating film is composed of three or more layers. At least one of them is selectively formed at least on a part of a region on the pixel electrode.

(14) In the liquid crystal display apparatus described in (13), the interlayer insulating film includes all of a part of the first insulating film serving as the gate insulating film of the thin-film transistor, a part of the second insulating film serving as a surface protecting film of the thin-film transistor, and the third insulating film other than the first insulating film and the second insulating film. The third insulating film is selectively formed at least on a part of a region on the pixel electrode.

(15) In the liquid crystal display apparatus described in any one of (1) to (14), at least on a part of a region on the pixel electrode, the pattern of the interlayer insulating film, which is formed selectively on a superimposed part of the common signal electrode and at least one of the data signal wiring or the scanning signal wiring, is formed according to the pattern of the data signal wiring or the scanning signal wiring.

(16) In the liquid crystal display apparatus described in (15), when a width of the data signal wiring is WDL, a width of the common signal electrode formed on a part superimposed with the data signal wiring is WCOM1, and a width of the interlayer insulating film selectively formed according to the pattern of the data signal wiring is WIS01, WDL<WIS01<WCOM1 and WDL>0 or WDL<WCOM1<WIS01 and WDL>0 are established.

(17) In the liquid crystal display apparatus described in (15), when a width of the scanning signal wiring is WGL, a width of the common signal electrode formed on a part superimposed with the scanning signal wiring is WCOM2, and a width of the interlayer insulating film selectively formed according to the pattern of the scanning signal wiring is WIS02, WGL<WIS02<WCOM2 and WGL>0 or WGL<WCOM2<WIS02 and WGL>0 are established.

(18) In the liquid crystal display apparatus described in any one of (1) to (14), on the interlayer insulating film formed on a superimposed part of the common signal electrode and the data signal wiring, at least a part of the insulating film, which is formed at least on a part of a region on the pixel electrode, is selectively removed or reduced in thickness.

(19) In the liquid crystal display apparatus described in (18), at least a part of the insulating film, which is formed at least on a part of a region on the pixel electrode, is selectively removed or reduced in thickness according to the pattern of the pixel electrode.

(20) In the liquid crystal display apparatus described in (19), when a width of the pixel electrode is WPX and a width of the interlayer insulating film selectively removed or reduced in thickness according to the pattern of the pixel electrode is WIS03, WIS03<WPX and WIS>0 are established.

(21) In the liquid crystal display apparatus described in any one of (1) to (20), at least in a region other than an exposed region for connecting terminals, a fourth insulating film is formed so as to cover at least the pixel electrode and the common signal electrode.

With this arrangement, coating and protection can be provided on the surfaces of the pixel electrode and the common signal electrode, thereby preventing a side effect such as mutual contamination, which is caused by contact between an electrode material and liquid crystal.

(22) In the liquid crystal display apparatus described in any one of (1) to (7), (9), (10), (12), (13), and (15) to (21), the second insulating film serving as the surface protecting film of the thin-film transistor is omitted.

The third insulating film substitutes for the surface protecting film of the thin-film transistor. Thus, it is possible to omit the step of forming the surface protecting film of the thin-film transistor, thereby simplifying the manufacturing process.

(23) In the liquid crystal display apparatus described in any one of (7), (9), (10), (12), to (22), the third insulating film and the fourth insulating film are coating type insulating films.

(24) In the liquid crystal display apparatus described in (23), the coating type insulating film is formed by a method such as printing and spin coating method, and the coating type insulating film is an organic resin insulating film or an insulating film containing Si.

(25) In the liquid crystal display apparatus described in (23) or (24), the coating type insulating film used as the third insulating film is a photo-image type.

(26) In the liquid crystal display apparatus described in any one of (10), and (12) to (25), the first insulating film serving as the gate insulating film of the thin-film transistor, the second insulating film serving as the surface protecting film of the thin-film transistor, or a laminated film of the first insulating film and the second insulating film is collectively processed in a self-aligning manner by using the third insulating film pattern as described above. At least on a part of a region on the pixel electrode, the first insulating film, the second insulating film, or the laminated film of the first and second insulating films is formed selectively.

(27) In the liquid crystal display apparatus described any one of (7), (9), (10), and (12) to (26), the third insulating film has a thickness of 0.5 to 4.0 µm.

(28) In the liquid crystal display apparatus described any one of (7), (9), (10), and (12) to (27), the third insulating film has a permittivity of 1.5 to 6.5.

(29) In the liquid crystal display apparatus described in (21), the coating type insulating film used as the fourth insulating film has a thickness of 0.1 to 0.5 µm.

(30) In the liquid crystal display apparatus described in any one of (1) to (17) and (21) to (29), a fifth insulating film is selectively formed with a permittivity of 7.0 or more so as to fill and flatten a step height region appearing due to the interlayer insulating film which is formed selectively.

(31) In the liquid crystal display apparatus described in any one of (18), (19), and (20), the fifth insulating film is selectively formed with a permittivity of 7.0 or more so as to fill and flatten a step height region, which is formed by selectively removing or reducing in thickness at least a part of an insulating film formed at least on a part of a region on the pixel electrode.

With the structures of (30) and (31), it is possible to reduce a driving voltage regardless of a permittivity of the liquid crystal layer.

Further, it is possible to fill and flatten a step height formed by selective formation or selective removal of the insulating film.

(32) In the liquid crystal display apparatus described in any one of (1) to (31), the common signal wiring is formed by extending the common signal electrode on the same layer as the common signal electrode.

(33) In the liquid crystal display apparatus described in any one of (1) to (32), the common signal wiring is formed on the same layer as the scanning signal wiring or the data signal wiring, and the common signal wiring and the common signal electrode are connected to each other via a through hole, which is opened on the interlayer insulating film.

(34) In the liquid crystal display apparatus described in any one of (1) to (33), the pixel electrode is composed of a transparent conductive film made of indium oxide such as indium tin oxide (ITO), indium zinc oxide (IZO), and indium germanium oxide (IGO).

(35) In the liquid crystal display apparatus described in (34), the pixel electrode is composed of a transparent conductive film made of polycrystalline indium oxide.

(36) In the liquid crystal display apparatus described in any one of (1) to (35), at least a part of the common signal electrode is composed of a transparent conductive film made of indium oxide such as indium tin oxide (ITO), indium zinc oxide (IZO), and indium germanium oxide (IGO).

(37) In the liquid crystal display apparatus described in (36), at least a part of the common signal electrode includes the transparent conductive film made of amorphous indium oxide.

(38) In the liquid crystal display apparatus described in any one of (34) to (37), a normally black mode is set in which black display is provided when no electric field is generated between the pixel electrode and the common signal electrode.

According to the present invention, it is possible to provide a liquid crystal display apparatus of an in plane switching that has a large pixel aperture ratio and a high luminance without causing any signal delay of a wiring or increase of a driving voltage.

BRIEF DESCRIPTION OF THE DRAWINGS

FIGS. 36A, 36B, 36C, 36D, and 36E are section views taken along line A–A' shown in FIG. 22 and FIGS. 36A', 36B', 36C', 36D', and 36E' are section views taken along line B–B' shown in FIG. 22 when the TFT substrate is manufactured according to the process flow of FIG. 35;

DESCRIPTION OF THE EMBODIMENTS

Before describing specific embodiments, referring to FIGS. 1A and 1B and FIGS. 2A, 2B, and 2C, a principle of a liquid crystal display apparatus according to the present invention will be explained.

In the explanation of FIGS. 1A and 1B and FIGS. 2A, 2B, and 2C, the effects of the present invention will be compared with an example of the foregoing conventional art while the example serves as a standard structure.

To be specific, a pixel electrode is formed on a layer where data signal wiring is formed, a silicon nitride film (permittivity $\epsilon$=6.7), which is assumed as a surface protective film of a TFT, is entirely formed thereon as an interlayer insulating film with a thickness of 350 nm, and a common signal electrode is formed on the top layer.

The common signal electrode, which also acts as a shield electrode, is superimposed on the data signal wiring via the interlayer insulating film. This structure corresponds to a structure of x=0 in FIGS. 1A and 2C (described later).

First, referring to FIGS. 1A and 1B, it will be explained that an insulating film for reducing a capacity in the standard structure, which is the conventional structure, is effective to reduce a capacity.

Figure 1A:
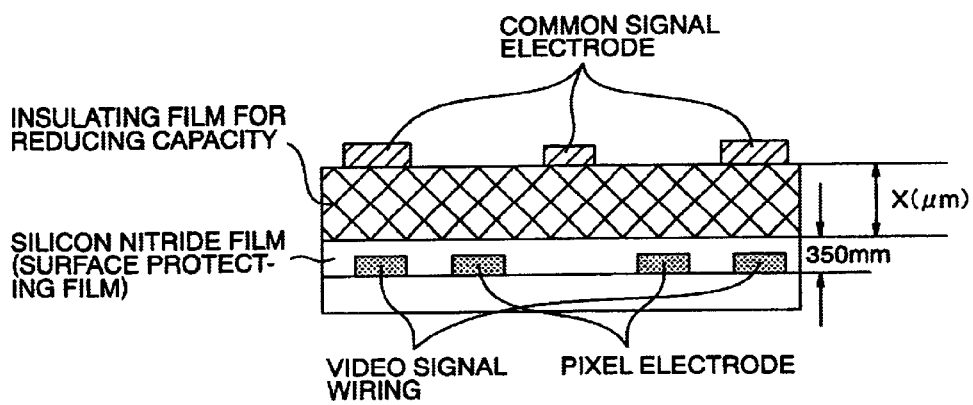
FIGS. 1A and 1B are diagrams showing an effect of reducing a capacity when another insulating film for reducing a capacity is added to a structure of an interlayer insulating film on a superimposed part of wiring.

FIG. 1A is a diagram showing a structure used for examining the effect of the insulating film for reducing a capacity. Here, the insulating film for reducing a capacity is an interlayer insulating film provided in addition to the silicon nitride film having a thickness of 350 nm. The silicon nitride film is an interlayer insulating film in the above standard structure.

Figure 1B:
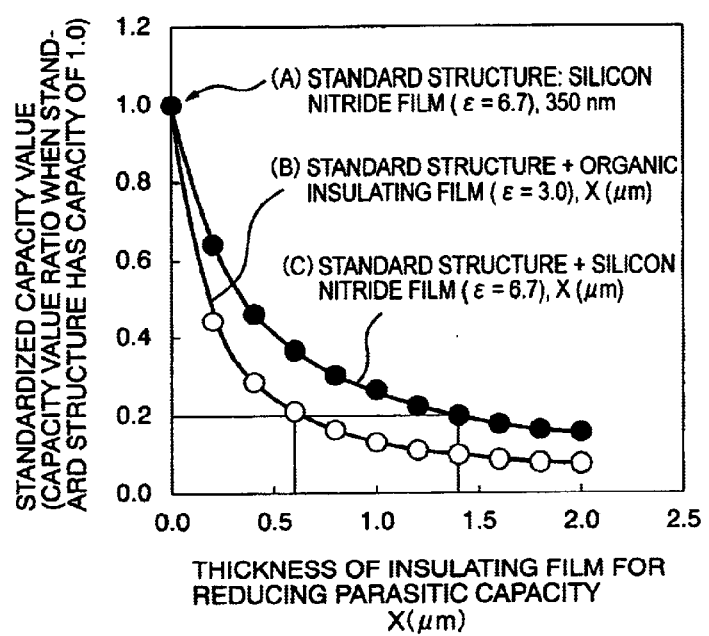

FIG. 1B is a diagram showing a change in standardized capacity value relative to a film thickness x of the insulating film for reducing a capacity. The standardized capacity is defined as a ratio of parasitic capacity values of the structures. With each of the structures varies in film thickness x relative to a parasitic capacity value on a superimposed part of wiring in the standardized structure.

FIG. 1B shows the data obtained in the case (B) where a coating type insulating film ($\epsilon$=3.0) made of an organic material is used and the case (C) where a silicon nitride film ($\epsilon$=6.7) is used as the insulating film for reducing a capacity.

According to FIG. 1B, it is demonstrated that another interlayer insulating film is provided, which may serve as an insulating film for reducing a capacity, reduces a parasitic capacity on a super-imposing part of wiring and delay of a signal although the effect varies with the permitivity $\epsilon$ and the film thickness.

Moreover, in order to reduce a parasitic capacity value to one fifth, namely, in order to set a standardized capacity value at 0.2 in the standard structure, a coating type organic insulating film of $\epsilon$=3.0 and a silicon nitride film of $\epsilon$=6.7 require film thickness of 0.6 $\mu$m and 1.4 $\mu$m, respectively, as for the insulating film for reducing a capacity. In the case of the organic insulating film having a smaller permittivity $\epsilon$, a parasitic capacity can be reduced with a smaller thickness.

Meanwhile, in the case of the silicon nitride film of the structure (C), when a deposited film is used as the insulating film for reducing a capacity, a method such as plasma CVD is applicable to formation of the silicon nitride film. Hence, another problem arises as follows: as a film thickness is larger, a longer time is necessary for forming a film, thereby lowering a throughput.

Figure 2A:
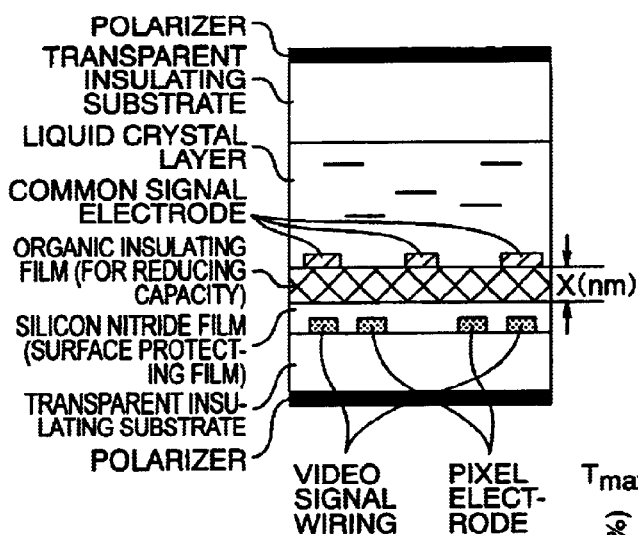
FIGS. 2A, 2B, and 2C are diagrams showing an effect of reducing a driving voltage when a structure of an insulating film is changed which is disposed on a pixel electrode.
Figure 2B:
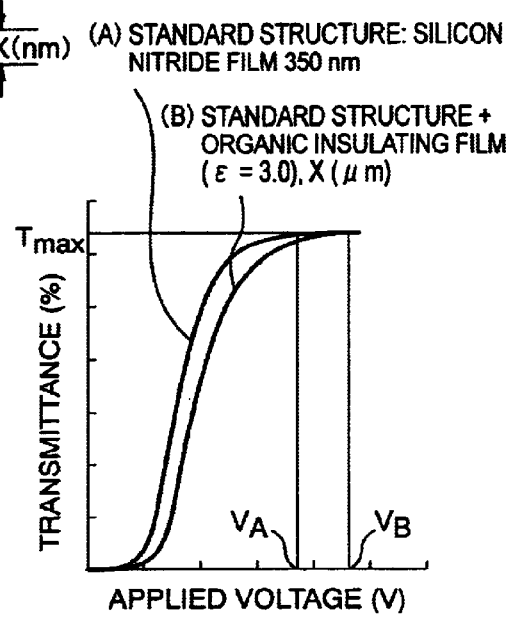

In contrast, in the case where the coating type organic insulating film of FIG. 2B is used, a method such as a spin coating method is used for forming a coating type insulating film.

The spin coating method is advantageous in that since a viscosity of a coating type material is adjusted to control a film thickness, unlike the depositing CVD method, a throughput hardly changes relative to a film thickness.

Further, when a coating type insulating film is formed, it is possible to fill a pin hole, a crack, and a poor adhesion part on a lower step height of the lower silicon nitride film and to correct the defects by a coating effect. Hence, when processing a common signal electrode on the top layer as well, it is possible to considerably suppress the corrosion, dissolution, and a break on the electrodes and wiring disposed on a lower layer, thereby largely improving a yield of the processing.

Because of the effect of coating a defect on the silicon nitride, it is possible to reduce a short circuit caused by an insulating defect on a super-imposed part of wiring between layers.

According to the above description, as a method for reducing a parasitic capacity, i.e., reducing signal delay of wiring, it is more preferable to use a coating type insulating film as the insulating film for reducing capacity. The coating type insulating film has a small permittivity and lowers a parasitic capacity with a small thickness, and a throughput thereof does not change with film thickness.

The effect of reducing a parasitic capacity depends upon an insulating film disposed on a region where the data signal wiring and the common signal electrode are superimposed on each other, that is, the structure of the insulating film on a region for forming a parasitic capacity, which is connected in parallel with a liquid crystal layer (a type (permittivity) and a thickness of the insulating film-for reducing a capacity in the present verification) when the liquid crystal display apparatus is formed.

Meanwhile, the effect of reducing a parasitic capacity hardly depends on an insulating film on a pixel electrode, i.e., the structure of the insulating film on a region for forming a capacity connected in series with the liquid crystal layer (a type and a thickness of the insulating film for reducing a capacity in the present verification) when the liquid crystal display apparatus is formed.

Due to the effect of the common signal electrode which is disposed so as to cover the data signal wiring, an electric field generated by the data signal wiring is effectively shielded. Thus, it is possible to prevent cross talk between wiring and the adjacent pixel electrode and to prevent degradation in picture quality that is caused by leakage of light from liquid crystal.

Next, referring to FIGS. 2A, 2B, and 2C, the effect of reducing a driving voltage of liquid crystal when the structure of the insulating film is changed will be explained, in contrast to the conventional standard structure.

FIG. 2A is a diagram showing the structure used for verifying the effect of reducing a driving voltage. In FIG. 2A, when a voltage is applied between the pixel electrode and the common signal electrode, the liquid crystal layer exhibits different optical characteristics according to an applied voltage, in a transmittance change.

FIG. 2B is a diagram showing an example of a change in transmittance when a voltage is applied between the pixel electrode and the common signal electrode.

In the present embodiment, since a normally black mode is used as a display mode of liquid crystal, a transmittance is set substantially at 0 when an applied voltage is 0 V, and a transmittance gradually rises with an increase in the applied voltage. A transmittance reaches a peak TMAX at a fixed voltage value such as a voltage value VA in the structure (A) and at a voltage value VB in the structure (B).

In the liquid crystal display apparatus, liquid crystal is driven between 0 V and a voltage giving a transmittance peak TMAX. Thus, it is possible to reduce a driving voltage of liquid crystal by lowering a voltage of the transmittance peak TMAX.

The structures (A) and (B) are different from each other in the structure of the insulating film disposed on the pixel electrode. The structure (A) is a standard structure in which a silicon nitride film of $\epsilon=6.7$ is disposed with a thickness of 350 nm, and the structure (B) has a coating type organic insulating film of $\epsilon=3.0$ with a thickness of 0.6 $\mu$m is stacked on the standard structure.

When applied voltages/transmittance characteristics are compared between the two structures, it is found that the structures are substantially equal in peak value of transmittance, but the voltage of the peak transmittance Tn, the structure (B) is about 1.2 times larger than the structure (A).

This phenomenon is resulted from a difference in the structure of the insulating film disposed on the pixel electrode, that is, the structure of the insulating film for forming a capacity connected in series with the liquid crystal layer.

The structure (B) having the organic insulating film stacked therein is smaller in capacity. Thus, a large voltage drop occurs and a voltage is applied to liquid crystal insufficiently due to the voltage drop.

A driving voltage value (voltage value providing a peak transmittance value) of the liquid crystal hardly depends upon the structure of the interlayer insulating film on a superimposed part of wiring as shown in FIGS. 1A and 1B, that is, the structure of the insulating film on a region where a parasitic capacity of signal wiring is formed (corresponding to a type (permittivity) and a thickness of the insulating film in the present verification).

Figure 2C:
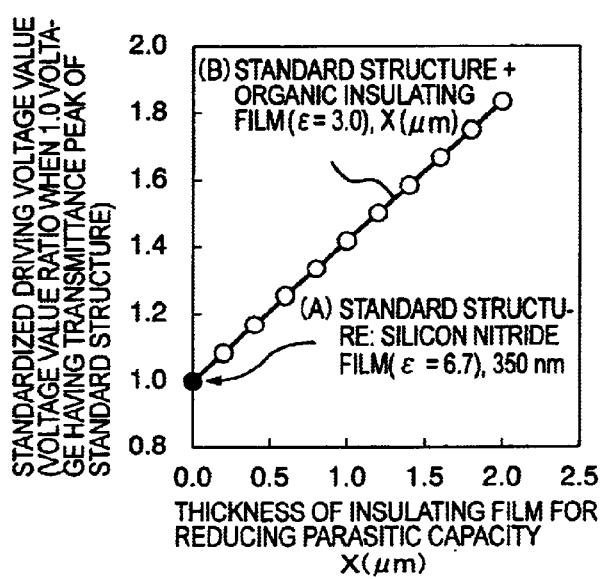

FIG. 2C shows a change in standardized voltage value relative to a film thickness x of the organic insulating film when the coating type organic insulating film for reducing a capacity is disposed on the pixel electrode in the standard structure. Here, the standardized voltage is defined as a ratio of a voltage value giving a peak transmittance obtained in structure varying in film thickness x, relative to the voltage value obtained in the standardized structure.

As the organic insulating film is larger in thickness, a capacity connected in series with the liquid crystal layer is smaller. Thus, a voltage drop increases and a standardized driving voltage value of the liquid crystal rises linearly.

Namely, regarding a driving voltage of liquid crystal, it is preferable that the insulating film disposed on the pixel electrode has a minimum thickness. As a measure for reducing a driving voltage, it is more preferable that no insulating film exists on the pixel electrode.

FIGS. 2A, 2B, and 2C is explained in the organic insulating film having a permittivity of 3.0 as an example of the insulating film disposed on the pixel electrode. For example, in the case of an insulating film having a permittivity smaller than 3.0, it is presumed that the line of FIG. 2C has larger inclination, thereby further increasing a driving voltage.

In contrast, in the case of an insulating film having a permittivity larger than 3.0, it is readily expected that the line has gradual inclination and a driving voltage decreases.

According to the above two findings of the inventor et al., it is possible to reduce a parasitic capacity of wiring and to reduce a driving voltage of liquid crystal, as compared with the conventional structure when the structure of the present invention is adopted in which the interlayer insulating film for reducing a capacity is additionally disposed only on a superimposed part of the signal wiring and the common signal electrode and a minimum number of insulating films is disposed on the pixel electrode.

Specific embodiments of the present invention will be explained based on the above findings.

Besides, in the drawings used for the following explanation, reference numeral SUB1 denotes a transparent insulating substrate on the side having a thin film transistor disposed, reference character TFT denotes a thin film transistor serving as a switching element of a pixel, reference character CSTG denotes a storage capacity for guaranteeing voltage holding characteristics of liquid crystal, reference character CL denotes common signal wiring, reference character CE denotes a common signal electrode, reference character GE denotes a scanning signal electrode, reference character GL denotes scanning signal wiring, reference character SI denotes a semiconductor layer, reference character NSI denotes an electrode composed of a silicon film, which is doped with impurity such as phosphorus to ensure contact between a semiconductor layer and the source electrode or drain electrode of the thin film transistor, reference character SD denotes the source electrode of the thin film transistor and denotes a data signal electrode serving as a drain electrode, reference character DL denotes data signal wiring, reference character PX denotes a pixel electrode, reference character GI denotes a gate insulating film of the TFT, reference character PAS denotes a surface protective film of the thin film transistor, reference character TH denotes a through hole which is opened on the insulating film, reference number OIL1 denotes a coating type insulating film which is selectively formed to reduce a capacity, reference character BM denotes a light shield pattern, reference character CF denotes a color filter, reference character OC denotes an overcoating film, and reference number SUB2 denotes a transparent insulating substrate on the side of the color filter.

Further, reference numeral ORI1 and ORI2 denote orientation films, reference numerals POLL and POL2 denote polarizers, reference character GTM denotes a terminal for scanning signal wiring, reference character DTM denotes a terminal for data signal wiring, reference character CTM denotes a terminal for common signal wiring, reference character CB denotes bus wiring of the common signal wiring, reference character SL denotes a sealing member, reference numeral TC1 denotes a pad electrode of the terminals for scanning signal wiring and common signal wiring, and reference numeral TC2 denotes a pad electrode of the terminal DTM for the data signal wiring.

[Embodiment 1]

Next, referring to FIGS. 1 to 16, a liquid crystal display apparatus will be explained according to Embodiment 1 of the present invention.

The liquid crystal display apparatus of Embodiment 1 has a structure with the data signal wiring DL and the common signal electrode CE being superimposed via the interlayer insulating film OIL1 which is selectively formed.

Figure 3:
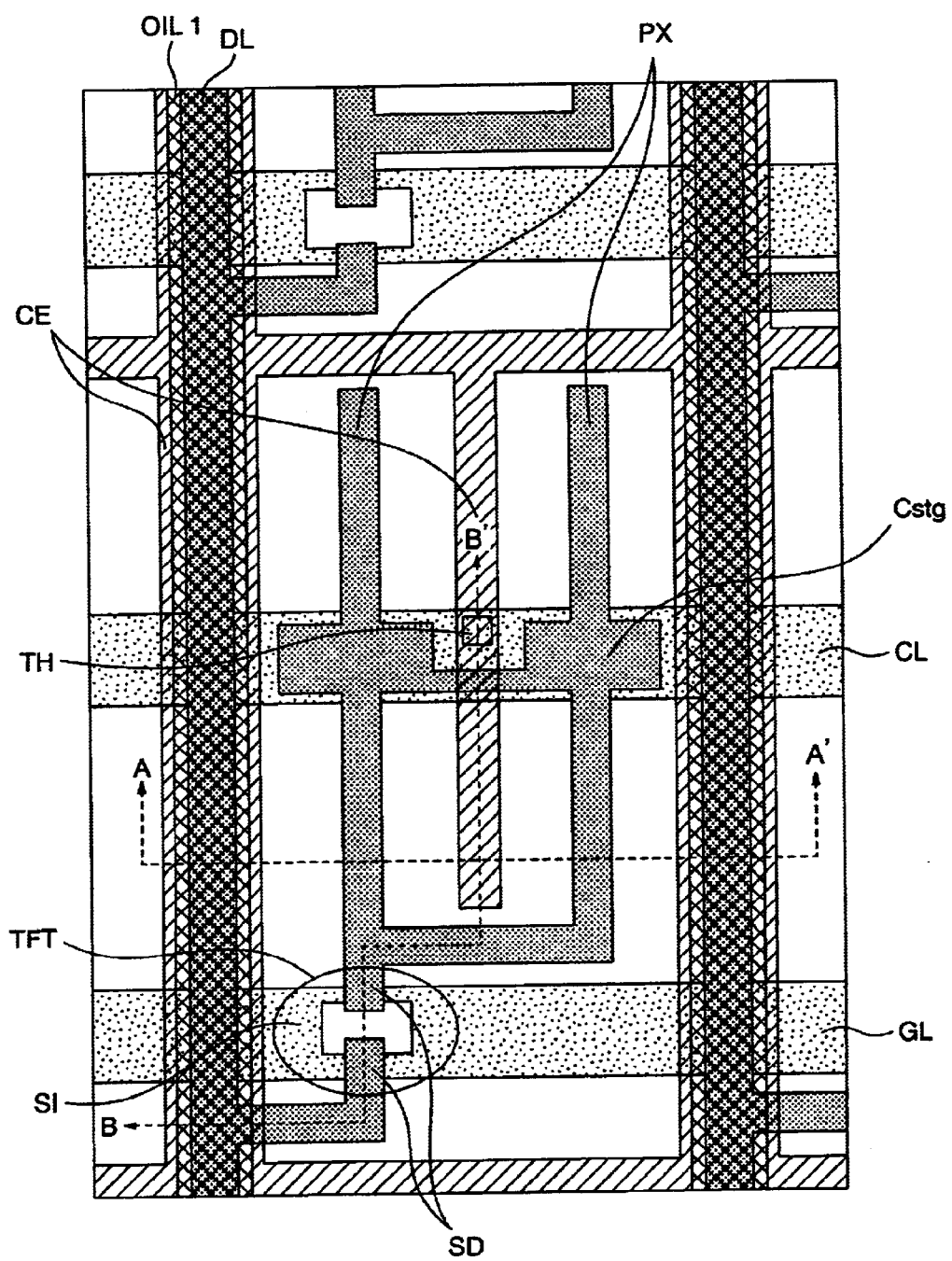
FIG. 3 is a plan view showing a unit pixel on the side of a TFT substrate in an active-matrix liquid crystal display apparatus according to Embodiment 1 of the present invention, that is, in a superimposed structure via an interlayer insulating film OIL1, in which a data signal wiring DL and a common signal electrode CE are selectively formed.

FIG. 3 is a plan view showing a unit pixel on the TFT substrate of the active-matrix liquid crystal display apparatus according to Embodiment 1 of the present invention.

Figure 4:
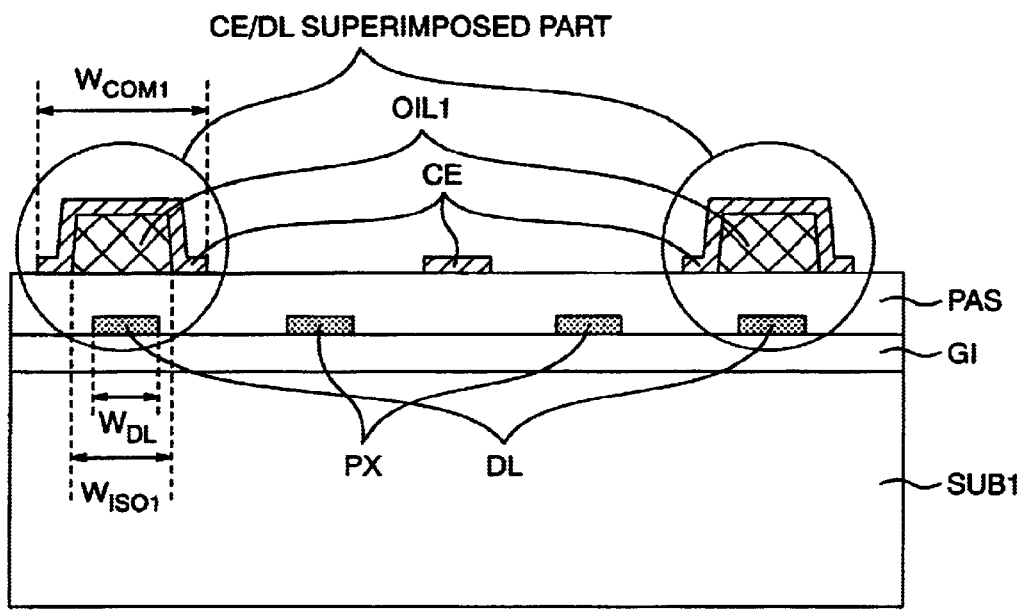
FIG. 4 is a section view taken along line A–A' shown in the TFT substrate of FIG. 3.
Figure 5:
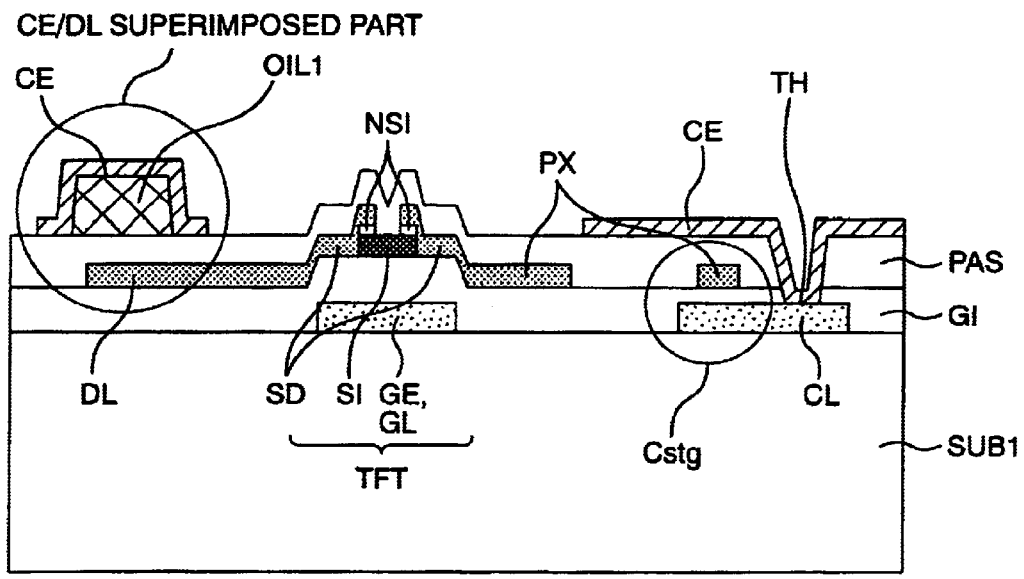
FIG. 5 is a section view taken along line B–B' shown in the TFT substrate of FIG. 3.

FIG. 4 is a section view of the TFT substrate SUB1 in FIG. 3 which is taken along line A–A'. FIG. 5 is a section view of the TFT substrate SUB1 in FIG. 3, which is taken along line B–B'.

As shown in FIG. 3, in Embodiment 1, the thin-film transistor TFT, the storage capacity CSTG, the pixel electrode PX, and the common signal electrode CE are each formed to constitute a pixel in a region divided by the scanning signal wiring GL and the data signal wiring DL.

At least a part of the pixel electrode PX is formed into a plurality of comb teeth or slits in the pixel.

The comb-shaped electrode of the pixel electrode PX and the common signal electrode CE is extended in x direction, which conforms to the extending direction of the data signal wiring DL.

In Embodiment 1, an invert staggered thin-film transistor is used as the thin-film transistor TFT. When a voltage at or higher than a threshold value of the thin-film transistor TFT is applied to the gate electrode GE, the semiconductor layer SI is brought into conduction and conduction is made between the data signal electrodes SD, which serve as the source electrode and the drain electrode of the thin-film transistor TFT. At this moment, a voltage applied to the data signal wiring DL is transmitted to the pixel electrode PX.

When a voltage of the gate electrode GE is at or lower than a threshold value of the thin film transistor, insulation is made between the data signal electrodes SD, which serve as the source electrode and the drain electrode of the thin-film transistor TFT. Thus, a voltage applied to the data signal wiring DL is not applied to the pixel electrode PX, and a voltage transmitted during the conduction of the data signal electrodes SD is held.

In order to guarantee the voltage-holding characteristics of liquid crystal, the storage capacity CSTG, which is connected in parallel with liquid crystal via the gate insulating film GI, is formed between the pixel electrode PX and the common signal wiring CL.

In Embodiment 1, the common signal electrode CE provided in parallel along x direction is formed so as to cover the data signal wiring DL via the coating type insulating film OIL1, which is selectively formed, around the pixel region. The common signal electrode CE is electrically connected to the common signal wiring CL, which is made of the same material and formed in the same process as the scanning signal wiring GL, via a through hold TH, which is opened through the TFT surface protective film PAS and the gate insulating film GI by simultaneous etching.

The pattern of the coating type insulating film OIL1 is selectively formed so as to cover the data signal wiring DL according to the pattern of the data signal wiring DL.

Moreover, the pixel electrode PX is formed by extending one of the data signal electrodes SD which serve as the source electrode and the drain electrode of the thin-film transistor TFT, and the data signal wiring DL is formed by extending the other data signal electrode SD.

According to Embodiment 1, the coating type insulating film OIL1 is selectively formed according to the pattern of the common signal electrode CE on a region where the common signal electrode CE is super-imposed on the data signal wiring DL. Hence, it is possible to reduce a parasitic capacity appearing between the data signal wiring DL and the common signal electrode CE without increasing a driving voltage of liquid crystal.

For example, a material having a permittivity of 3.0 is used as the coating type insulating film OIL1 with a thickness of 0.6 µm, a parasitic capacity between the data signal wiring DL and the common signal electrode CE is reduced to about one third as compared with the case where the coating type insulating film OIL1 is not formed.

Consequently, even when the wiring is super-imposed, it is possible to prevent waveform rounding of a signal that is caused by a delayed signal and to provide a liquid crystal display panel achieving high picture quality with no picture degradation.

Also, as described above, the insulating film disposed on the pixel electrode PX may cause a voltage drop. However, in Embodiment 1, since the coating type insulating film OIL1 is selectively formed, the coating type insulating film OIL1 does not exist on the pixel electrode PX. Therefore, it is unlikely that the number of the insulating films causing a voltage drop does not increase.

Consequently, it is possible to prevent an increase in driving voltage.

Because of the common signal electrode CE which is superimposed so as to cover the data signal wiring DL, an electric field of the data signal wiring DL is effectively shielded and current leakage to the adjacent pixel electrode PX is prevented.

According to Embodiment 1, because of the coating effect of the coating type insulating film OIL1, it is possible to cover a defect such as a crack and a pin hole on the silicon nitride film and a covering defect on an adhesion part on the data signal wiring DL, and it is possible to prevent a short circuit resulted from an insulating defect between the data signal wiring DL and the common signal electrode CE.

Further, it is possible to keep an etching solution from reaching the surface of the data signal wiring DL via the defective part when the common signal electrode CE is processed on the top layer. Thus, dissolution of the electrodes and wiring can be prevented.

When the coating type insulating film OIL1 is formed on the pixel electrode PX, a driving voltage rises. This has been already described referring to FIGS. 2A, 2B, and 2C.

Meanwhile, the coating type insulating film OIL1 may be formed on a region not depending upon a driving voltage, that is, a region having no pixel electrode PX. This region includes a region having the scanning signal wiring GL, the data signal wiring DL and the thin-film transistor TFT.

In this case, in addition to the effect of reducing a parasitic capacity between the data signal wiring DL and the common signal electrode CE, the covering effect of the coating type insulating film OIL1 also acts as a protecting film of the electrode and wiring on a lower layer as well as the data signal wiring DL.

Hence, to be specific, it is possible to prevent a dissolution break on the data signal electrode DE, the scanning signal wiring GL, the scanning signal electrode GE, and the common signal wiring CL. The dissolution break is caused by an etching solution impregnated through a defective part of the surface protective film PAS of the TFT and the gate insulating film GI when the common signal electrode CE is processed on the coating type insulating film OIL1.

Further, it is possible to prevent degradation in picture quality of the liquid crystal display apparatus. The degradation is attributed to flow of a low-layer wiring material partially into liquid crystal from the defective parts with affecting electric/optical characteristics of the liquid crystal.

However, as described above, the coating type insulating film OIL1 cannot be formed on the pixel electrode PX, which increases a driving voltage, on the exposed terminals of the scanning signal and the data signal, and on the through hole TH connecting the common signal electrode CE and the common signal wiring CL.

As earlier mentioned, in Embodiment 1, the pattern of the coating type insulating film OIL1 is selectively formed according to the pattern of the data signal wiring DL.

As shown in FIG. 4, a pattern width of the data signal wiring DL is defined as WDL μm, a pattern width of the coating type insulating film OIL1, which is selectively formed according to the pattern of the data signal wiring DL on the superimposed part, is set at WIS01 μm, and a pattern width of the common signal electrode CE is set at WCOM1 μm.

It is necessary to set the above pattern widths in view of the effect of shielding an electric field of the data signal wiring, the effect of reducing a parasitic capacity of wiring, and the alignment precision of the pattern and the processing accuracy of size in a photo lithography process.

The effect of shielding an electric field of the data signal wiring, and the effect of reducing a parasitic capacity of wiring are significant at NDL<WCOM1 and WDL<WIS01, respectively. When WIS01 is smaller than WDL, i.e., when the data signal wiring DL extends off the pattern of the coating type insulating film OIL1, it is possible to achieve the effect of reducing a parasitic capacity on the superimposition with the coating type insulating film OIL1.

However, the above structure is not desirable because a parasitic capacity is more likely to occur according to the extension of the data signal wiring DL out of the coating type insulating film OIL1.

Moreover, as described in Embodiment 1 of FIG. 4, when the pattern of the common signal electrode CE is formed and superimposed as WIS01<WCOM1 so as to cover the side of the pattern of the coating type insulating film OIL1, which is selectively formed, as compared with the conventional structure in which the coating type insulating film is formed entirely, it is possible to prevent diffusion of an electric field in the coating type insulating film.

Since the effect of shielding an electric field is further improved, it is possible to reduce a pattern width WCOM1 of the common signal electrode CE accordingly, thereby increasing an aperture ratio of a pixel.

Therefore, as described in Embodiment 1 of FIG. 4, the largest effect is achieved at WDL<WIS01<WCOM1 and WDL>0.

Moreover, in Embodiment 1, another step height is made on the pattern of the coating type insulating film OIL1 by selectively forming the coating type insulating film OIL1.

It has been generally known that such a step height is likely to cause a defective image including a coating defect on the upper orientation film, an initial orientating defect on liquid crystal that is attributed to shade of liquid crystal rubbing for orientation, and abnormal switching (domain) of liquid crystal.

However, in Embodiment 1 shown in FIG. 4, the step height pattern of the coating type insulating film OIL1 is placed within a self-shielding region (a pattern width WCOM1 of the common signal electrode CE), which will be described referring to FIG. 7. Thus, the step height of the coating type insulating film OIL1 does not exist on an opening of the pixel.

Therefore, it is possible to prevent a step height from causing a defect on picture quality even when the coating type insulating film OIL1 is selectively formed.

In Embodiment 1, for example, a width WDL of the data signal wiring DL is 6 μm, a width of WIS01 is 12 μm, and a width of WCOM1 is 18 μm.

Besides, in Embodiment 1, regarding the number of divisions to form a comb-shaped electrode in a unit pixel, the pixel electrode PX has two and the common signal electrode has three including a super-imposed part in the figure. The number of divisions can be changed is not restricted to the configuration drawn in the figure.

Figure 6:
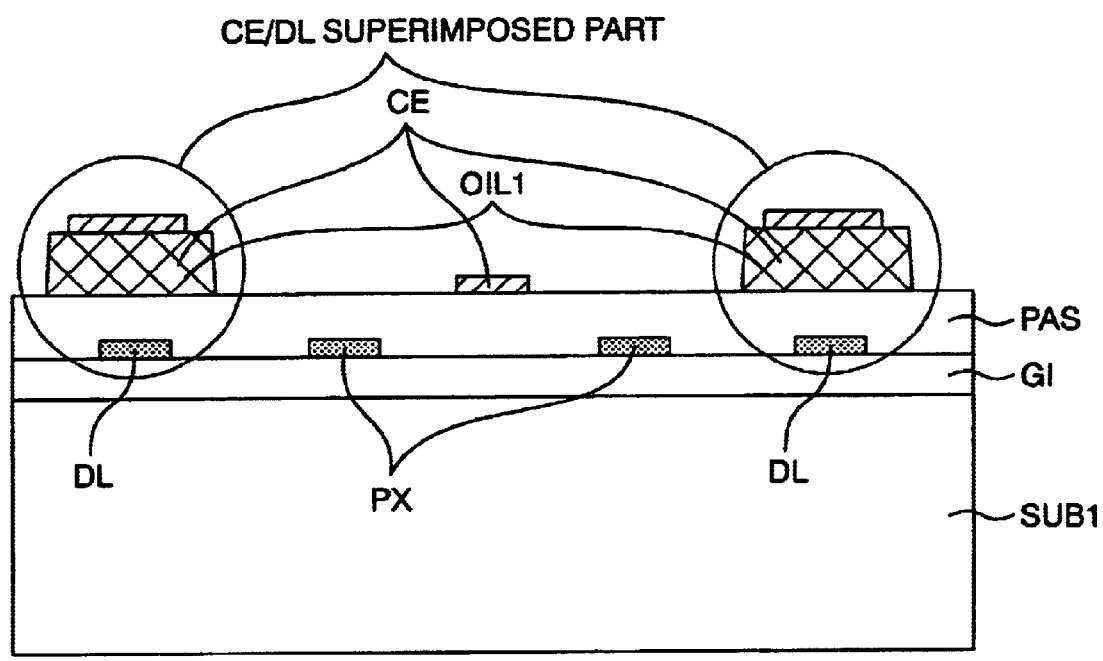
FIG. 6 is a section view taken along line A–A' showing the structure of FIG. 4 in which a pattern of the common signal electrode CE of Embodiment 1 is changed.

FIG. 6 is a section view taken along line A–A' of Embodiment 1 in which the pattern of the common signal electrode CE of FIG. 4 is modified.

As compared with the structure of FIG. 4, the shielding efficiency of the data signal wiring DL is slightly smaller and the orientation of liquid crystal is likely to be affected by the step height of the coating type insulating film OIL1, which is selectively formed, in the pattern arrangement of FIG. 6. The common signal electrode CE does not need to be deposited in a manner to cover the step height of the coating type insulating film OIL1. Hence, it is possible to provide redundancy for a break on the common signal electrode CE.

In the case of Embodiment 1, the relationship of the pattern widths shown in FIG. 4 is WDL<WCOM1<WIS01 and WDL>0.

Figure 7:
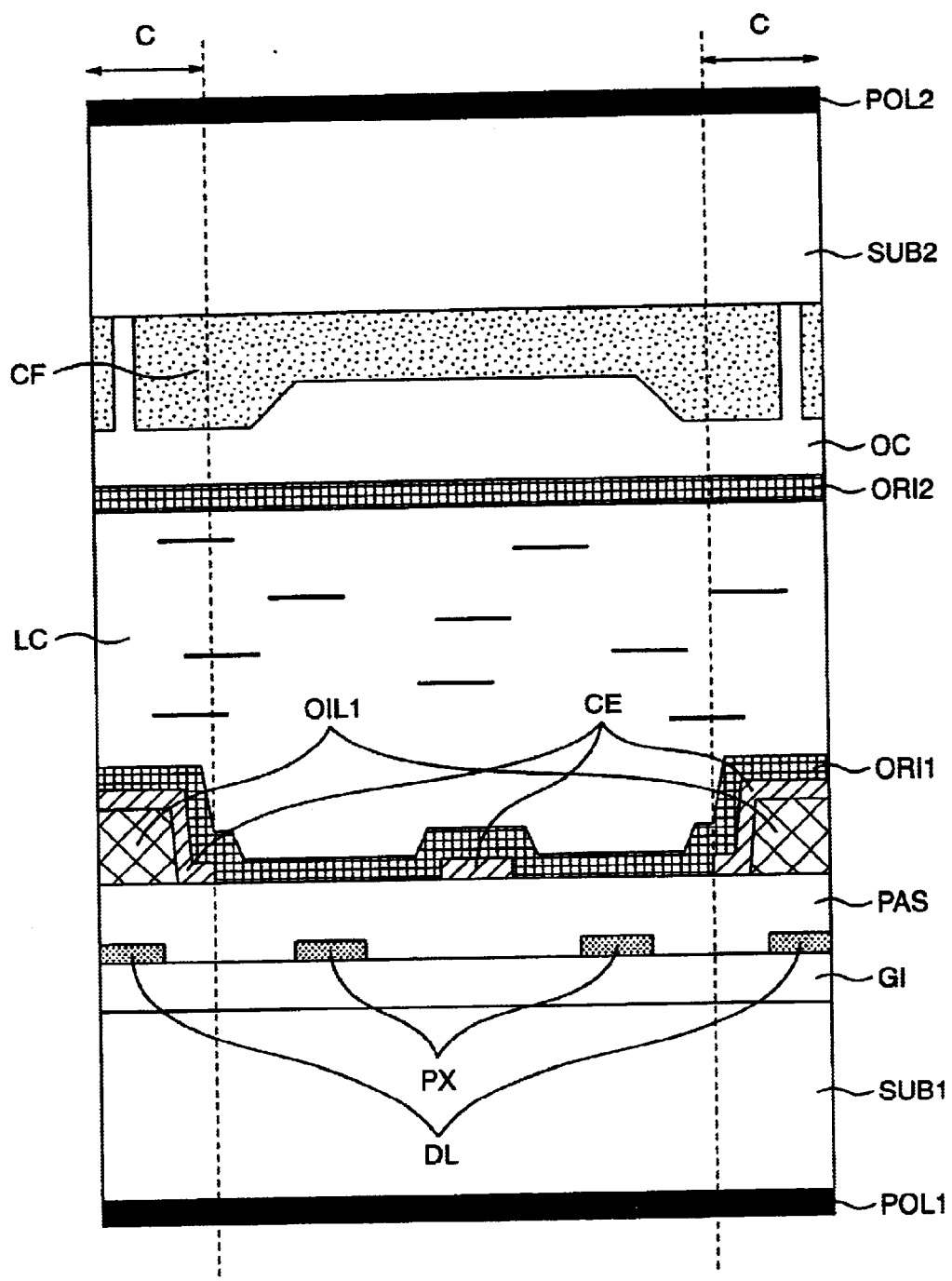
FIG. 7 is a section view taken along line A–A' shown in FIG. 3, which includes the TFT substrate SUB1 and a color filter substrate SUB2.

FIG. 7 is a section view taken along line A–A' shown in FIG. 3 and includes the TFT substrate SUB1 and the color filter substrate SUB2.

The transparent insulating substrate SUB1 on the side having the thin-film transistor TFT is referred as a TFT substrate, and the opposing transparent insulating substrate SUB2, which is opposite to the TFT substrate via the liquid crystal LC, is referred as a CF substrate.

As shown in FIG. 7, on the CF substrate, a light shield pattern BM is firstly formed so as to divide pixel regions on the side of the liquid crystal layer LC, and a color filter CF is formed on an opening for determining a substantial pixel region of the light shield pattern BM. And then, an overcoating film OC, i.e., a resin film is formed so as to cover the light shield pattern BM and the color filter CF, and the orientation film ORI1 is formed on the overcoating film OC.

The polarizers POL1 and POL2 are respectively formed on the exteriors (surfaces being opposite from the surface of the liquid crystal layer LC) of the TFT substrate and CF substrates.

In Embodiment 1, a normally black mode structure is adopted. The node provides black display when an electric field with a component substantially in parallel with the transparent substrate SUB1 does not appear between the pixel electrode PX and the common signal electrode CE.

The normally black mode can be set according to liquid crystal characteristics (e.g., a direction of an electric field between the pixel electrode PX and the common signal electrode CE, a rubbing direction of the orientation film OR1, and a direction of a deflection transmitting axis of the polarizer POL).

When the normally black mode is adopted, an electric field appears in a direction substantially perpendicular to the transparent insulating substrate SUB1. Right on the common signal electrode CE (region C of FIG. 7) where an electric field hardly appears with a substantially parallel component, black display is provided even when a transparent conductive film made of indium oxide such as indium tin oxide (ITO), indium zinc oxide (IZO), and indium germanium oxide (IGO) is used as the common signal electrode CE. Thus, the common signal electrode CE itself can act as a self-shielding film for shielding leakage of light that is caused by an electric field for driving liquid crystal around the data signal wiring CL.

Therefore, it is possible to eliminate the the black matrix BM on the data signal wiring DL, thereby increasing an aperture ratio accordingly.

Further, the alignment of the transparent insulating substrate SU1 be aligned to a parallel direction (x direction) of the data signal wiring CL is not needed when the transparent insulating substrate SUB2 is aligned to the transparent insulating substrate SUB1. Thus, a wide margin can be provided for misalignment.

In Embodiment 1, the black matrix BM is provided only on the scanning signal wiring GL and the thin-film transistor TFT.

In Embodiment 1, the black matrix BM is provided only on the scanning signal wiring GL and the thin-film transistor TFT. This is not shown in FIG. 7.

The liquid crystal display apparatus having a normally black mode structure is described in Embodiment 1. However, a normally white mode structure is also applicable in Embodiment 1. In this case, when the common signal electrode CE is composed of an opaque conductive layer made of metal such as Al or an alloy film, the common signal electrode CE can act as the self-shielding film.

Figure 8:
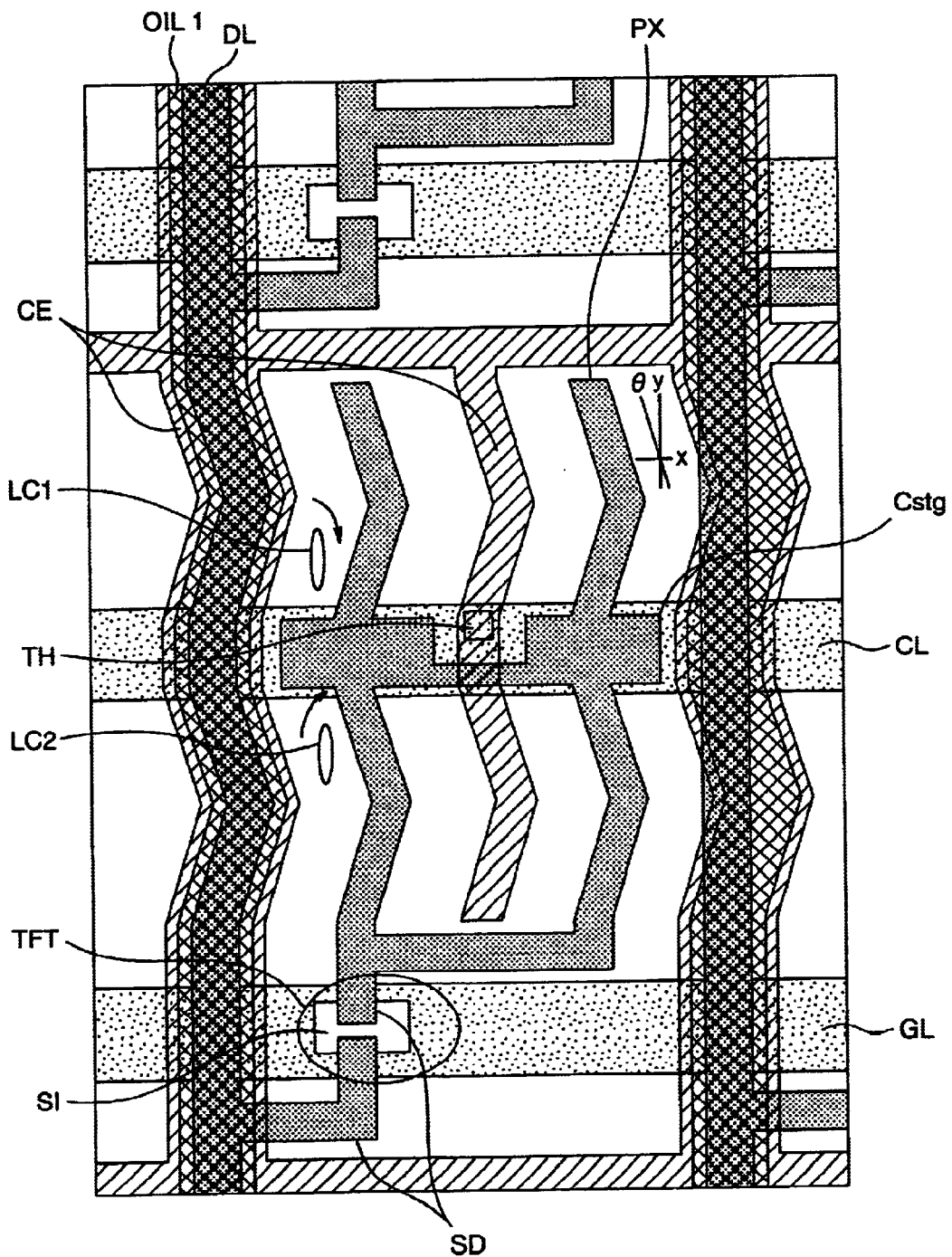
FIG. 8 is a plan view showing a unit pixel in Embodiment 1 using a multi-domain method.

FIG. 8 is a plan view showing a unit pixel of Embodiment 1, in which a multi-domain method is adopted. To be specific, bent parts are formed on the pixel electrode PX and the common signal electrode CE in Embodiment 1 shown in FIG. 3.

The multi-domain method achieves the following effect: in an electric field (in plain electric field) appearing in an extending direction of liquid crystal, regions applied plain electric fields in different directions are formed in the pixel regions, a twisting direction of a liquid crystal molecule (LC1 and LC2 of FIG. 8) in the region is reversed, and then, for example, it is possible to offset a coloring difference which appears when a display region is viewed from the right and left.

To be specific, in FIG. 8, the swath-shaped pixel electrode PX and common signal electrode CE, which are extended in one direction so as to intersect each other, are extended while being inclined from the above direction (appropriate between 5 and 40° when a rubbing direction of the orientation film ORI1 conforms to the direction of the data signal wiring DL in P-type liquid crystal). Thereafter, the above-mentioned effect of the multi-domain method can be achieved only by repeating bending/extending at an angle (−2θ) to form a zigzag pattern.

In Embodiment 1, the pixel electrode PX and the common signal electrode CE are extended in y direction of FIG. 8. Additionally, the electrodes may be extended in x direction of FIG. 8 and may be provided with bent parts to achieve the multi-domain effect.

According to Embodiment 1, when the pixel electrode PX and the common signal electrode CE are changed in pattern, it is possible to obtain the multi-domain effect as well as the effect of reducing a parasitic capacity that is described in Embodiment 1.

Figure 9:
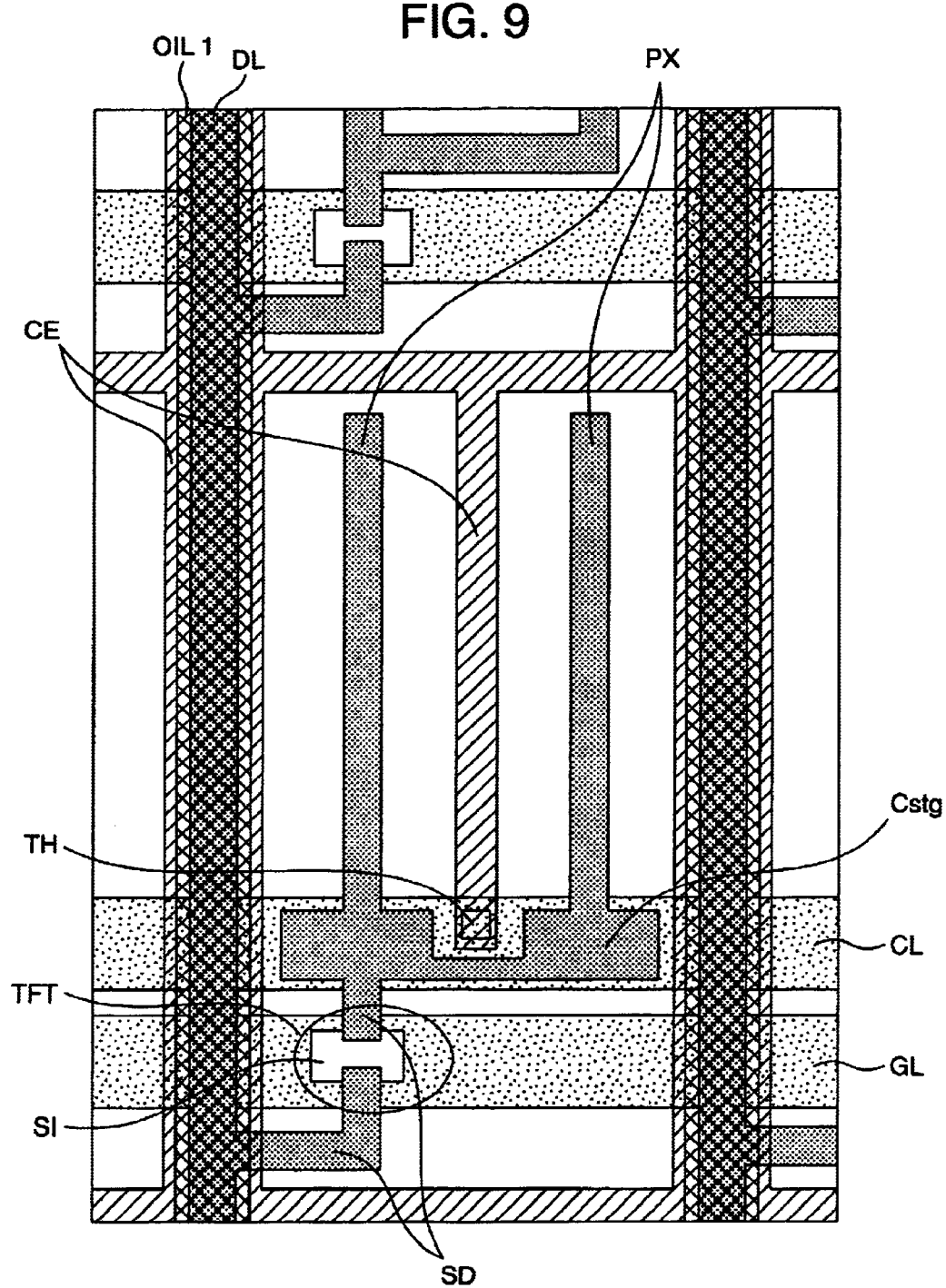
FIG. 9 is a plan view showing a unit pixel in the structure of Embodiment 1 in which the placement of the common signal wiring CL is changed.

FIG. 9 is a plan view showing a unit pixel in a structure in which in the arrangement of the common signal wiring CL is changed as compared with FIG. 3 of Embodiment 1.

Although the common signal wiring CL is formed so as to pass through substantially the center of a pixel region in Embodiment 1 of FIG. 3, the common signal wiring CL may be placed near the scanning signal wiring GL as described in Embodiment 1.

Figure 10:
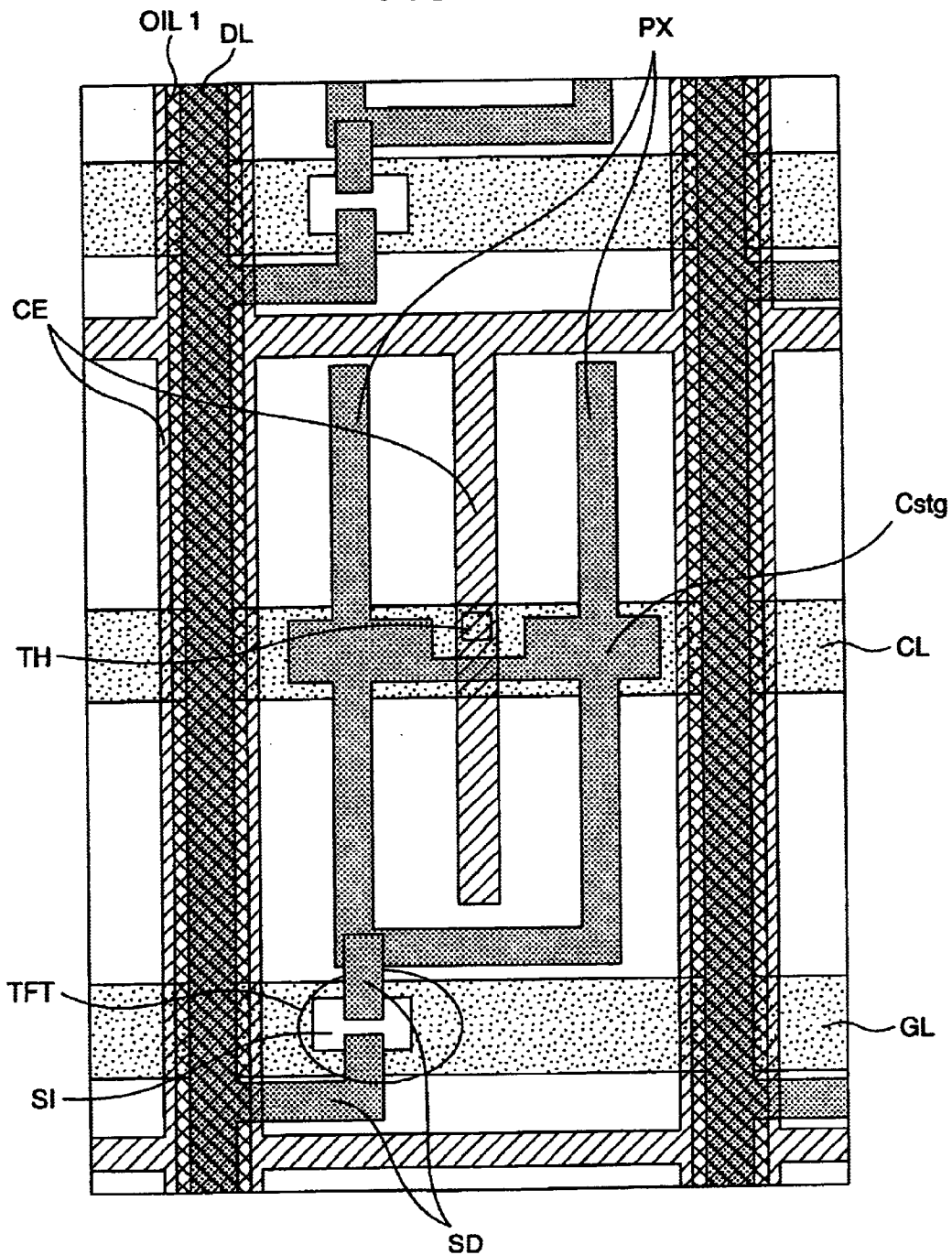
FIG. 10 is a plan view showing a unit pixel in the structure of Embodiment 1 in which a pixel electrode PX is formed of a transparent conductive film.

FIG. 10 is a plan view showing a unit pixel in which the pixel electrode PX is composed of a transparent conductive film in Embodiment 1 of FIG. 3.

In Embodiment 1 of FIG. 3, the pixel electrode PX is formed by extending one of the data signal electrodes SD and is inevitably made of a metallic wiring material that constitutes the data signal electrodes SD and the data signal wiring DL.

As described in Embodiment 1, when the pixel electrode PX is transparent, a maximum transmittance is improved by transmitted light thereon in white display. Thus, brighter display can be realized as compared with the case of the pixel electrode PX made of an opaque material such as metal.

Furthermore, as shown in FIG. 7, a liquid crystal molecule maintains initial orientation when no voltage is applied, and a polarizer is disposed such that black display is provided in the above state (normally black mode). Hence, even when the pixel electrode PX is transparent, it is possible to obtain high-quality black display without transmitting light thereon.

Therefore, it is possible to improve a maximum transmittance while obtaining a sufficient contrast ratio. In this case, the step of forming and patterning a transparent conductive layer is additionally required for forming the pixel electrode PX.

Next, the shape of the end of the substrate and the shapes of an electric circuit and terminals will be explained according to Embodiment 1.

Figure 11:
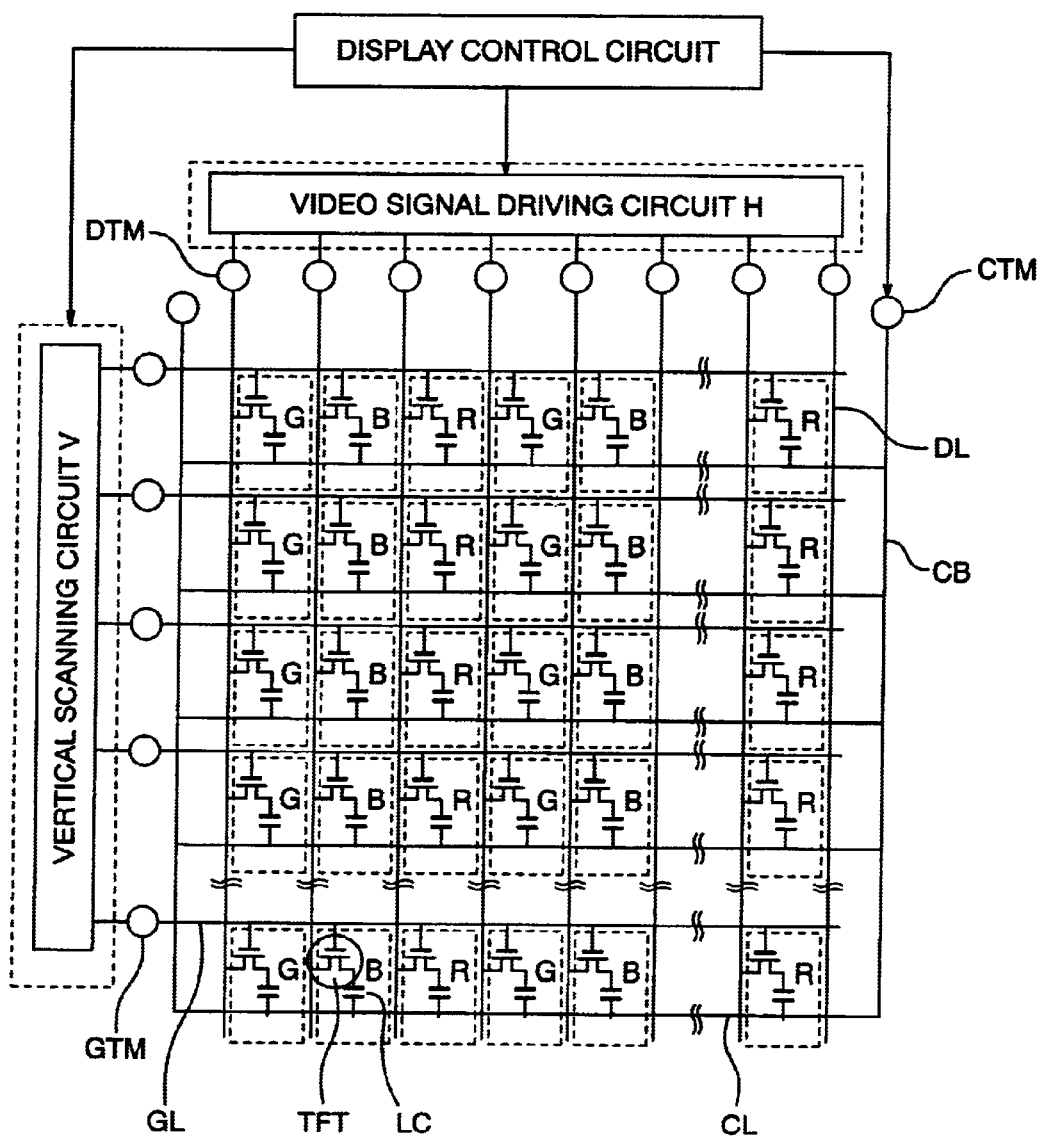
FIG. 11 is a schematic view showing an electric circuit of the active-matrix liquid crystal display apparatus of Embodiment 1.

FIG. 11 is a schematic diagram showing the electric circuit of the active-matrix liquid crystal display apparatus according to Embodiment 1 of the present invention.

Figure 12A:
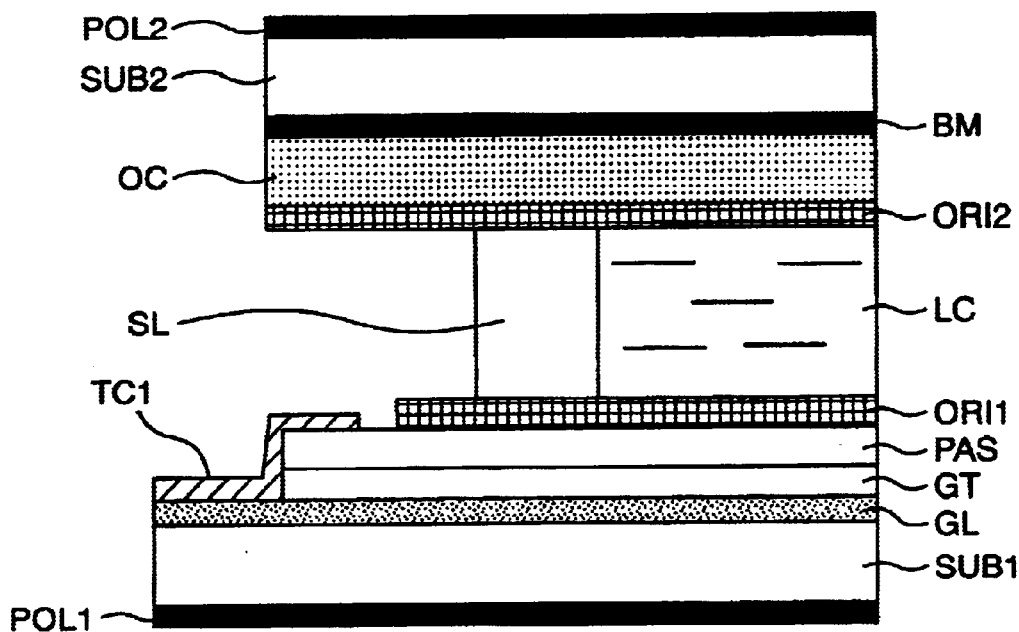
FIGS. 12A and 12B are sectional schematic diagrams showing ends of the substrates of the active-matrix liquid crystal display apparatus according to Embodiment 1.
Figure 12B:
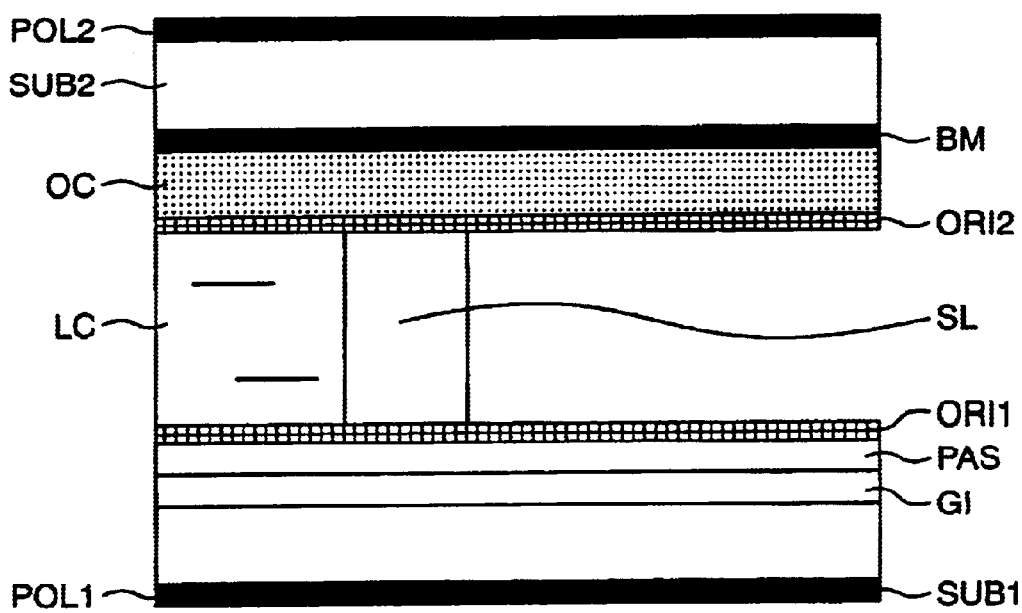

FIGS. 12A and 12B are section views schematically showing the ends of the substrate of the active-matrix liquid crystal display apparatus according to Embodiment 1 of the present invention. FIG. 12A shows the end where the scanning signal wiring terminal GTM is disposed. FIG. 12B is a diagram showing the end where an inlet of liquid crystal is disposed.

Scanning signals (voltage signals) are successively supplied by a vertical scanning circuit to the scanning signal wiring GL via the scanning signal wiring terminal GTM as shown in the electric circuit of FIG. 11. The scanning signal wiring GL is extended in x direction and is provided in parallel in y direction.

The thin-film transistors TFT disposed along the scanning signal wiring GL on the pixel regions are driven by the scanning signals.

At the timing of the scanning signal, a data signal is supplied to the data signal wiring DL, which is extended in y direction and is disposed in parallel in x direction, from the data signal driving circuit via the data signal wiring terminal DTM.

The data signal is applied to the pixel electrode PX via the thin-film transistor TFT on the pixel region.

On each of the pixel regions, the common signal electrode CE is formed together with the pixel electrode PX. An opposing voltage being branched from bus wiring CB of the common signal wiring is applied to the common signal electrode CE, via the common signal wiring terminal CTM to generate electric fields between the pixel electrode PX and the common signal electrode CE.

An electric field (in plane electric field) of the above electric fields has a parallel component predominantly to the transparent insulating substrate SUB1. This electric field controls a transmittance of light on liquid crystal.

FIG. 11 or FIGS. 12A and 12B show that R, G, B of the pixel regions respectively indicate the formation of a red filter, a green filter, and blue filter.

As shown in FIGS. 12A and 12B, the TFT substrate (SUB1) is fixed onto the CF substrate (SUB2) by the sealing member SL formed around the CF substrate (SUB2). The sealing member SL also acts as a filling member for filling liquid crystal between the transparent insulating substrates SUB1 and SUB2.

On the exterior of the sealing member SL and around the TFT substrate (SUB1), the scanning signal wiring terminal GTM, the data signal wiring terminal DTM, and the common signal wiring terminal CTM are formed on regions not being covered with the filter substrate.

FIGS. 12A and 12B show the terminal GTM for the scanning signal wiring GL as an example.

Each terminal is connected to the external driving circuit, which is shown in FIG. 11, by TCP (TAPE CARRIER PACKAGE) or COG (CHIP ON GLASS) connecting method via an anisotropy conductive film having conductive particles dispersed in adhesive.

Besides, a part of the sealing member SL (lower part of FIGS. 12A and 12B) includes a liquid crystal inlet (not shown). After liquid crystal is filled from the inlet, sealing is made by the liquid crystal filling member.

Figure 13A:
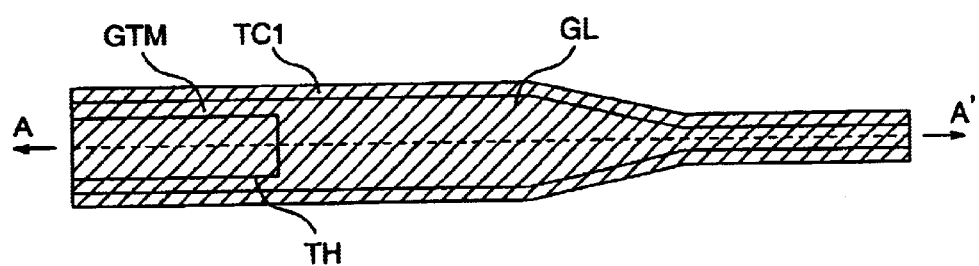
FIGS. 13A and 13B are a plan view showing a main part of a terminal GTM for scanning signal wiring GL and a section view taken along line A–A' of the active-matrix liquid crystal display apparatus according to Embodiment 1.
Figure 13B:
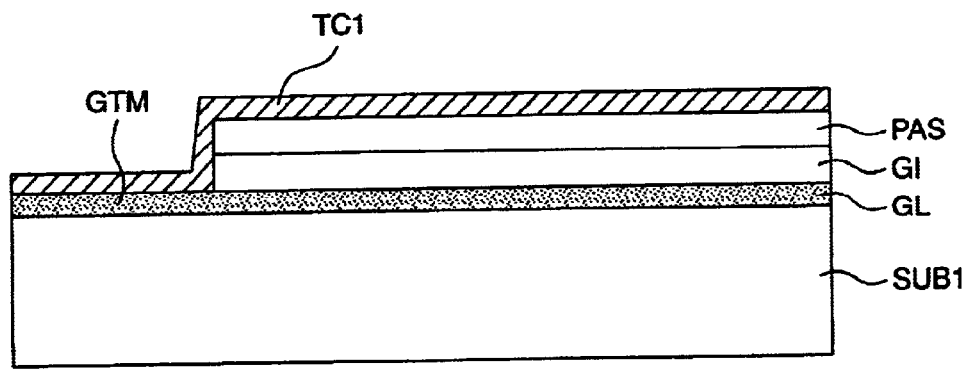

FIG. 13A is a plan view showing a main part of the terminal GTM for the scanning signal wiring GL of the active-matrix liquid crystal display apparatus according to Embodiment 1 of the present invention. FIG. 13B is a section view taken along line A–A' shown in FIG. 13A.

Figure 14A:
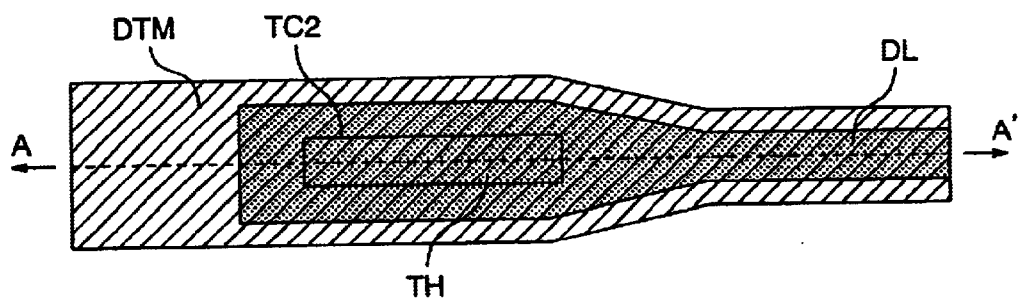
FIGS. 14A and 14B are a plan view showing a main part of a terminal DTM for a data signal wiring DL and a section view taken along line A–A' of the active-matrix liquid crystal display apparatus according to Embodiment 1.
Figure 14B:
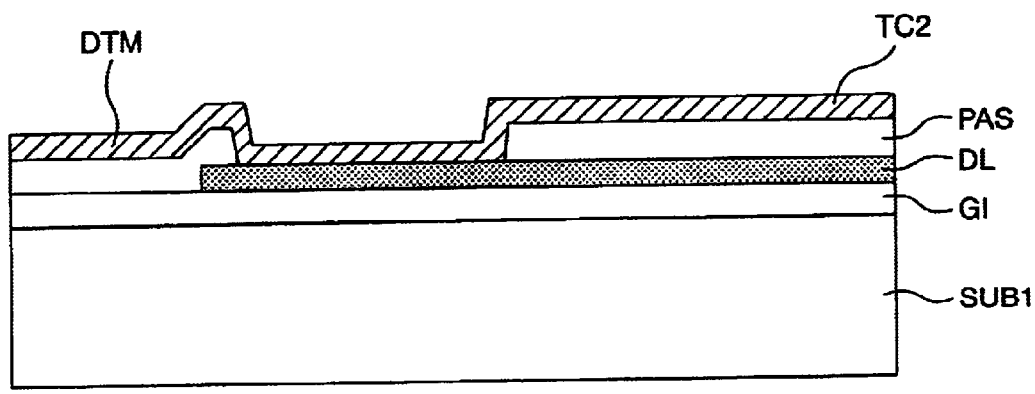

FIG. 14A is a plan view showing a main part of the data signal wiring terminal DTM. FIG. 14B is a section view taken along line A–A' shown in FIG. 14A.

As shown in FIGS. 13A and 13B, an extended part of the scanning signal wiring GL is firstly formed on a region where the scanning signal wiring terminal is formed as the scanning signal wiring terminal GTM, on the transparent insulating substrate SUB1.

Next, the gate insulating film GI and the surface protective film PAS of the thin-film transistor TFT are formed in this order so as to cover the scanning signal wiring GL. The end of the scanning signal wiring GL that is extended from the scanning signal wiring GL is partially exposed by the through hole TH, which is formed on the gate insulating film GI and the surface protective film PAS. The pad electrode TC1 for connecting terminals are formed so as to cover the end extended from the scanning signal wiring GL.

The pad electrode TC1 for connecting terminals is made of the same transparent conductive film material in the same process as the formation of the common signal electrode CE.

The scanning signal wiring terminal GTM is formed in the above process.

The exposed terminal of the liquid crystal display apparatus is generally made of a transparent conductive film material instead of a metallic material. The transparent conductive film material has excellent resistance to moisture, chemicals, and corrosion. In Embodiment 1, the scanning signal wiring terminal GTM is composed of a transparent conductive film because of superior resistance of the transparent conductive film to etching. Thus, it is possible to sufficiently achieve reliability on the exposed terminal.

Moreover, in Embodiment 1, since the scanning signal wiring GL and the common signal wiring CL are made of the same material in the same process, the common signal wiring terminal CTM is also made of the same material in the same process as the terminal GTM for the scanning signal wiring GL, inevitably with the same structure.

In this case, the common signal wiring terminal CTM is extended in an opposite direction from the scanning signal wiring terminal GTM as described in FIG. 11.

FIGS. 14A and 14B show the data signal wiring terminal DTM. The gate insulating film GI is firstly formed on the transparent insulating substrate SUB1. And then, an extended part of the data signal wiring DL is formed on a region where the data signal wiring terminal DTM is formed.

Thereafter, the surface protective film PAS of the thin-film transistor TFT is formed. On the region having the data signal wiring terminal DTM, the through hole TH is opened at a part of a region for forming the pad electrode TC2 for connecting terminals (described later).

Subsequently, the pad electrode TC2 for connecting terminals is formed using the same material and process as the formation of the common signal electrode CE.

The pad electrode TC2 is formed so as to cover the exposed part of the end of the data signal wiring DL. The exposed part is formed by the through hole TH. The pad electrode TC2 is electrically connected to the data signal wiring DL via the through hole TH.

In the case where the above structure is adopted, the video signal wiring terminal DTM as well as the scanning signal wiring terminal GTM is made of a transparent conductive film material which has excellent resistance to moisture, chemicals, and corrosion. Hence, it is possible to sufficiently obtain reliability on the exposed terminal.

Referring to FIGS. 15 and 16A to F', a specific example of a forming method of Embodiment 1 will be explained.

Figure 15:
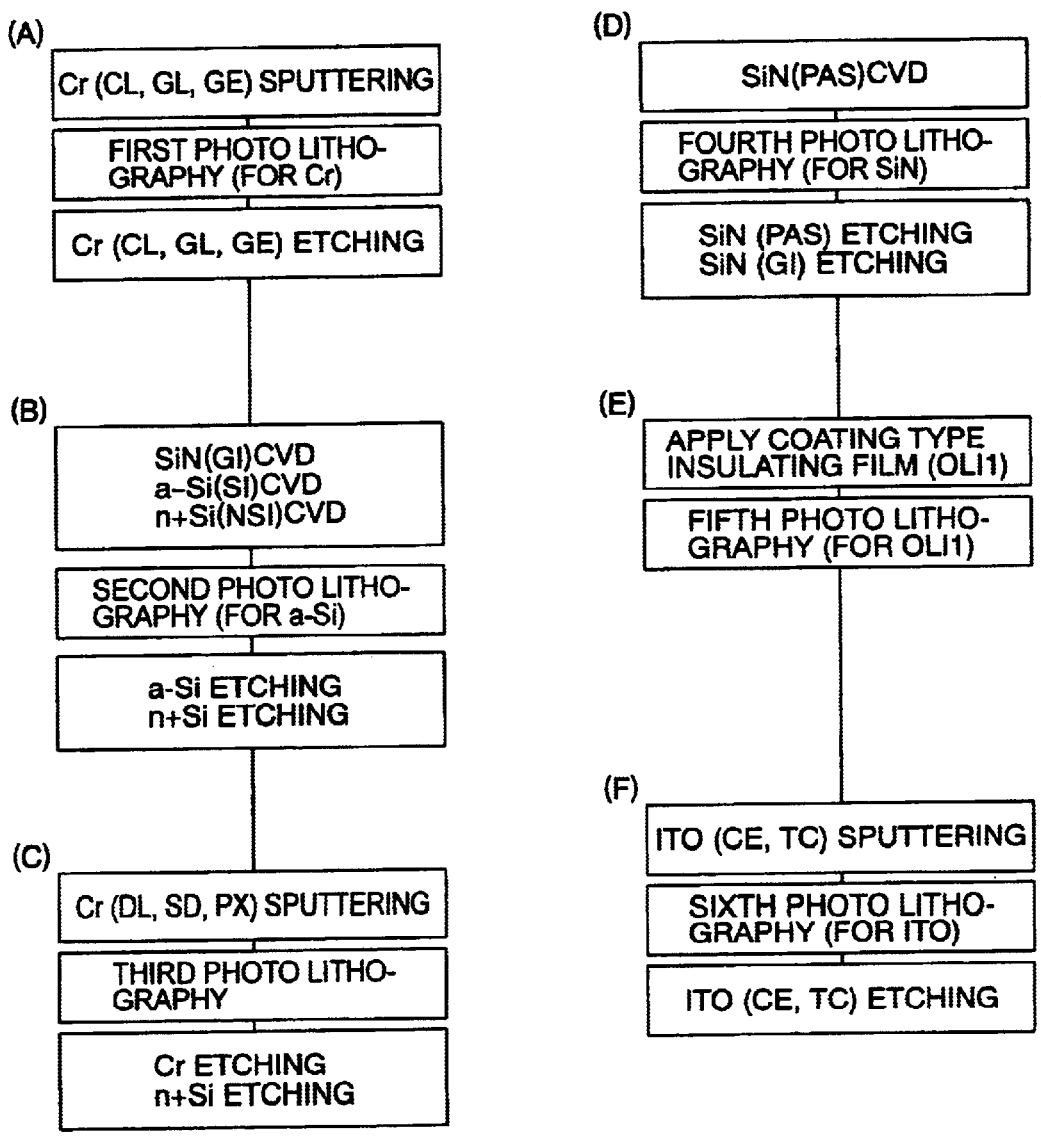
FIG. 15 is a diagram showing a process flow for realizing the structure of the active-matrix liquid crystal display apparatus of Embodiment 1.
Figure 16A:
FIGS. 16A, 16B, 16C, 16D, 16E, and 16F are section views taken along line A–A' shown in FIG. 3 and FIGS. 16A', 16B', 16C', 16D', 16E', and 16F' are section views taken along line B–B' shown in FIG. 3 when the TFT substrate is manufactured according to the process flow of FIG. 15.
Figure 16A:
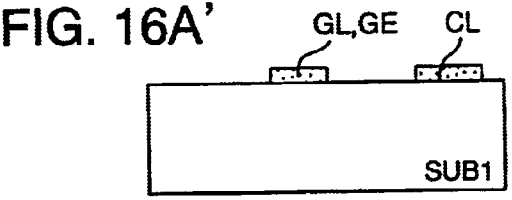
Figure 16B:
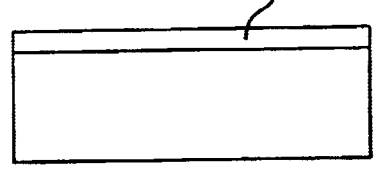
Figure 16B:
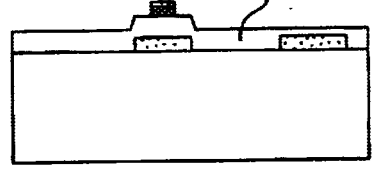
Figure 16C:
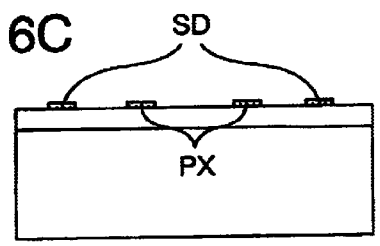
Figure 16C:
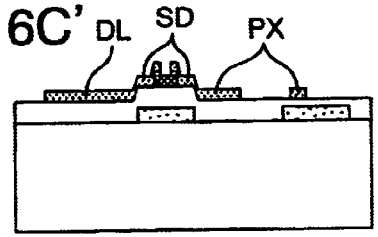
Figure 16D:
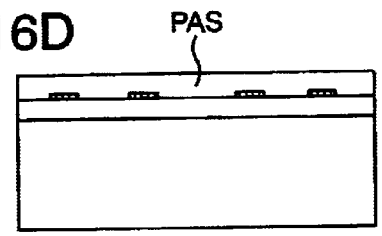
Figure 16D:
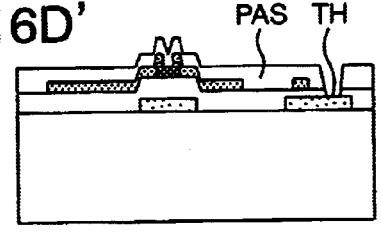
Figure 16E:
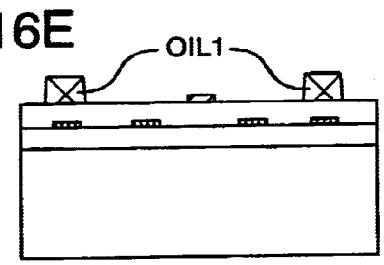
Figure 16E:
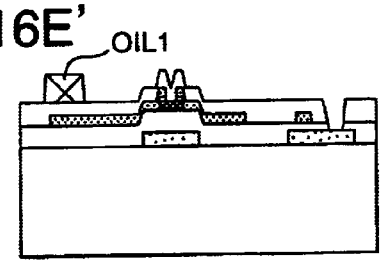
Figure 16F:
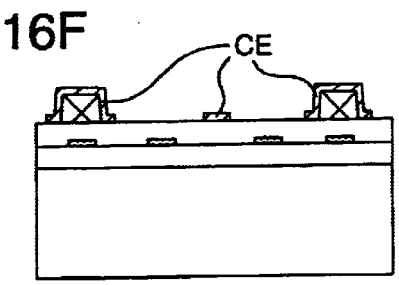
Figure 16F:
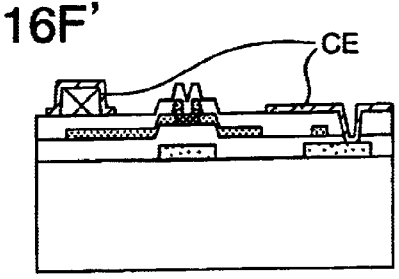

FIG. 15 is a diagram showing a process flow for achieving the structure of Embodiment 1 of the present invention. FIGS. 16A to 16F are section views taken along line A–A' shown in FIG. 3 and FIGS. 16A' to 16F' are section views taken along B–B' shown in FIG. 3 when the TFT substrate is formed according to the process flow of FIG. 15. In Embodiment 1, to be specific, the TFT substrate SUB1 is completed after a photo lithography process having six steps of (A) to (F).

The following explanation will be made in order of steps.

Step (A)

The transparent insulating substrate SUB1 is prepared and a Cr film is entirely formed thereon with a thickness of 100 to 500 nm, preferably 150 to 350 nm by a method such as a sputtering method.

And then, the Cr film is selectively etched by photo lithography technique, and the scanning signal electrode GE, the scanning signal wiring GL, and the common signal wiring CL are formed in a pixel region.

Further, the extended part of the scanning signal wiring GL is formed in a region for forming the scanning signal wiring terminal GTM, and the extended part of the common signal wiring CL is formed on a region for forming the common signal wiring terminal CTM. This is not shown in FIGS. 16A to 16F'.

Step (B)

A silicon nitride film serving as the gate insulating film GI is formed entirely on the transparent insulating substrate SUB1 with a thickness of 200 to 700 nm, preferably 300 to 500 nm by a method such as plasma CVD method.

Additionally, an amorphous silicon film is entirely formed on the gate insulating film GI with a thickness of 50 to 300 nm, preferably 100 to 200 nm by a method such as plasma CVD method, and an amorphous silicon film having phosphorus doped as an n-type impurity is deposited successively with a thickness of 10 to 100 nm, preferably 20 to 60 nm.

Subsequently, the amorphous silicon film is etched using photo lithography technique to form a semiconductor layer SI of the thin-film transistor TFT in a pixel region.

Step (C)

A Cr film is entirely formed on the transparent insulating substrate SUB1 with a thickness of 100 to 500 nm, preferably 150 to 350 nm by a method such as a sputtering method.

Next, the Cr film is etched using photo lithography technique. The data signal electrode SD serving as the source and drain electrodes of the thin-film transistor TFT, the pixel electrode PX formed by extending the data signal electrode SD, and the data signal wiring DL serving as an extended part of the data signal electrode SD are formed in a pixel region.

The extended part of the data signal wiring DL is formed in a region for forming the terminal DTM of the data signal wiring DL. This is not shown in FIGS. 16A to 16F'.

Thereafter, the amorphous silicon film having phosphorus doped as n-type impurity is etched while the etching pattern of the Cr film serves as a mask.

A part of the pixel electrode PX forms a storage capacity CSTG between the common signal wiring CL via the gate insulating film GI.

Step (D)

A silicon nitride film serving as the surface protective film PAS of the thin-film transistor TFT is entirely formed with a thickness of 200 to 900 nm, preferably 300 to 500 nm on the transparent insulating substrate SUB1 by a method such as plasma CVD method.

And then, the surface protective film PAS and the gate insulating film GI disposed on a lower layer of the surface protective film PAS are etched using photo lithography technique to form the through hole TH for partial exposure of the common signal wiring CL in a pixel region.

In addition, a through hole TH for exposing the extended part of the scanning signal wiring GL is formed in a region for forming the scanning signal wiring terminal GTM, a through hole TH for exposing the extended part of the common signal wiring CL is formed in a region for forming the common signal wiring terminal CTM, and a through hole TH for exposing the extended part of the data signal wiring DL is formed in a region for forming the data signal wiring terminal DTM.

Step (E)

An organic region or an inorganic polymer such as the coating type insulating film OIL1, which is composed of an insulating film such as an SOG film, is entirely applied onto the transparent insulating substrate SUB1 with a thickness of 0.5 to 4 μm, preferably 0.5 to 1.5 μm by a method such as spin coating method. An organic polymer contains a variety of organic resins such as polyimide polymer, acrylic polymer, epoxy polymer, and benzicyclobutene polymer, and an inorganic polymer contains Si being soluble in an organic solvent.

Subsequently, the coating type insulating film is selectively formed using photo lithography technique.

A region to be selectively formed is at least a part of a region where the common signal electrode CE, which is composed of a transparent conductive film formed in the step (G) (described later), and the data signal wiring DL are superimposed on each other.

However, at least the coating type insulating film OIL1 is not disposed on the following parts: on the pixel electrode PX in a pixel region; on a through hole TH for electrically connecting the common signal wiring CL and the common signal electrode CE, which is composed of a transparent conductive film formed in the step (G); on a through hole TH for exposing the extended part of the scanning signal wiring GL in a region for forming the scanning signal wiring terminal GTM; on a through hole TH for exposing the extended part of the common signal wiring CL in a region for forming the common signal wiring terminal GTM; and on a through hole TH for exposing the extended part of the data signal wiring DL in a region for forming the data signal wiring terminal DTM.

Step (F)

An ITO film serving as a transparent conductive film is entirely formed on the transparent insulating substrate SUB1 with a thickness of 50 to 300 nm, preferably 70 to 200 nm by a method such as a sputtering method.

And then, the ITO film is etched using photo lithography technique, and the common signal electrode CE is formed in the pixel region, being connected to the common signal wiring CL via the through hole TH.

The common signal electrode CE is partially superimposed on the data signal wiring DL via the coating type insulating film OIL1 serving as an inter-layer insulating film which is selectively formed.

Pad electrodes TC1 for the scanning signal wiring terminal GTM and the common signal wiring terminal CTM are respectively formed on the region for forming the scanning signal wiring terminal GTM and the region for forming the common signal wiring terminal CTM. This is not shown in FIGS. 16A to 16F'.

The pad electrode TC2 for the data signal wiring terminal DTM is formed on the region for forming the data signal wiring terminal DTM.

The TFT substrate is completed by the above steps.

Meanwhile, the color filter CF manufactured by a staining method and the light shield pattern BM made of Cr-containing or an organic materials are formed on the CF substrate.

Thereafter, an overcoating film serving as a flattening layer is formed, the TFT substrate and the CF substrate are bonded to each other, the liquid crystal layer LC is filled therebetween, and the polarizers POL1 and POL2 are disposed on the exteriors of the substrates. Thus, the liquid crystal display apparatus is completed.

In Embodiment 1, a photo-image forming insulating film is used as the coating type insulating film OIL1. The pattern of the coating type insulating film OIL1 may be formed by etching using a photo lithography process.

For example, the pattern of the coating type insulating film OIL1 may be formed using a thermosetting insulating film by a dry etching method in which oxygen is used as reaction gas.

In this case, it is necessary to increase a film thickness of resist used in the photo lithography process because of reduction of a film thickness reduced by dry etching.

[Embodiment 2]

Next, a liquid crystal display apparatus will be described according to Embodiment 2 of the present invention, referring to FIGS. 17 to 21.

In FIGS. 17 to 21, the same components used in Embodiment 1 are indicated by the same reference numerals and the description thereof is omitted.

Figure 17:
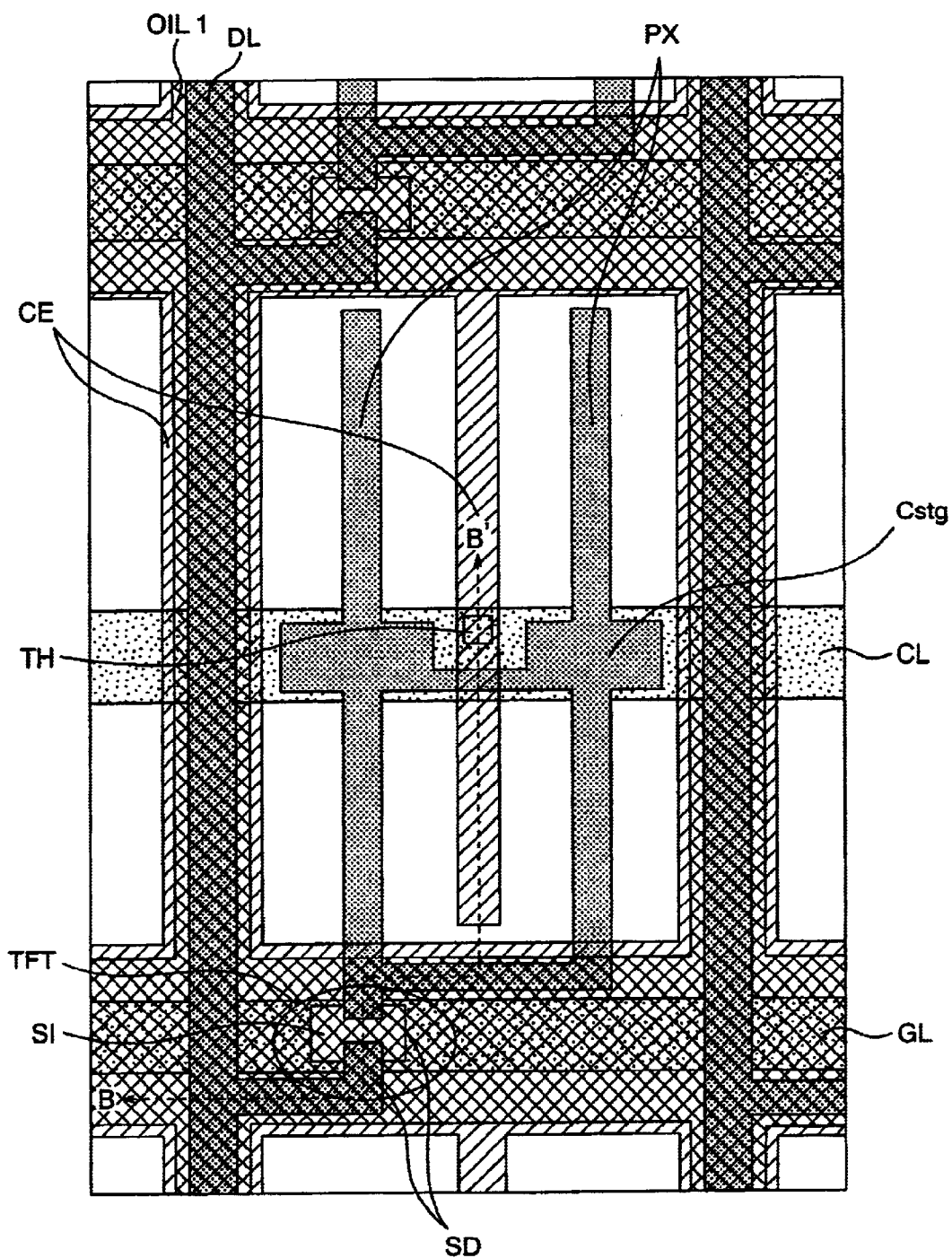
FIG. 17 is a plan view showing a unit pixel in an active-matrix liquid crystal display apparatus according to Embodiment 2 of the present invention, that is, in the structure in which scanning signal wiring GL as well as data signal wiring DL is super-imposed on a common signal electrode CE.

FIG. 17 is a plan view showing a unit pixel of an active-matrix liquid crystal display apparatus in Embodiment 2 of the present invention.

Figure 18:
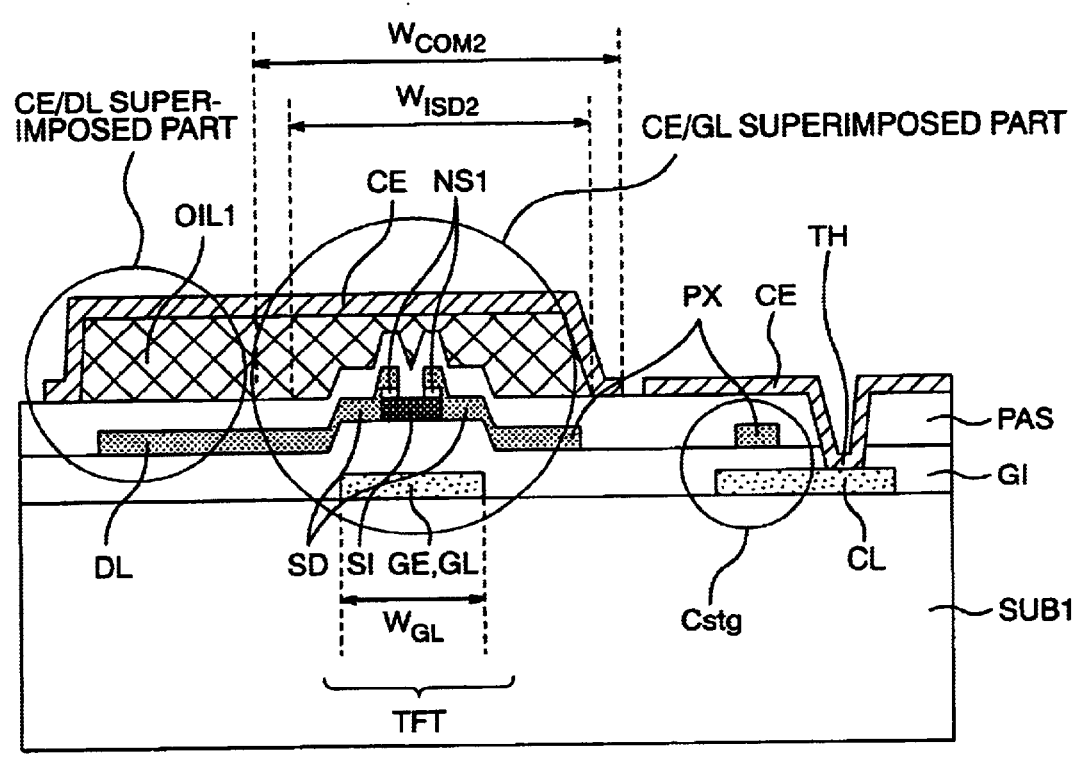
FIG. 18 is a section view taken along line B–B' shown in FIG. 17.

FIG. 18 is a section view taken along line B–B' shown in FIG. 17.

Embodiment 2 is different from Embodiment 1 in that the scanning signal wiring GL as well as the data signal wiring DL is superimposed on the common signal electrode CE.

To be specific, the pattern of the coating type insulating film OIL1 for reducing a capacity is selectively formed according to the pattern of the data signal wiring DL and the scanning signal wiring GL. The coating type insulating film OIL1 is not disposed on the pixel electrode PX.

Therefore, in Embodiment 2, it is also possible to reduce parasitic capacities of the data signal wiring DL and the scanning signal wiring GL, prevent delay of a signal on the wiring, and avoid an increase in driving voltage of liquid crystal.

Further, it is possible to obtain insulation on a superimposed part of the data signal wiring DL, the scanning signal wiring GL, and the common signal electrode CE by the filling and covering effect of the coating type insulating film OIL1, and to prevent etching solution, which processes the common signal electrode CE on the top layer, from reaching the data signal wiring DL and the surface of the scanning signal wiring GL via the defective part.

A pattern width of the scanning signal wiring GL is set at WGL $\mu$m, a pattern width of the coating type insulating film OIL1 which is selectively formed according to the pattern of the scanning signal wiring GL on a superimposed part with the scanning signal wiring GL, and a pattern width of the common signal electrode CE are defined as WGL $\mu$m, NIS02 $\mu$m and WCOM2 $\mu$m, respectively. In Embodiment 2, it is also necessary to set the pattern widths of WGL<WIS02<WCOM2 and WGL>0 on the superimposed part of the scanning signal wiring GL and the common signal electrode CE in order to sufficiently achieve the effect of shielding an electric field of the scanning signal wiring GL and the effect of reducing a parasitic capacity of the scanning signal wiring GL, as described in FIGS. 3 to 6 of Embodiment 1.

Moreover, when break redundancy of the common signal electrode CE is required on the pattern end of the coating type insulating film OIL1, it is necessary to satisfy WGL<WCOM2<WIS02 and WGL>0.

Figure 19:
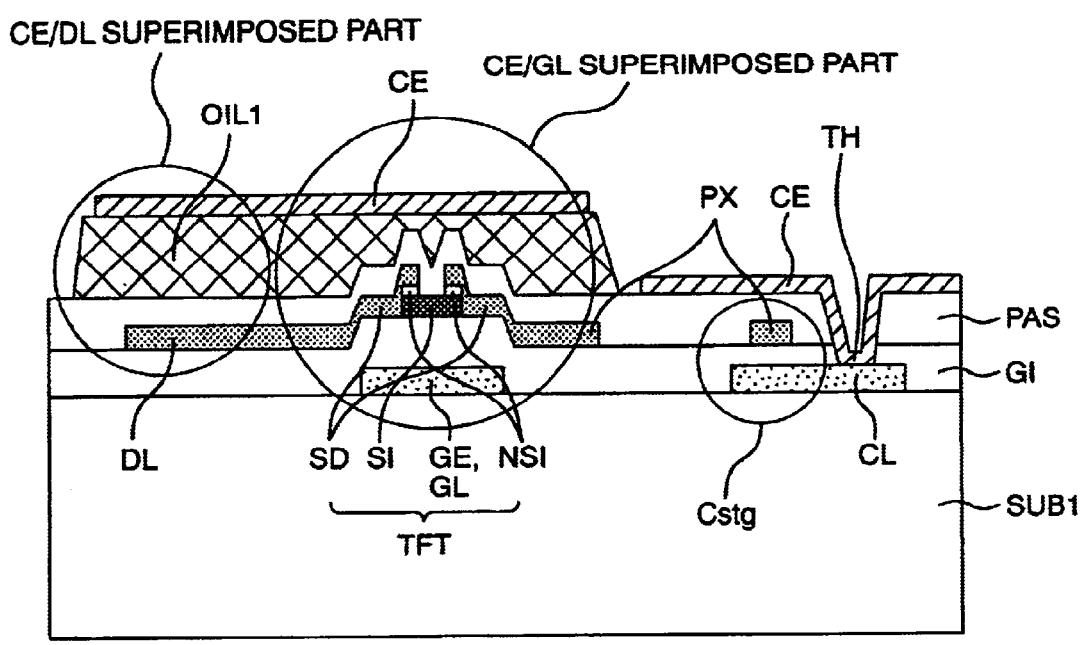
FIG. 19 is a section view taken along line B–B' showing the structure of Embodiment 2 in which the pattern of the common signal electrode CE is changed (WCOM2<WISO2)

FIG. 19 is a section view taken along line B–B' shown in Embodiment 2, in which the pattern of the common signal electrode CE is changed (WCOM2<WIS02) in view of break redundancy of the common signal electrode CE.

With the above structure, the black matrix BM can be omitted on the scanning signal wiring GL as well as the data signal wiring DL. Thus, it is possible to remarkably increase a margin of positioning the transparent insulating substrate SUB2 relative to the transparent insulating substrate SUB1 and to improve an aperture ratio of the pixel.

Further, the common signal electrode CE is extended in x direction as well as in y direction and is arranged in a matrix form. Hence, a wiring resistance of the common signal electrode CE can be also largely reduced.

Figure 20:
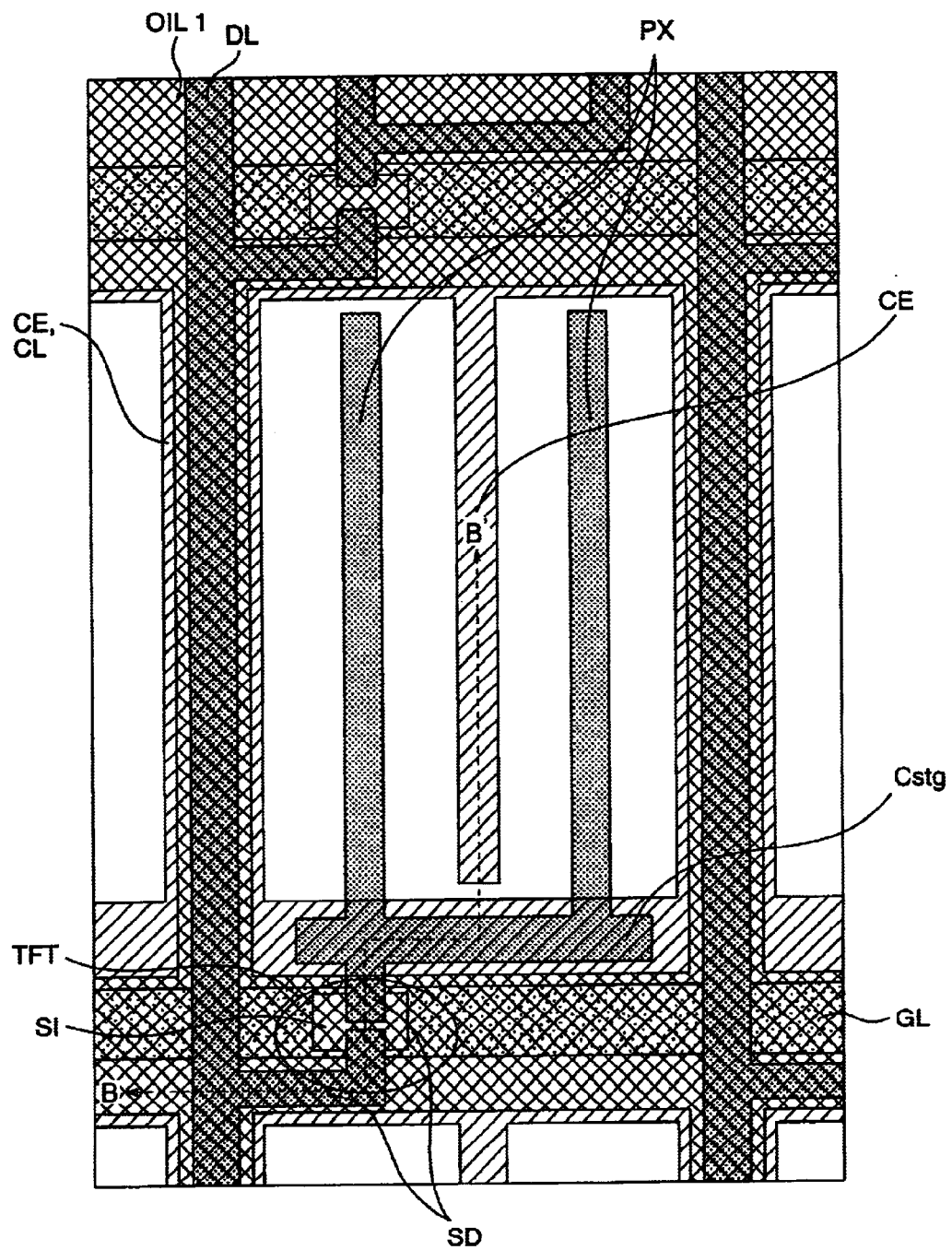
FIG. 20 is a plan view showing a unit pixel of an embodiment in which the common signal wiring CL is formed by extending the common signal electrode CE on a layer where the common signal electrode CE is formed in Embodiment 2.

FIG. 20 is a plan view showing a unit pixel of Embodiment 2. The common signal wiring CL is disposed on a layer where the common signal wiring CL, and the common signal electrode CE is extended in Embodiment 2.

Figure 21:
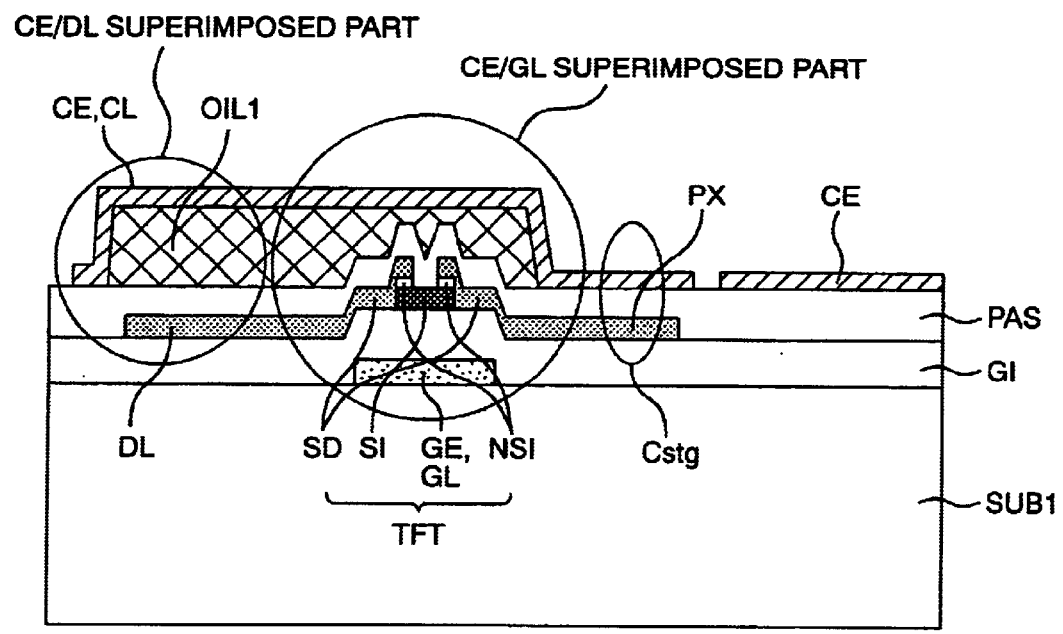
FIG. 21 is a section view taken along line B–B' of FIG. 20.

FIG. 21 is a section view taken along line B–B' shown in FIG. 20.

The matrix form can remarkably reduce a wiring resistance of the common signal electrode CE in a structure of Embodiment 2.

Since it is not necessary to provide another common signal wiring CL for reducing a wiring resistance, an aperture ratio can be improved accordingly.

Further, since it is not necessary to connect the common signal wiring CL and the common signal electrode CE via the through hole TH, a yield can be improved accordingly.

In Embodiment 2, the common signal electrode CE acting as the common signal wiring CL is composed of a transparent conductive film made of a material such as ITO. When a resistance of the common signal wiring CL needs to be lower, a metal such as Al and an alloy film can be used instead of the transparent conductive film.

[Embodiment 3]

A liquid crystal display apparatus in Embodiment 3 of the present invention will be explained referring to FIGS. 22 to 37.

In FIGS. 22 to 37, the same components used in Embodiment 1 are indicated by the same reference numerals and the description thereof is omitted.

In Embodiment 3, with respect to the structure of an interlayer insulating film disposed on a superimposed part of the data signal wiring DL or the scanning signal wiring GL and the common signal electrode CE, the practical embodiment having such a structure that an insulating film on a pixel electrode PX is selectively removed will be described while including a variation example.

Figure 22:
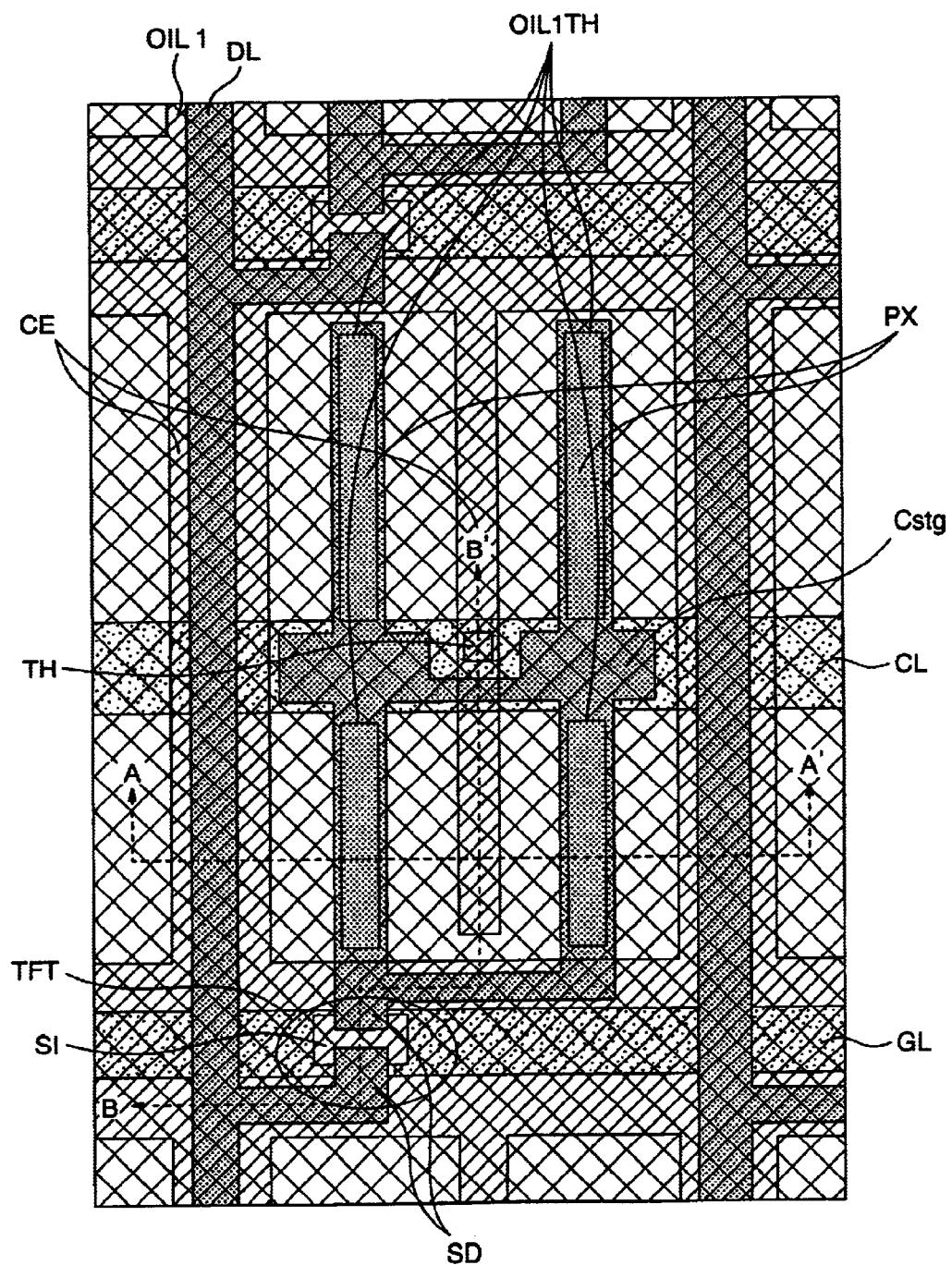
FIG. 22 is a plan view showing a unit pixel in an active-matrix liquid crystal display apparatus according to Embodiment 3 of the present invention, that is, in the structure in which an insulating film OIL1 on the pixel electrode PX is selectively removed as compared with Embodiment 2.

FIG. 22 is a plan view showing a unit pixel of an active-matrix liquid crystal display apparatus, which is a basic of Embodiment 3 of the present invention.

Figure 23:
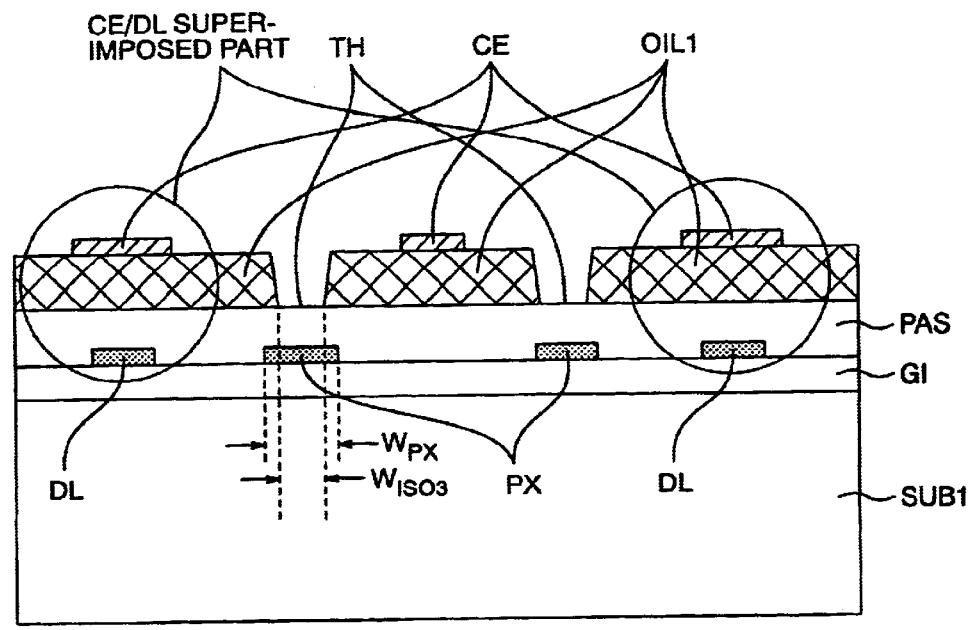
FIG. 23 is a section view taken along line A–A' shown in FIG. 22.
Figure 24:
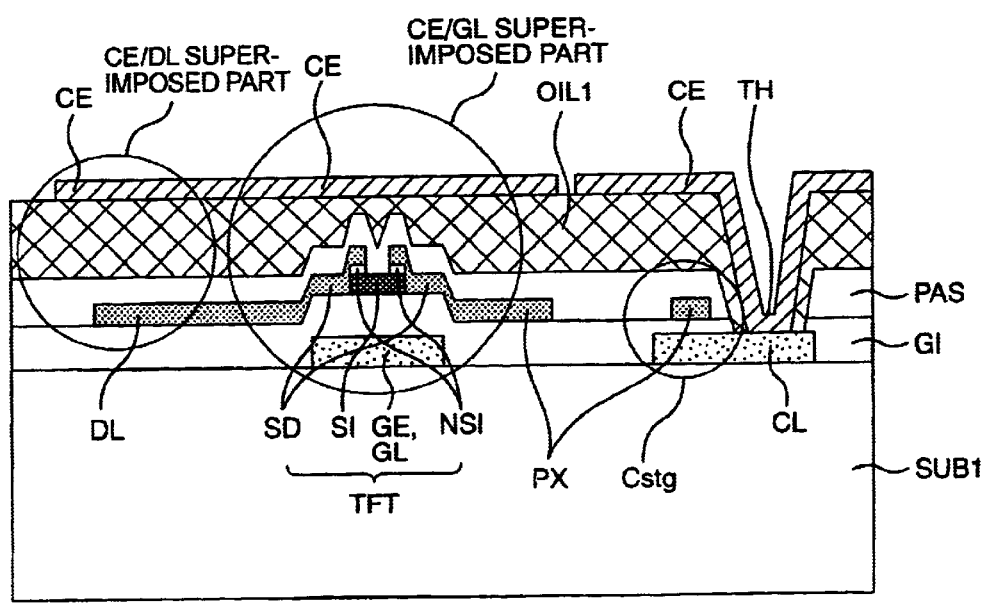
FIG. 24 is a section view taken along line B–B' shown in FIG. 22.

FIG. 23 is a section view taken along line A–A' shown in FIG. 22 and FIG. 24 is a section view taken along line B–B' shown in FIG. 22.

Embodiment 3 is configured such that a coating type insulating film OIL1 for reducing a capacity is formed entirely on a substrate except for the pixel electrode PX, a through hole TH for connecting electrode wiring, and an exposed part for connecting terminals, as composed with Embodiment 2 having the data signal wiring DL and the scanning signal wiring GL superimposed on the common signal electrode CE.

In other words, the coating type insulating film OIL1 on the pixel electrode PX is selectively removed on the superimposed part according to the pattern of the pixel electrode PX. The same effects can be achieved as Embodiment 2 regarding the effect of shielding an electric field on wiring, the effect of reducing a parasitic capacity of wiring, and the effect of reducing an increase in driving voltage of liquid crystal.

In Embodiment 3, the coating type insulating film OIL1 is formed on substantially the entire substrate. Thus, even when a defect such as a pin hole, a crack, and a poor adhesion part on a step height on a gate insulating film GI and a surface protective film PAS of a thin-film transistor TFT, it is possible to extend a region which benefits from the filling and covering effects of the coating type insulating film OIL1.

Further, it is possible to prevent an etching solution from reaching an electrode and a wiring surface of a lower layer via the defective part when the common signal electrode CE is processed on the top layer. Hence, a region for preventing dissolution of the electrode and wiring can be also expanded.

As shown in FIG. 24, the common signal wiring CL and the common signal electrode CE are connected to each other via the through hole TH.

In Embodiment 3, the through hole TH of the coating type insulating film OIL1 is smaller in diameter than those of the surface protective film PAS and the gate insulating film GI of the thin-film transistor. The surface protective film PAS and the gate insulating film GI are processed collectively. This aims at reducing a break when the common signal electrode CE passes on a step height of the end of the through hole TH.

The through hole TH is formed by collectively processing the surface protective film PAS and the gate insulating film GI of the thin film transistor. The end of the through hole TH is filled into the coating type insulating film OIL1. Thus, the final shape of the step on the end of the through hole TH is determined by the shape of the coating type insulating film OIL1.

In Embodiment 3, a photo-image material is used as the coating type insulating film OIL1.

With this arrangement, the step height on the end of the through hole TH is made smooth and a shape having a gentle surface can be achieved. Consequently, the common signal electrode CE can readily pass on the step, thereby reducing defects resulted from a break.

Moreover, in Embodiment 3, a pattern width WIS03 μm of the coating type insulating film OIL1, which is selectively removed according to the pattern of the pixel electrode PX, is smaller than a pattern width WPX um of the pixel electrode PX (WIS03<WPX).

Hence, a step height appearing on the pattern end of the coating type insulating film OIL1, which is selectively removed, is disposed in the pixel electrode PX pattern. Thus, it is possible to prevent a defect on picture quality such as a coating defect of the upper orientation film on the step height, an initial orientation defect of liquid crystal, and abnormal switching (domain) of liquid crystal.

Figure 25:
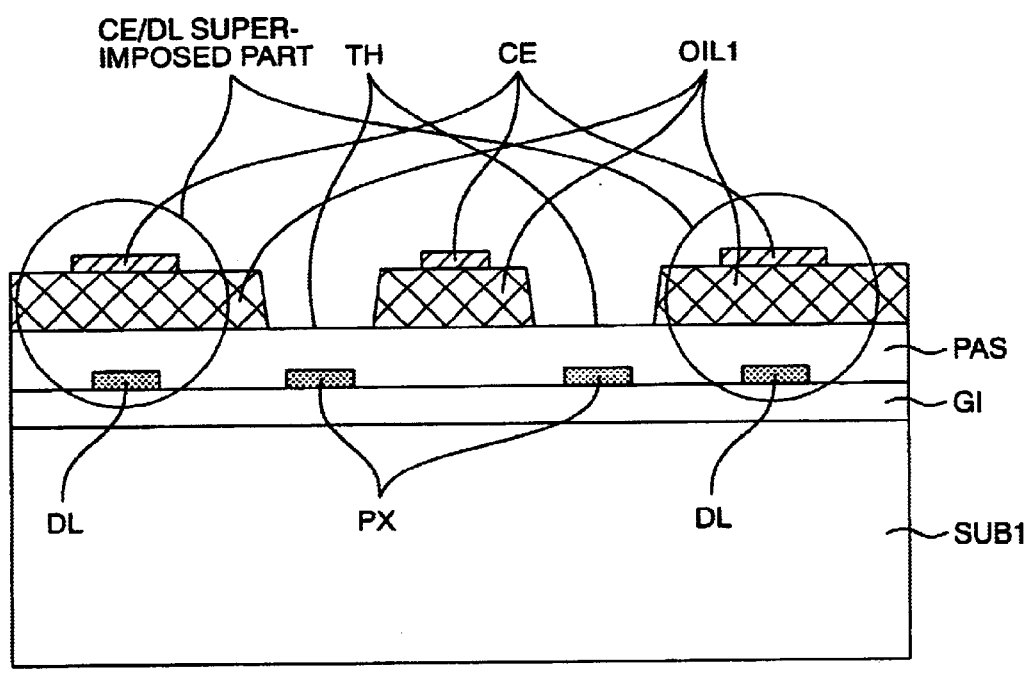
FIG. 25 is a section view taken along line A–A' showing the structure of Embodiment 3 in which the pattern of an insulating film OIL1 is changed.

FIG. 25 is a section view taken along A–A' showing the structure of Embodiment 3 in which the pattern of the insulating film OIL1 is changed in FIG. 23. When the influence of degradation in picture quality is negligible, the degradation being resulted from a step height on the pattern end of the insulating film OIL1, like Embodiment 3, a pattern width WIS03 of the insulating film OIL1 may be larger than a width WPX of the pixel electrode PX (WIS03>WPX).

Figure 26:
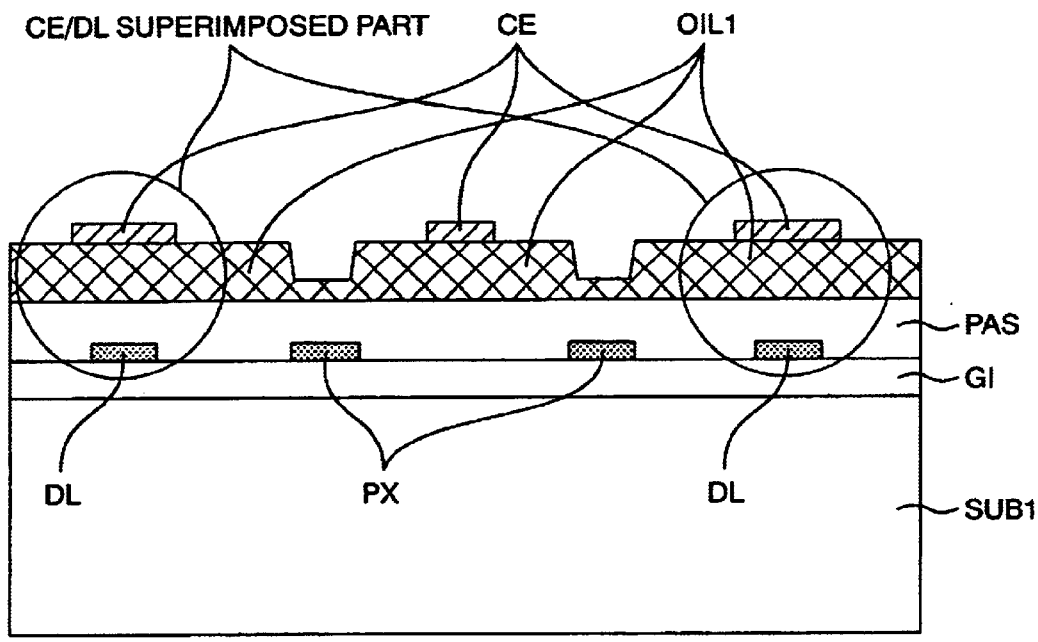
FIG. 26 is a section view taken along line A–A' of structure in which the insulating film OIL1 on the pixel electrode PX is selectively reduced in thickness as a first application example of Embodiment 3.

FIG. 26 is a section view taken along line A–A' as a first application example of Embodiment 3, in which the coating type insulating film OIL1 is selectively reduced in thickness on the pixel electrode PX.

A plan view of a unit pixel is similar to that of FIG. 22.

To be specific, a part of the through hole TH pattern is reduced in thickness on the coating type insulating film OIL1 of FIG. 22.

Embodiment 3 is an example in which the coating type insulating film OIL1 remains on the pixel electrode PX with a thickness sufficiently small enough to avoid a large increase in a driving voltage of liquid crystal. Hence, since the coating type insulating film OIL1 can also cover and protect the pixel electrode PX, it is possible to prevent an etching solution from reaching the surface of the pixel electrode PX on a lower layer via a defective part on the surface protective film PAS of the thin-film transistor TFT when the common signal electrode CE is processed on the top layer. It is also possible to prevent dissolution of the pixel electrode PX.

In Embodiment 3, the following measure is applicable as a method for selectively reducing a thickness of the insulating film OIL1.

When an insulating film of a photo-image forming type is used as the coating type insulating film OIL1, for example, an exposure mask for a multi-gradation photo lithography is used. Besides, it is possible to reduce the thickness of the part of the coating type insulating film OIL1 by adjusting of an exposing strength of the film OIL1 in multiple step with a plurality of exposure masks and varying etching characteristics of the film OIL1 against a developing solution.

In either case, it is necessary to completely remove the coating type insulating film OIL1 from the through hole TH and an exposed part for the connection of terminals. Thus, three-step adjustment is necessary for a region where the coating type insulating film OIL1 remains, a region decreasing in thickness, and a region for complete removal.

Further, the pattern of the coating type insulating film OIL1 may be formed by etching after two photo lithography processes using photoresist patterns.

For example, the pattern may be formed by dry etching method using a thermosetting insulating film and oxygen as reaction gas.

In this case, it is necessary to increase a thickness of the resist, which is used in the photo lithography process, in consideration of a thickness reduced by dry etching.

Figure 27:
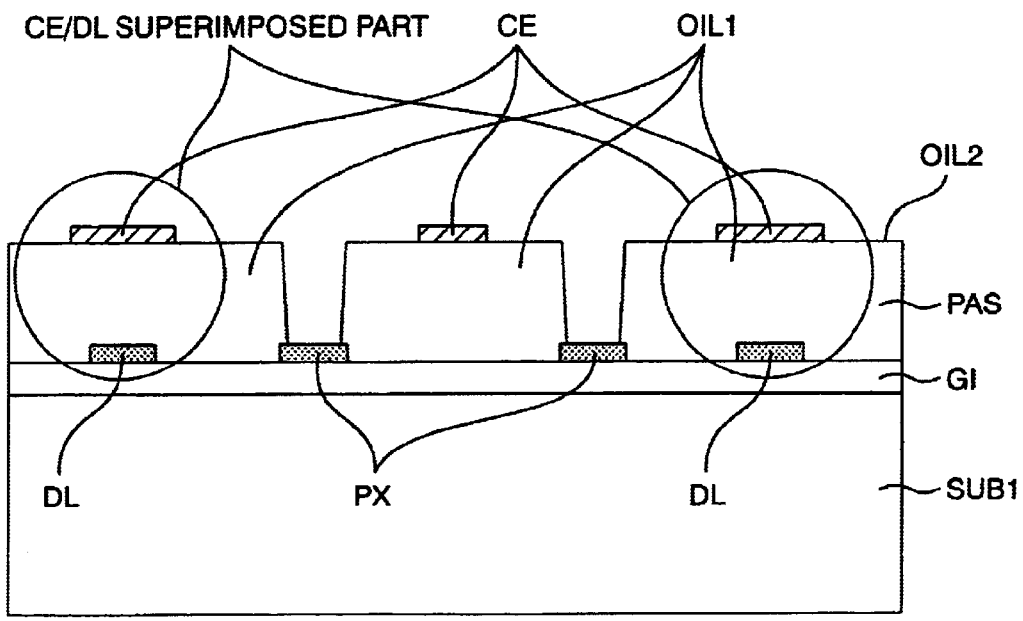
FIG. 27 is a section view taken along line A-A' showing structure in which a surface protective film PAS of a TFT is selectively removed as a second application example of Embodiment 3, the surface protective film PAS serving as an insulating film on the pixel electrode PX.

FIG. 27 is a section view taken along line A–A' as a second application example of Embodiment 3, in which the surface protective film PAS of the TFT is selectively removed. The surface protective film PAS serves as an insulating film on the pixel electrode.

A plan view of a unit pixel is similar to that of FIG. 22.

To be specific, the pattern of the coating type insulating film OIL1 of FIG. 22 is replaced with the surface protective film PAS of the TFT.

In Embodiment 3, the coating type insulating film OIL1 is not formed selectively.

Therefore, a parasitic capacity of wiring is reduced on a superimposed part of the data signal wiring DL, the scanning signal wiring GL, and the common signal electrode CE as long as a thickness of the surface protective film PAS of the TFT can be increased.

To be specific, a silicon nitride film ($\epsilon=6.7$) is used as the surface protective film PAS of the TFT.

According to Embodiment 3, the surface protective film PAS of the TFT that is disposed on the pixel electrode is selectively removed from a super-imposing part of wiring on the pixel electrode PX. Thus, as compared with a conventional structure, an increase in driving voltage of liquid crystal is further reduced rather than held down.

Reasons of this effect are as follows.

As described above, a driving voltage of liquid crystal is increased because the insulating film disposed on the pixel electrode PX forms a capacity connected in series with liquid crystal and a voltage applied between the common signal electrode CE and the pixel electrode PX is partially absorbed.

In Embodiment 3, when the insulating film disposed on the pixel electrode PX is selectively removed in the conventional structure, a liquid crystal layer LC is additionally disposed instead of the insulating layer on the selectively removed region.

Regarding a driving voltage of the conventional structure, a magnitude of a driving voltage in a selectively removed structure is determined by a permittivity value of liquid crystal which is enhanced from the TFT substrate (SUB1) to the CF substrate (SUB2) when a voltage is applied to liquid crystal additionally disposed in the selectively removed region.

When a voltage is applied to additionally disposed liquid crystal, in the case where a permittivity value evaluated from the TFT substrate (SUB1) to the CF substrate (SUB2) is higher than a permittivity of the selectively removed insulating film, a capacity of the region is larger than that of the conventional structure, and a voltage drop can be accordingly reduced in the selectively removed region.

Consequently, it is possible to apply voltage to liquid crystal more effectively, thereby reducing a driving voltage.

When a voltage is applied to liquid crystal disposed on the selectively removed region, a permittivity value evaluated from the TFT substrate (SUB 1) to the CF substrate (SUB2) is perpendicular to a director of liquid crystal in the case where Δϵ of liquid crystal is negative. When Δϵ of liquid crystal is positive, the permittivity is in parallel with a director of liquid crystal.

Here, in the case where Δϵ of liquid crystal is negative, a permittivity value evaluated from the TFT substrate (SUB1) to the CF substrate (SUB2) is perpendicular to the director of liquid crystal even when no voltage is applied. In the case where As of liquid crystal is positive, and no voltage is applied to liquid crystal, the permittivity is also perpendicular to the director of liquid crystal. Therefore, a permittivity value is generally lower than that of the selectively removed silicon nitride film ($\epsilon=6.7$).

When a voltage is applied, an electric field is generated perpendicularly to the TFT substrate (SUB1) on liquid crystal of a region on which the insulating film is removed selectively.

In most liquid crystal on the region selectively removed, an orientating state changes according to the electric field direction, and the director of liquid crystal is set perpendicular to the TFT substrate (SUB1). Therefore, when a voltage is applied to liquid crystal, a permittivity value evaluated from the TFT substrate (SUB1) to the CF substrate (SUB2) is in parallel with the director of liquid crystal.

In general, a permittivity perpendicular to the director of liquid crystal with negative As and a permittivity in parallel with the director of liquid crystal with positive $\Delta\epsilon$ are larger than that of the silicon nitride film. Hence, a driving voltage is actually reduced in most cases.

In Embodiment 3, the silicon nitride film is used as the surface protective film PAS of the selectively removed TFT. The effect of Embodiment 3 is not limited to the above structure. For example, when a silicon oxide film, which is smaller in permittivity than the silicon nitride film, is used as the selectively removed insulating film, the effect is more remarkable.

Next, a third application example of Embodiment 3 will be explained in the following referring to FIGS. 28 to 36A to 36E'.

To be specific, in Embodiment 3 shown in FIGS. 22 to 25, the TFT surface protective film PAS on a lower layer is also selectively removed in a collective manner by using the pattern of the coating type insulating film OIL, which is selectively removed on the pixel electrode PX.

Embodiment 3 presents a structure in which a driving voltage of liquid crystal can be lowered while reducing a parasitic capacity of wiring.

Figure 28:
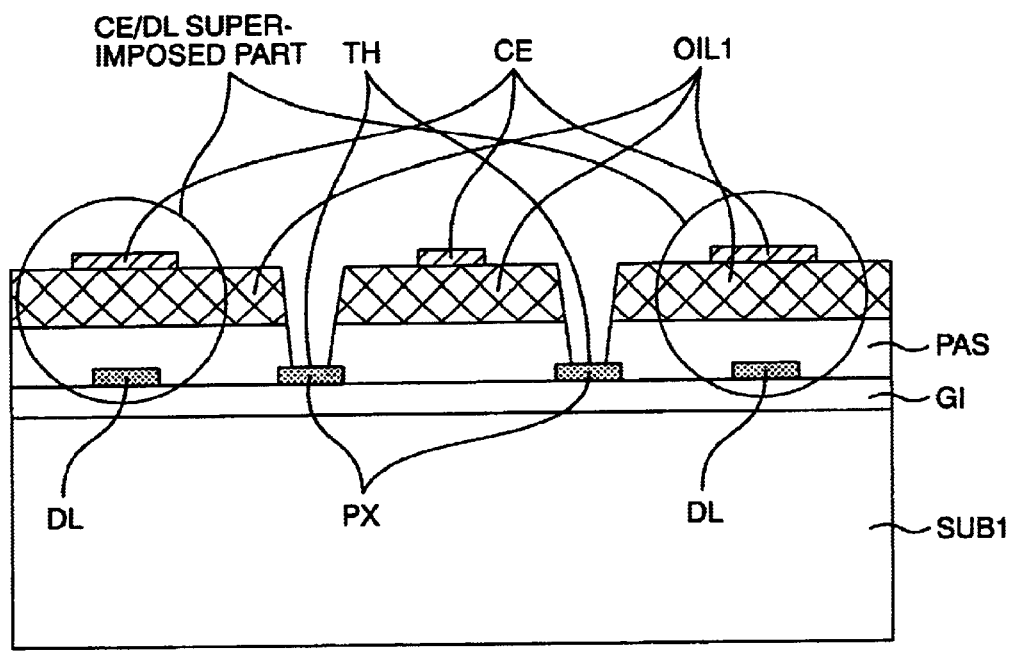
FIG. 28 is a section view taken along line A–A' showing the structure in which the TFT surface protective film PAS on a lower layer is also selectively removed in a collective manner by using the insulating film OIL pattern removed selectively on the pixel electrode PX, as a third application example of Embodiment 3.
Figure 29:
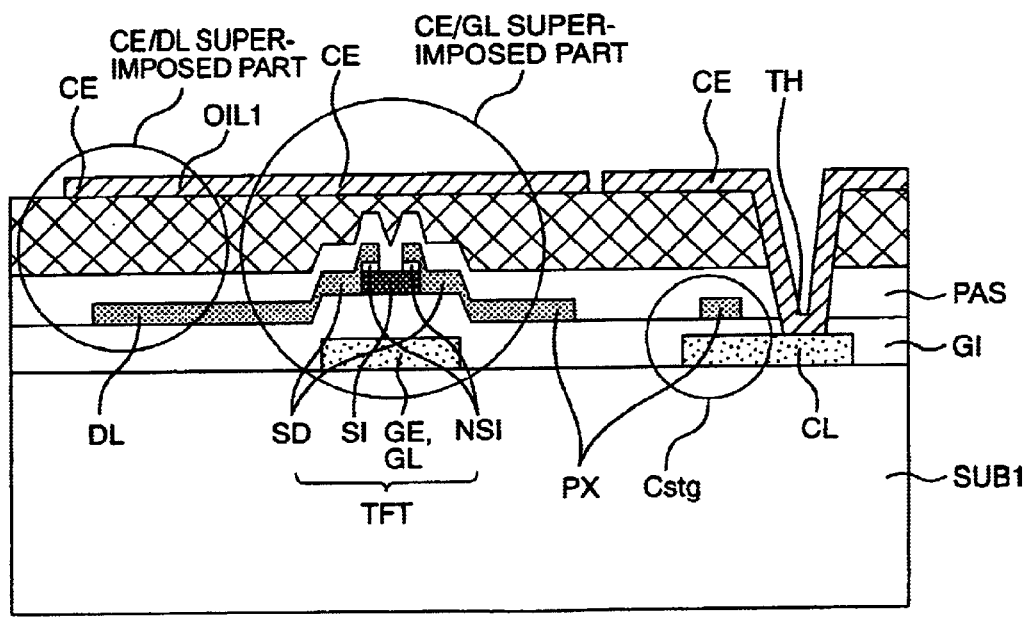
FIG. 29 is a section view taken along line B–B' shown in FIG. 28.

FIG. 28 is a section view taken along line A–A' shown in FIG. 22. The coating type insulating film OIL1 and the TFT surface protective film PAS are selectively removed in a collective manner. FIG. 29 is a section view taken along line B–B' shown in FIG. 22.

With this structure, the pattern of the coating type insulating film OIL1 and the through hole TH of the TFT surface protective film PAS and the gate insulating film GI can be collectively processed in a single photo lithography process. Thus, a photo lithography process can be omitted for one time, thereby simplifying the process. Consequently, a through put can be improved and the production cost can be lowered.

Further, the surface protective film of the thin-film transistor TFT and the gate insulating film GI can be removed without causing misalignment of the pattern of the first coating type insulating film OIL1. Thus, an alignment margin of selective forming pattern or a selective removing pattern can be reduced on the pixel electrode PX, the through hole TH, and an exposed terminal. A region contributing to an aperture ratio of a pixel can be increased accordingly.

In Embodiment 3, the laminated films including the coating type insulating film OIL1 and the surface protective film PAS of the TFT are removed collectively. Hence, a height of a produced laminated step pattern is further increased and a more serious side effect is likely to occur by the step height.

In Embodiment 3, a pattern width WIOS3 μm of the coating type insulating film OIL1 is also smaller than a pattern width WPX μm of the pixel electrode PX (WIOS3<WPX). The coating type insulating film OIL1 is selectively removed according to the pattern of the pixel electrode PX.

Therefore, a step height produced at the end of the laminated step pattern, which is composed of the coating type insulating film OIL1 and the surface protective film PAS of the TFT which are selectively removed in a collective manner, is placed within the pattern of the pixel electrode PX. Hence, it is possible to prevent a defect on picture quality such as a coating defect of the upper orientation film on the step, an initial orientating defect of liquid crystal, and abnormal switching (domain) of liquid crystal.

Moreover, when the above method is adopted, even in the case where the coating type insulating film OIL1 for reducing a capacity is arbitrarily formed on the superimposed part of wiring, it is possible to selectively remove the insulating film on the pixel electrode PX and to further reduce a driving voltage of liquid crystal, as compared with the conventional structure.

Figure 30:
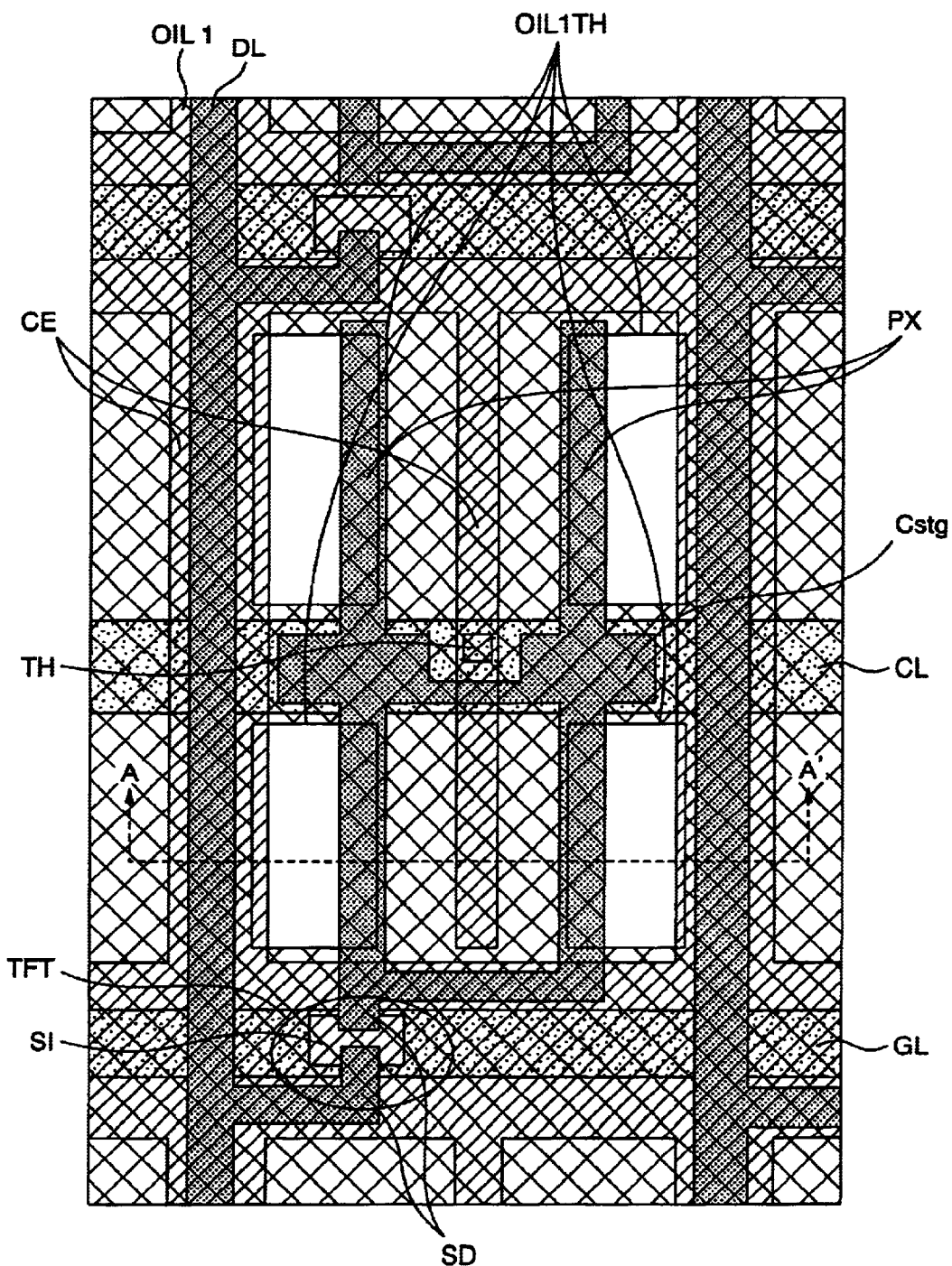
FIG. 30 is a plan view showing a unit pixel in the structure of Embodiments 3 in which the pattern of the insulating film OIL1 presented in FIGS. 28 and 29 is changed.

FIG. 30 is a plan view showing a unit pixel of Embodiment 3, in which the pattern of the insulating film OIL1 is changed in the third application example shown in FIGS. 28 and 29.

Figure 31:
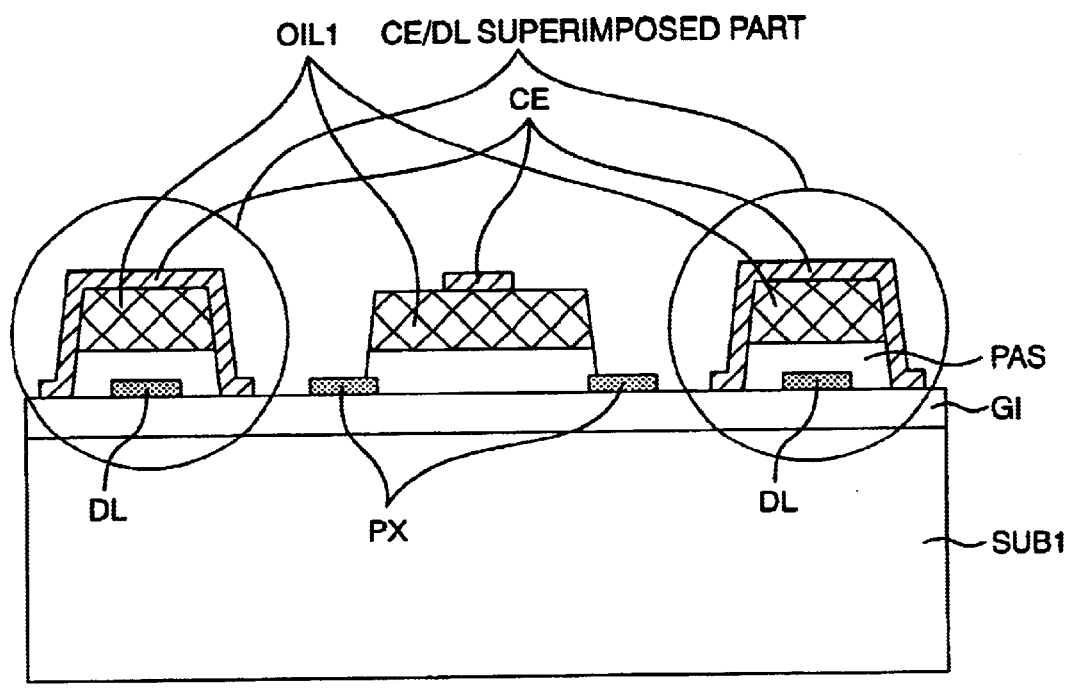
FIG. 31 is a section view taken along line A–A' shown in FIG. 30.

FIG. 31 is a section view taken along line A–A' shown in FIG. 30.

In Embodiment 3, an opening of the coating type insulating film OIL1, which is selectively removed, is larger than that showing in FIG. 22.

Hence, it is possible to suppress an opening defect resulted from a processing defect of the coating type insulating film OIL1.

In Embodiment 3, one of the ends of the pattern of the coating type insulating film OIL1 is placed within the pattern of the common signal electrode and the other end is placed within the pattern of the pixel electrode PX. Thus, it is possible to prevent a defect on picture quality which is derived from a coating defect of the upper orientation film on a laminated step composed of the coating type insulating film OIL1, the surface protective film PAS, which are selectively removed in a collective manner, an initial orientating defect of liquid crystal, abnormal switching (domain) of liquid crystal, and so on.

In Embodiment 3, the insulating films on the pixel electrode PX are collectively removed such that the surface of the pixel electrode PX is exposed. The insulating films increase a driving voltage of liquid crystal. Thus, it is necessary to arrange the pattern of the coating type insulating film OIL1 and the pattern of the common signal electrode CE in order to prevent a short circuit due to superimposition of the patterns of the common signal electrode CE and the pixel electrode PX which are formed after the insulating film is removed.

Additionally, it is necessary to form and process the pattern of the common signal electrode CE on the exposed pixel electrode PX in Embodiment 3.

Therefore, to selective etching on a conductive film material for forming the common signal electrode CE on an upper layer is required as compared to a conductive film material for forming the pixel electrode PX on a low layer.

For example, when the pixel electrode PX is made of Al or is composed of an Al alloy film and the common signal electrode CE is composed of a transparent conductive film, for example, it is necessary to use a material such as an amorphous ITO, IZO, and IGO as the common signal electrode CE. These materials are etched with a weak acid such as oxalic acid having a low etching rate of Al.

When the pixel electrode PX and the common signal electrode CE are composed of a transparent conductive film, for example, a material such as an amorphous ITO, IZO, and IGO is used as the common signal electrode CE on an upper layer. It is possible to perform etching with a weak acid such as oxalic acid at a low etching rate. As the pixel electrode PX on a lower layer, a polycrystalline material such as ITO, IZO, and IGO is used which has a lower etching rate by about two orders than the amorphous ITO, IZO, and IGO.

Besides, the conductive film materials of the pixel electrode PX and the common signal electrode CE are not particularly limited in the structure in which the pixel electrode PX is not exposed when the common signal electrode CE is processed, to be specific, regarding some examples and so on described in some of Embodiments 1, 2, and 3 of the present invention.

Figure 32A:
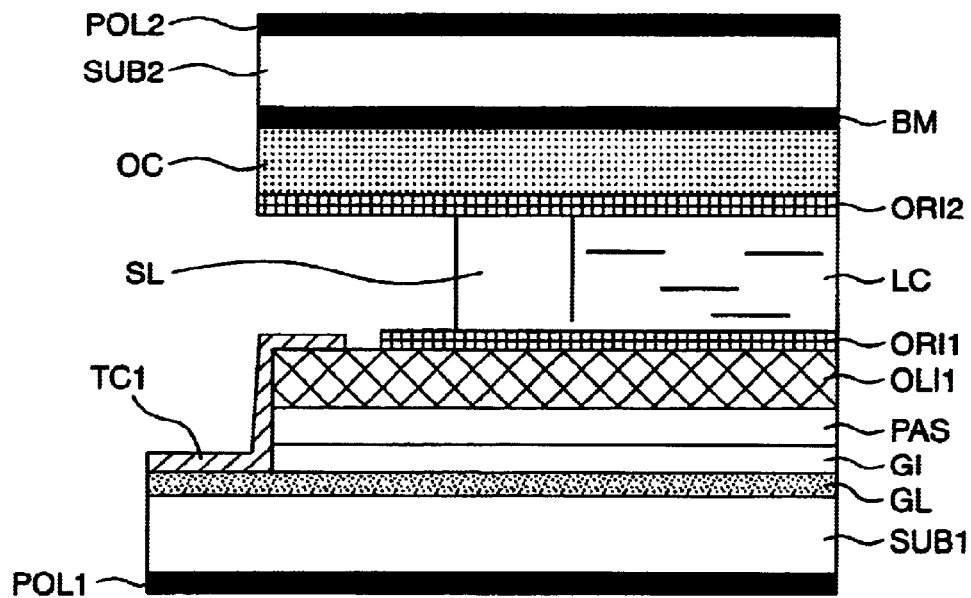
FIGS. 32A and 32B are sectional schematic diagrams showing ends of the substrate of the active-matrix liquid crystal display apparatus according to the third application example of Embodiment 3 of the present invention as presented in FIGS. 28 to 32.
Figure 32B:
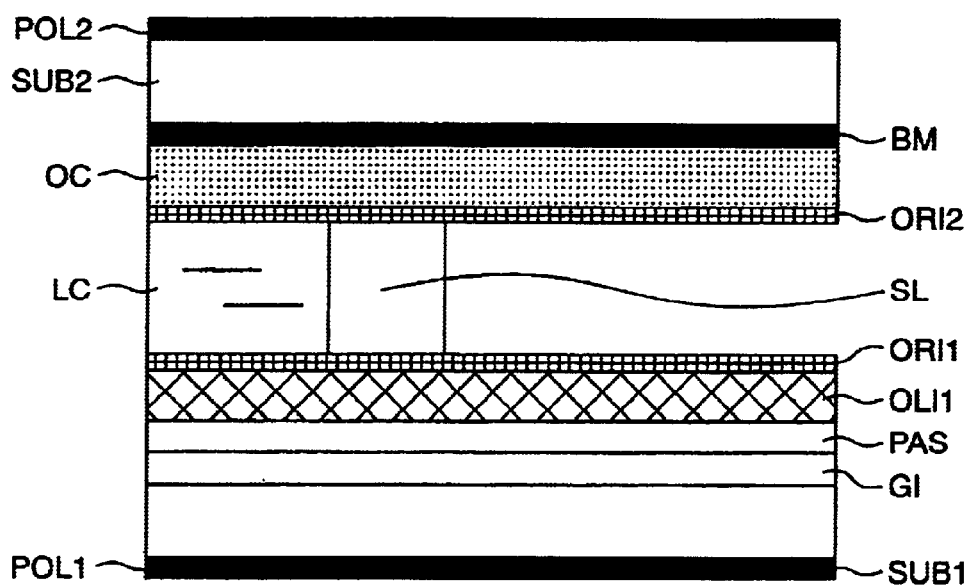

FIGS. 32A and 32B are section views showing an end of the substrate of the active-matrix liquid crystal display apparatus of a third application example shown in FIGS. 28 to 32A and 32B.

Figure 33A:
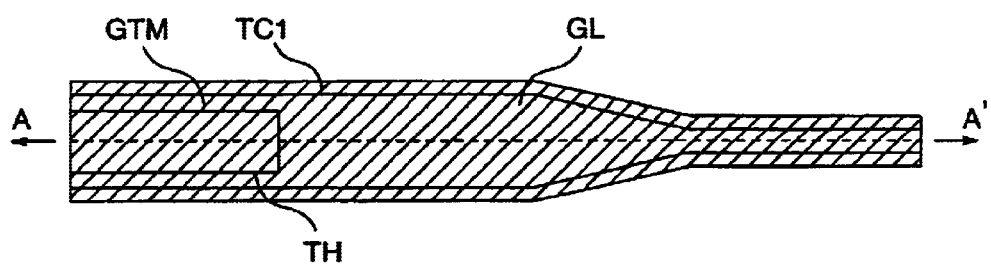
FIGS. 33A and 33B are a plan view showing a main part of a terminal GTM for scanning signal wiring GL and a section view taken along line A–A' of the active-matrix liquid crystal display apparatus of the third application example according to Embodiment 3 of the present invention.
Figure 33B:
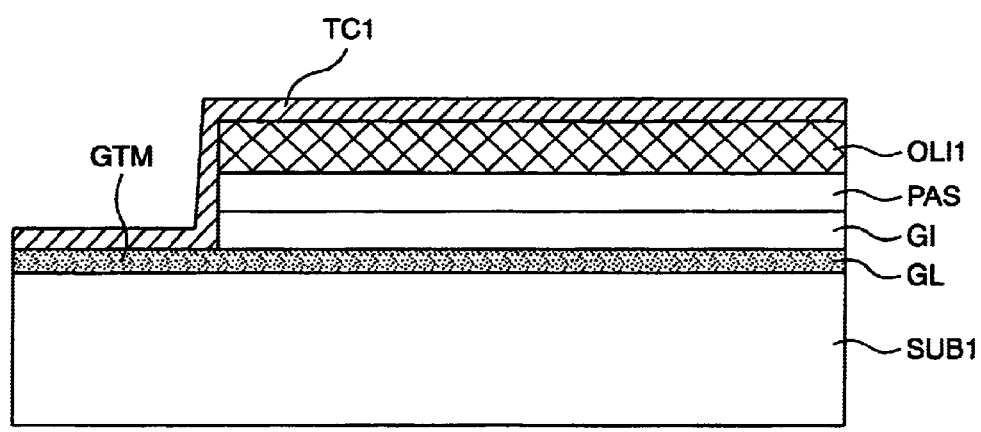
Figure 34A:
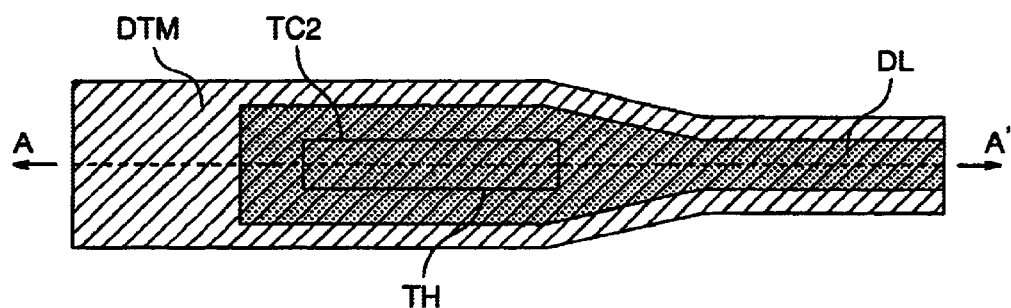
FIGS. 34A and 34B are a plan view showing a main part of a terminal DTM for data signal wiring DL and a section view taken along line A–A' of the active-matrix liquid crystal display apparatus of the third application example according to Embodiment 3 of the present invention.
Figure 34B:
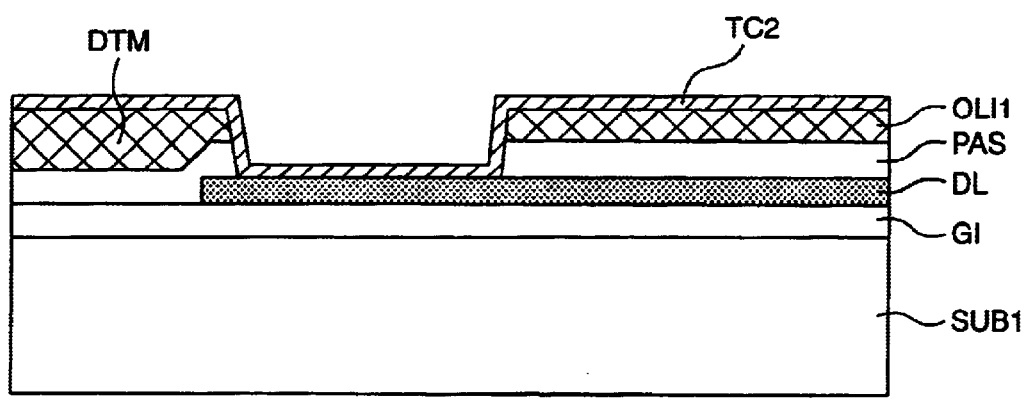

FIG. 33A is a plan view showing a main part of the terminal GTM for the scanning signal wiring GL. FIG. 33B is a section view taken along line A–A' shown in FIG. 33A. FIG. 34A is a plan view showing a main part of the terminal DTM for the video image signal wiring DL. FIG. 34B is a section view taken along line A–A' shown in FIG. 34A.

The plan views and section views of FIGS. 32A and 32B to 34A and 34B in Embodiment 3 are identical to those of FIGS. 12 to 14 of Embodiment 1 except for the presence and absence of the coating type insulating film OIL1, which is formed or removed selectively. Thus, the explanation thereof is omitted.

Next, a specific example of a forming method regarding a third application example shown in FIGS. 28 to 32A and 32B, will be explained in the following referring to FIGS. 35 and 36A to 36E'.

Figure 35:
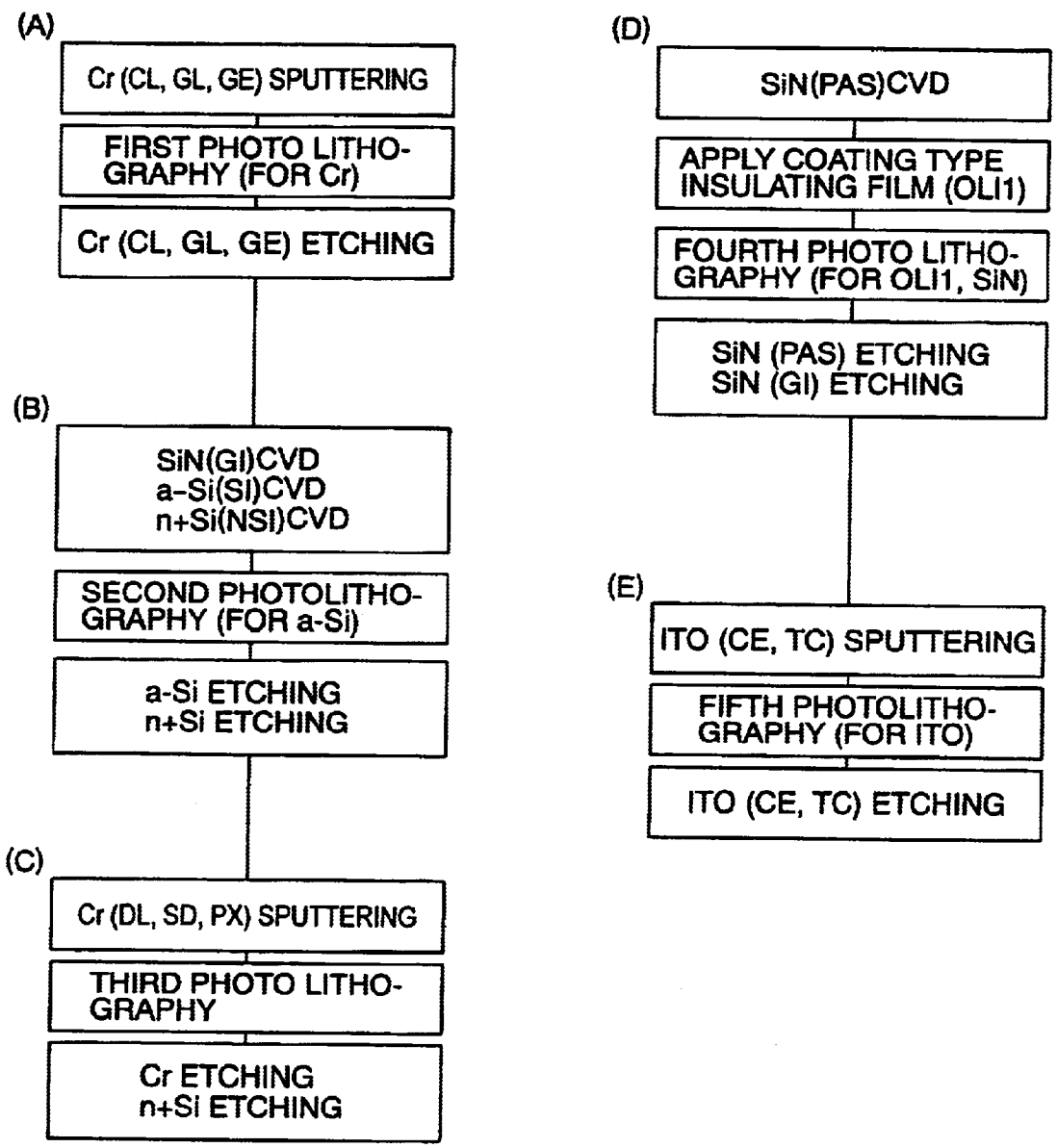
FIG. 35 is a diagram showing a process flow for realizing the structure of the active-matrix liquid crystal display apparatus of the third application example according to Embodiment 3 of the present invention.

FIG. 35 is a diagram showing a process flow for realizing the structure of the active-matrix liquid crystal display apparatus of the third application example shown in FIGS. 28 to 32A and 32B.

FIGS. 36A to 36E are section views taken along line A–A' shown in FIG. 22 and FIGS. 36A to 36E' are section views taken along line B–B' shown in FIG. 22 when the TFT substrate is manufactured according to the process flow of FIG. 35.

In the third application example, to be specific, the TFT substrate SUB1 is completed after photo lithography processes including five steps (A) to (E).

Each step of the present invention will be explained in order of steps.

Step (A)

The transparent insulating substrate SUB1 is prepared and a Cr film is formed entirely thereon with a thickness of 100 to 500 nm, preferably 150 to 350 nm, by a method such as a sputtering method.

Next, the Cr film is selectively etched using photo lithography technique, and the scanning signal electrode GE, the scanning signal wiring GL, and the common signal wiring CL are formed in a pixel region.

Further, the extended parts of the scanning signal wiring GL and the common signal wiring CL are respectively formed in the regions for forming the scanning signal wiring terminal GTM and the common signal wiring terminal CTM. These are not shown in FIGS. 16A to 16F'.

Step (B)

A silicon nitride film serving as a gate insulating film GI is entirely formed on the transparent insulating substrate SUB1 with a thickness of about 200 to 700 nm, preferably 300 to 500 nm by a method such as plasma CVD method.

Further, an amorphous silicon film is formed on the entire surface of the gate insulating film GI, with a thickness of 50 to 300 nm, preferably 100 to 200 nm by a method such as plasma CVD. An amorphous silicon film having phosphorus doped as n-type impurity is successively formed with a thickness of 10 to 100 nm, preferably 20 to 60 nm. These films are stacked in this order.

Next, the amorphous silicon film is etched using photo lithography technique and the semiconductor layer SI of the thin-film transistor TFT is formed in the pixel region.

Step (C)

A Cr film is entirely formed on the surface of the transparent insulating substrate SUB1 with a thickness of 100 to 500 nm, preferably 150 to 350 nm by a method such as a sputtering method.

Next, the Cr film is etched using photo lithography technique. The data signal electrode SD serving as the source and drain electrodes of the thin-film transistor TFT, the pixel electrode PX formed by extending the data signal electrode SD, and the data signal wiring DL serving as an extended part of the data signal electrode SD are formed in the pixel region.

In a region for forming the terminal DTM for the data signal wiring DL, an extended part of the data signal wiring DL is formed. This is not shown in FIGS. 16A to 16F'.

Thereafter, etching is performed on an amorphous silicon film, which has phosphorus doped as n-type impurity, with a pattern of the etched Cr film serving as a mask.

A part of the pixel electrode PX forms a storage capacity CSTG between the common signal wiring CL via the gate insulating film GI.

Step (D)

A silicon nitride film serving as the surface protective film PAS of the thin-film transistor TFT is entirely formed on the surface of the transparent insulating substrate SUB1 with a thickness of 200 to 900 nm, preferably 300 to 500 nm by a method such as plasma CVD method.

Subsequently, the coating type insulating film OIL1, which is composed of an insulating, is entirely applied onto the transparent insulating substrate SUB1 with a thickness of 0.5 to 4 $\mu$m, preferably 0.5 to 1.5 $\mu$m by a method such as a spin coating method. The insulating film such as SOG film, contains an organic resins such as polymide polymer, acrylic polymer, epoxy polymer, benzicyclobutene polymer and so on, or an inorganic polymer with Si which is soluble in an organic solvent.

Subsequently, the pattern of the coating type insulating film OIL1 is selectively formed using photo lithography technique.

A region to be selectively formed is substantially the entire surface of the substrate except for the following parts: a through hole TH for electrically connecting the common signal electrode CE, which is formed on the pixel electrode PX in step (E) and is composed of a transparent conductive film, and the common signal wiring CL in a pixel region, a through hole TH for exposing the extended part of the scanning signal wiring GL in a region for forming the scanning signal wiring terminal GTM, a through hole TH for exposing the extended part of the common signal wiring CL in a region for forming the common signal wiring terminal GTM, and a through hole TH for exposing the extended part of the data signal wiring DL in a region for forming the data signal wiring terminal DTM.

Subsequently, the surface protective film PAS of the TFT and the gate insulating film GI positioned on a lower layer of the surface protective film PAS are etched collectively with the pattern of the coating type insulating film OIL1, which is formed selectively, serves as a mask. Thus a through holes TH are formed for exposing the surface of the pixel electrode PX and partially exposing the common signal wiring CL.

In addition, a through hole TH for exposing the extended part of the scanning signal wiring GL is formed in a region for forming the scanning signal wiring terminal GTM, and a through hole TH for exposing the extended part of the common signal wiring CL is formed in a region for forming the common signal wiring terminal GTM, and a through hole TH for exposing the extended part of the data signal wiring DL is formed in a region for forming the data signal wiring terminal DTM.

Step (E)

An ITO film serving as a transparent conductive film is entirely formed on the surface of the transparent insulating substrate SUB1 with a thickness of 50 to 300 nm, preferably 70 to 200 nm by a method such as a sputtering method.

And then, the ITO film is etched using photo lithography technique. The common signal electrode CE connected to the common signal wiring CL via the through hole TH is formed in a pixel region.

The common signal electrode CE is disposed so as to be partially superimposed on the data signal wiring DL and the scanning signal wiring GL via the coating type insulating film OIL1, which is an inter-layer insulating film formed selectively.

Pad electrodes TC1 for the scanning signal wiring terminal GTM and for the common signal wiring terminal CTM are respectively formed in a region for forming the scanning signal wiring terminal GTM and in a region for forming the common signal wiring terminal CTM. These are not shown in FIG. 16.

A pad electrode TC2 for forming the data signal wiring terminal DTM is formed in a region for forming the data signal wiring terminal DTM.

In Embodiment 3, it is possible to perform selective etching the ITO film constituting the common signal electrode CE on an upper layer, as compared with the Cr film constituting the pixel electrode PX on a lower layer. Thus, a condition of selective etching is achieved.

The TFT substrate is completed with the above-mentioned steps.

In Embodiment 3, an insulating film of a photo-image forming type is used as the coating type insulating film OIL1. Naturally, instead of using as a mask the coating type insulating film OIL1 formed in the step (D), selective removal and formation may be carried out on a three-layer laminated film composed of the coating type insulating film OIL1, the surface protective film PAS of the TFT, and the gate insulating film GI positioned on a lower layer of the surface protective film PAS, by collective etching in a photo lithography process using resist.

For example, etching may be carried out by a dry etching method using oxygen as reaction gas while a thermosetting insulating film is used as the coating type insulating film OIL1.

In this case, it is necessary to increase a thickness of the resist, which is used in the photo lithography process, in consideration of a thickness reduced by etching carried out on the coating type insulating film OIL1, and the following collective dry etching performed on the surface protective film PAS of the TFT and the gate insulating film GI positioned on a lower layer of the surface protective film PAS.

[Embodiment 4]

A liquid crystal display apparatus in Embodiment 4 of the present invention will be explained referring to FIGS. 37 and 38.

Figure 37:
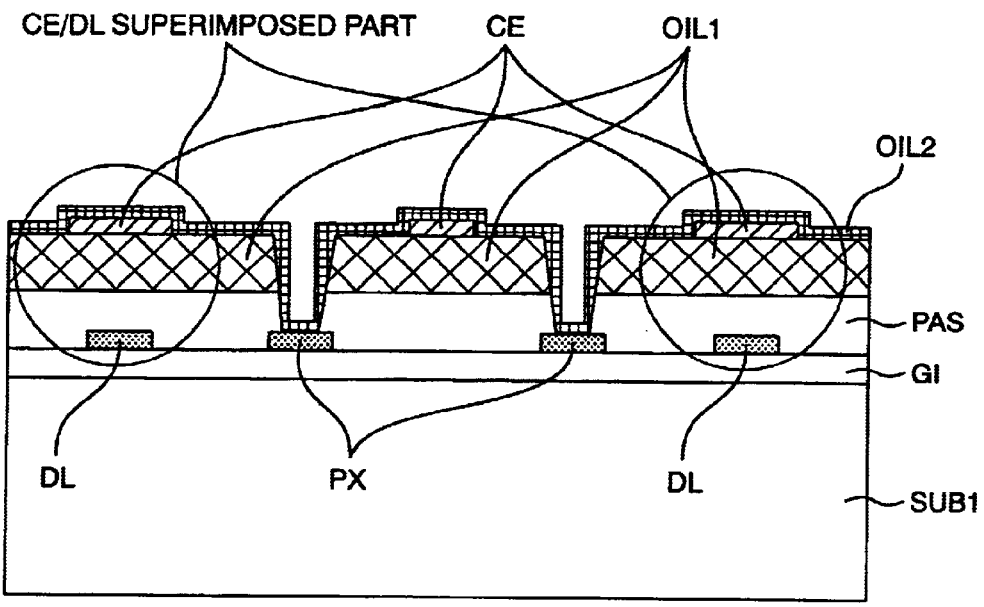
FIG. 37 is a section view taken along line A–A' shown in Embodiment 4 of the present invention, in which after an insulating film OIL1 and a surface protective film PAS of a TFT are selectively removed, an insulating film OIL2 is formed so as to cover an exposed pixel electrode PX and a common signal electrode CE, in Embodiment 3 of FIGS. 28 and 29.
Figure 38:
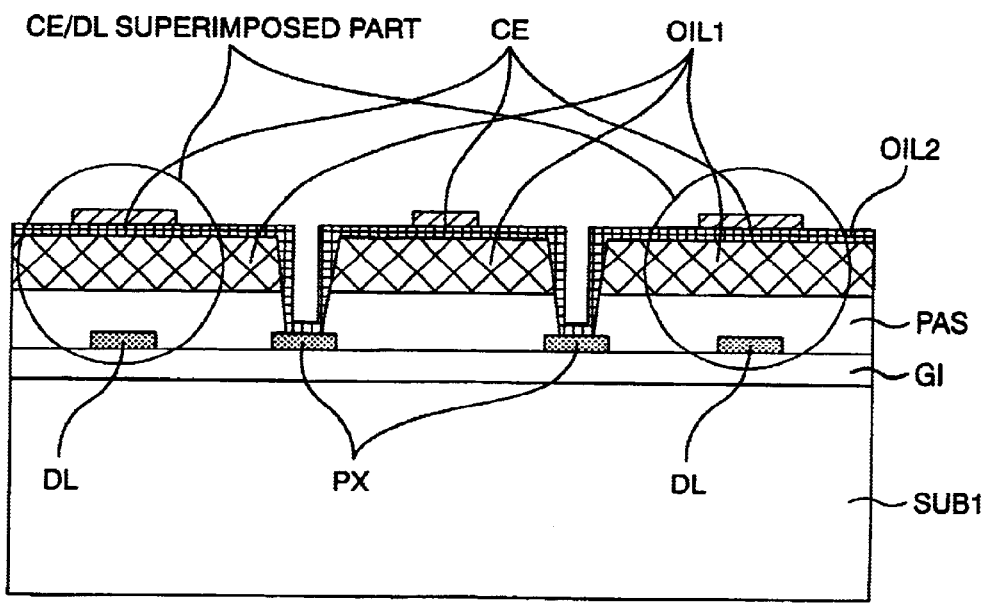
FIG. 38 is a section view taken along line A–A' in the structure in which an insulating film OIL2 is formed so as to cover only the surface of the pixel electrode PX and the common signal electrode CE is exposed, in Embodiment 4 of FIG. 37.

In FIGS. 37 and 38, the same members as Embodiment 1 are indicated by the same reference numerals and the description thereof is omitted.

In Embodiment 4, an insulating film OIL2 is formed so as to cover an exposed pixel electrode PX and a common signal electrode CE of Embodiment 3.

The insulating film OIL2 is a second coating type insulating film for improving a yield of manufacture process.

FIG. 37 is a section view taken along line A–A' in structure of Embodiment 4, in which is configured after an insulating film OIL1 and a surface protective film PAS are selectively removed for the pixel electrode and a TFT, respectively, the insulating film OIL2 is formed so as to cover the exposed pixel electrode PX and the common signal electrode CE.

Since the insulating film OIL2 covers the surface, it is possible to prevent degradation in picture quality of the liquid crystal display apparatus. The degradation occurs because a conductive film material for forming the pixel electrode PX and the common signal electrode CE partially flows into liquid crystal and electric/optical characteristics of liquid crystal are affected, for example, a resistivity decreases.

Further, when the insulating film OIL2 is deposited to cover a step height appearing on an end of the pattern of the common signal electrode CE the coating type insulating film OIL1 and an end of a laminated pattern that are selectively removed of the surface protective film PAS of the TFT, it is possible to prevent a defect on picture quality such as a coating defect of an upper orientation film on the step height, an initial orientating defect of liquid crystal, and abnormal switching (domain) of liquid crystal.

As described above, the insulating film existing on the common signal electrode CE and the pixel electrode PX increases a driving voltage of liquid crystal. Hence, it is necessary to set a type (permittivity) and a thickness of the insulating film OIL2 in order to suppress an increase in driving voltage within a permissible range.

Moreover, since a concentrated electric field can be lowered on the surface of the electrodes by exposing the pixel electrode PX and common signal electrode CE, it is possible to prevent the occurrence of an afterimage that is caused by locally applying a strong electric field on liquid crystal LC and an orientating film ORI1.

A coating type insulating film, is formed as the second coating type insulating film OIL2. The insulating film such as SOG film, contains an organic resins such as polyimide polymer, acrylic polymer, epoxy polymer, benzicyclobutene polymer and so on, or an inorganic polymer with Si which is soluble in an organic solvent. The thickness is preferably set at 0.1 to 0.5 $\mu$m.

Besides, when the second coating type insulating film OIL2 is formed, it is necessary to form a through hole TH for exposing an extended part of scanning signal wiring GL in a region for forming a scanning signal wiring terminal GTM, a through hole TH for exposing an extended part of common signal wiring CL in a region for forming a common signal wiring terminal GTM, and a through hole TH for exposing an extended part of data signal wiring DL in a region for forming a data signal wiring terminal DTM.

FIG. 38 is a section view taken along line A–A' in the structure of Embodiment 4, the insulating film OIL2 is formed so as to cover only the surface of the pixel electrode PX and the common signal electrode CE is exposed, as compared with FIG. 37.

In Embodiment 4, the second coating type insulating film OIL2 is formed so as to cover and protect substantially the entire surface of the substrate as well as the surface of the exposed pixel electrode PX after the coating type insulating film OIL1 on the pixel electrode PX and the surface protective film PAS of the TFT are collectively removed and the surface of the pixel electrode PX is exposed.

Therefore, in the following step, when the common signal electrode CE is processed on the pixel electrode PX, it is possible to prevent dissolution and a break on the pixel electrode PX on a low layer and an electrode and wiring on a lower layer. Dissolution and a break occurs through a defective part such as a crack and a pin hole on the surface protective film PAS of the TFT and on the gate insulating film GI and a poor adhesion part on a step height.

Hence, it is not necessary to form and process a pattern of the common signal electrode CE on the exposed pixel electrode PX. Thus, a conductive film material for forming the pixel electrode PX and the common signal electrode CE can be arbitrarily selected independently the constraint that a conductive film material for forming the common signal electrode CE on an upper layer is selectively etched in contrast to a conductive film material for forming the pixel electrode PX on a lower layer.

Further, unlike the structure of Embodiment 4 shown in FIG. 37, the second coating type insulating film OIL2 exists only on the pixel electrode PX, not on the common signal electrode CE.

Therefore, as compared with Embodiment 4 of FIG. 37, it is possible to reduce a side effect of an increased driving voltage of liquid crystal because of the presence of the second coating type insulating film OIL2 on the common signal electrode CE.

However, the effects of covering and protecting a surface cannot be obtained on the common signal electrode CE.

In Embodiment 4, the second coating type insulating film OIL2 is added for protecting the pixel electrode PX and the wiring and electrodes on a lower layer when the common signal electrode CE is processed. Even when only a single-layer coating type insulating film OIL1 is provided and the OIL1 has the effect of OIL2 of the present embodiment, the same effect can be achieved.

In this case, an insulating film of the OIL1 is not entirely removed in a region other than a selectively formed region but a thin film remains therein, which is similar to the structure shown in FIG. 26 of the first application example of Embodiment 3.

Besides, when the second coating type insulating film OIL2 is formed, it is necessary to form a through hole TH for electrically connecting the common signal electrode CE and the common signal wiring CL, a through hole TH for exposing an extended part of the scanning signal wiring CL in a region for forming the scanning signal wiring terminal GTM, and a through hole TH for exposing an extended part of the data signal wiring DL in a region for forming the data signal wiring terminal DTM.

[Embodiment 5]

Figure 39:
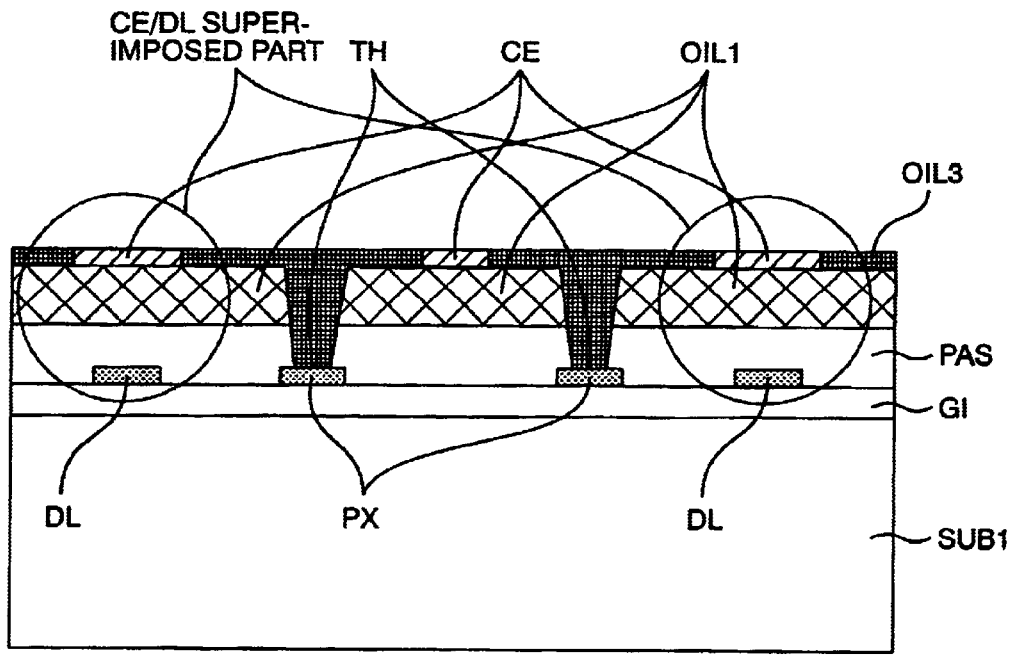
FIG. 39 is a section view taken along line A–A' shown in Embodiment 5 of the present invention, in which an insulating film OIL3 is formed so as to fill and flatten a step height formed by selectively removing an insulating film OIL1 on a pixel electrode and a surface protective film PAS of a TFT, in Embodiment 3 shown in FIGS. 28 and 29.

A liquid crystal display apparatus in Embodiment 5 of the present invention will be explained referring to FIG. 39. FIG. 39 is a section view taken along line A–A' shown in Embodiment 5 of the present invention.

In FIG. 39, the same members as Embodiment 3 are indicated by the same reference numerals and the description thereof is omitted.

In Embodiment 5, the insulating film OIL3 is formed so as to fill and flatten a step height, which is formed by selectively removing the coating type insulating films OIL1 and the surface protective film PAS of the TFT on the pixel electrode after the process flow of Embodiment 3, shown in FIGS. 28 and 29.

OIL3 is an insulating film which is additionally inserted for reducing a driving voltage. The insulating film OIL3 is characterized by a permittivity which is higher than that of an insulating film selectively removed in the same region.

In Embodiment 5, when an insulating film having a high permittivity is additionally formed on a region where the coating type insulating film OIL1 on the pixel electrode and the surface protective film PAS of the TFT are selectively removed, it is possible to reduce a driving voltage regardless of a permittivity of liquid crystal. In this case, the insulating film OIL3 with a higher permittivity is more effective to reduce the driving voltage.

Further, according to Embodiment 5, the insulating film OIL3 is disposed on a step height region where the coating type insulating OIL1 and the surface protective film PAS of the TFT are selectively removed. Thus, a difference in a gap of a step height of liquid crystal LC, which is sandwiched between the TFT substrate (SUB1) and the CF substrate (SUB2), can be set substantially at 0, thereby providing good display without any display defect caused by variations in gap.

Besides, when the third coating type insulating film OIL3 is formed, it is necessary to form a through hole TH for exposing an extended part of the scanning signal wiring GL in a region for forming a scanning signal wiring terminal GTM, a through hole TH for exposing an extended part of common signal wiring CL in a region for forming a common signal wiring terminal GTM, a through hole TH for exposing an extended part of data signal wiring DL in a region for forming a data signal wiring terminal DTM.

[Embodiment 6]

A liquid crystal display apparatus in Embodiment 6 of the present invention will be explained referring to FIGS. 40 and 41.

In Embodiment 6, a TFT surface protective film PAS of a lower layer is omitted and an insulating film OIL1, which is formed by selectively removing a pixel electrode PX, also acts as the TFT surface protective film.

Figure 40:
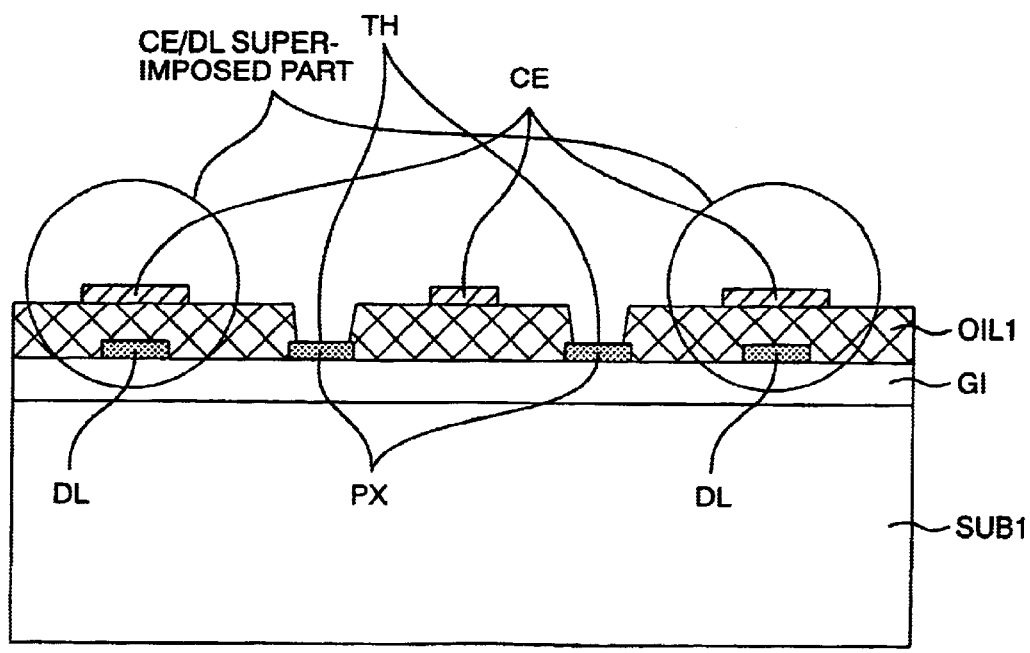
FIG. 40 is a section view taken along line A–A' shown in Embodiment 6 of the present invention, in which a TFT surface protective film PAS on a lower layer is omitted, and an insulating film OIL1 formed by selective removal on a pixel electrode PX acts as a TFT surface protective film in Embodiment 3.
Figure 41:
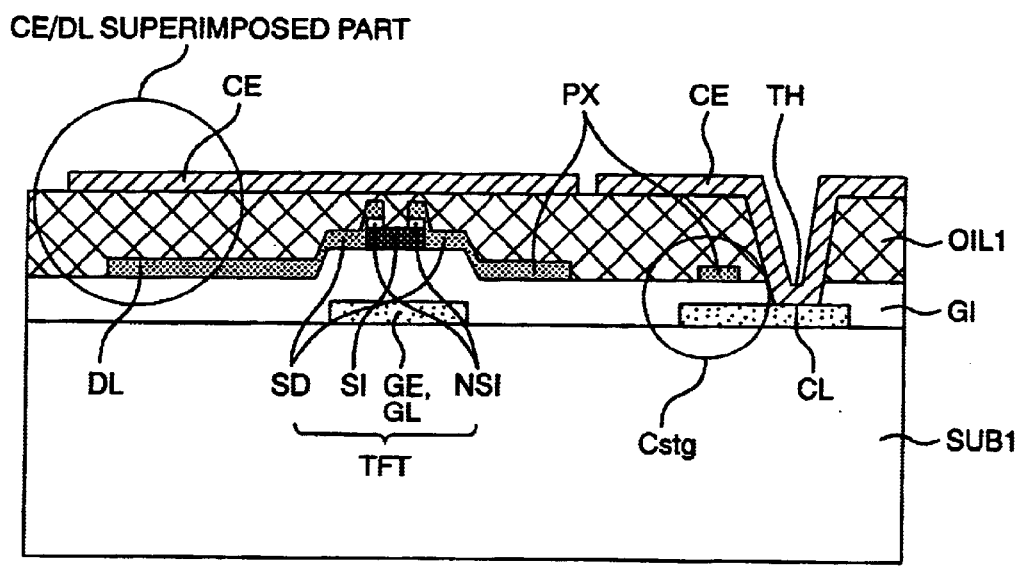
FIG. 41 is a section view taken along line B–B' shown in Embodiment 6 of FIG. 40.

FIG. 40 is a section view taken along line A–A' of the structure in which the coating type insulating film OIL1 acts as the TFT surface protective film PAS in Embodiment 3 of FIG. 22. FIG. 41 is a section view taken along line B–B'.

An inorganic insulating film such as a silicon nitride film, which is formed by a vacuum process including plasma CVD method, is normally used as the TFT surface protective film PAS. Dry etching method, which is a vacuum process, is used for processing the TFT surface protective film PAS.

Problems in a sedimentary film formation method such as plasma CVD method are requirement of a longer time with a film thickness in the film formation and a lowing of a through put.

Meanwhile, when a coating type organic insulating film is used as the surface protective film PAS of the TFT, a method such as a spin coating method is used for forming the coating type insulating film OIL1. In spin coating method, a film thickness is controlled by adjusting a viscosity of a coating material. Thus, a thickness can be readily increased unlike the sedimentary CVD method.

A film-forming facility is inexpensive because no vacuum process is used.

Additionally, when a coating type insulating film of a photo-image forming type is used, it is not necessary to conduct another dry etching step and it is possible to selectively form the coating type insulating film OIL1 on a superimposed part of wiring and selectively remove the OIL1 on the pixel electrode PX with ease.

Namely, when the coating type insulating film OIL1 also acts as the surface protective film PAS, it is possible to omit the steps of forming and processing the TFT surface protective film PAS, thereby improving a through put and largely cutting the production cost.

Moreover, the filling and covering effects due to formation of OIL1 results in restoration of a pin hole, a crack, a poor adhesion part on a step height on a lower layer that are problems on the surface protective film PAS of the TFT. Thus, it is possible to effectively suppress corrosion, dissolution, and a break on various electrodes and wiring that are disposed on a lower layer, thereby remarkably improving a yield of process.

Also, it is also possible to reduce a short circuit caused by an interlayer insulating defect of a superimposed part of wiring. A reduction in parasitic capacity of wiring on a superimposed part is compatible with a reduction in driving voltage of liquid crystal.

In Embodiment 6, a back channel of an amorphous silicon film SI, which is a channel semiconductor layer of the TFT, is in direct contact with the coating type insulating film OIL1.

Therefore, TFT characteristics may be affected, for example, a fixed charge is generated on a contact interface and leakage current increases on the back channel, regarding film qualities and material characteristics of the amorphous silicon film SI and the coating type insulating film OIL1. In this case, another processing step is required for protecting the back channel.

In Embodiment 6, before formation of the coating type insulating film OIL1, a polar surface of the back channel of the amorphous silicon film SI is oxidized and protected by an oxygen plasma processing, in which the substrate is entirely exposed to oxygen plasma.

In Embodiment 6 above the inventors explained the structure in which a black matrix BM extending in y direction and x direction on a CF substrate (SUB2) is omitted by using the function of a common signal electrode CE serving as a self-shielding film. The common signal electrode CE is superimposed on a data signal wiring DL and scanning signal wiring GL. The black matrix BM may remain as a reflection protecting film on the black matrix BM on the CF substrate (SUB2).

In the above embodiment, the scanning signal wiring GL is extended in x direction and is disposed in parallel in y direction and the data signal wiring DL is extended in y direction and is disposed in parallel in x direction. The scanning signal wiring GL and the data signal wiring DL may be replaced with each other.

Further, in Embodiment 6, the scanning signal wiring GL is disposed on a lower layer and the data signal wiring DL is disposed on an upper layer via a gate insulating film GI serving as an interlayer insulating film. The scanning signal wiring GL and the data signal wiring DL may be switched in the order of layers.

Besides, the order of layers of the wiring has a relationship the structure of the TFT (described later).

Moreover, in Embodiment 6, the pixel electrode PX and the common signal electrode CL are extended and disposed in parallel in the same direction as the data signal wiring DL. The electrodes may be extended and disposed in parallel in the same direction as the scanning signal wiring GL.

The structure of FIG. 8, in which the common signal electrode CE and the pixel electrode PX are provided with bent parts, is shown as a variation of structure in Embodiment 1. However, the structure is not limited to Embodiment 1. When the structure is applied to the other embodiments, a multi-domain effect is added to the effects exerted in the embodiments.

In the above embodiment, on the same layer as the scanning signal electrode GE and the scanning signal wiring GL, metallic wiring made of the same material in the same process is used as the common signal wiring CL. On the same layer as the data signal electrode SD and the data signal wiring DL, the metal wiring may be made of the same material in the same process.

Also, as described in the embodiments, the electrode materials constituting the common signal electrode CE are extended as they are to serve as the common signal wiring CL.

As described in the embodiments, the electrode materials constituting the data signal electrode SD may be extended as they are to form the pixel electrode PX.

A material such as Cr is used for the metallic film constituting the scanning signal electrode GE, the scanning signal wiring GL, the data signal electrode SD, the data signal wiring DL, the common signal wiring CL, and the pixel electrode PX. For example, the electrodes and wiring may be made of a high melting point metal such as Cr, Mo, Ta, Ti, Nb, and W that are formed by sputtering and evaporation, an alloy thereof, metal silicide, or a low-resistance wiring material such as Al, and an Al alloy, or the electrodes and wiring may be composed of a laminated film composed of the above materials.

Further, as described in the embodiments, the pixel electrode, the common signal electrode CE, and the common signal wiring CL may be composed of transparent conductive films.

In the above embodiments, ITO (indium tin oxide) is used for the transparent conductive film. It is also possible to adopt another transparent conductive film made of indium oxide such as IZO (indium zinc oxide) and IGO (indium germanium oxide) because any transparent conductive film can exert the same effect.

An amorphous silicon film-is used as a silicon film constituting an electrode NSI, which is composed of a silicon film doped with impurity. It is also possible to adopt a polycrystalline silicon film, which is formed, for example, by crystallizing the amorphous silicon film by heating or laser annealing.

As the gate insulating film GI and the protecting insulating film, a silicon nitride film formed by a method such as plasma CVD and sputtering is used. For example, the films may be composed of insulating films such as a silicon oxide film.

As the gate insulating film GI, it is also possible to adopt an insulating film formed by partially oxidizing a surface of metal constituting the scanning signal electrode GE and the scanning signal wiring GL.

The structure including the surface protective film PAS of the thin-film transistor TFT is explained in the above embodiments as an example of the structure of the interlayer insulating film on a superimposed part of wiring. The following cases are all applicable: a laminated film having the gate insulating film GI and the surface protective film PAS of the thin-film transistor TFT is included; any one of the gate insulating film GI or the surface protective film PAS of the thin-film transistor TFT is not provided; and any of them is not provided.

The above embodiments described that the structure of the present invention is adopted for the liquid crystal display apparatus using an invert staggered TFT for a switching element. The present invention is not limited to the above structure. For example, the present invention is applicable to a variety of TFT structures such as a positive stagger-type TFT and a coplanar TFT.

[Embodiment 7]

A liquid crystal display apparatus according to Embodiment 1 of the present invention will be explained referring to FIGS. 42 and 43.

Figure 42:
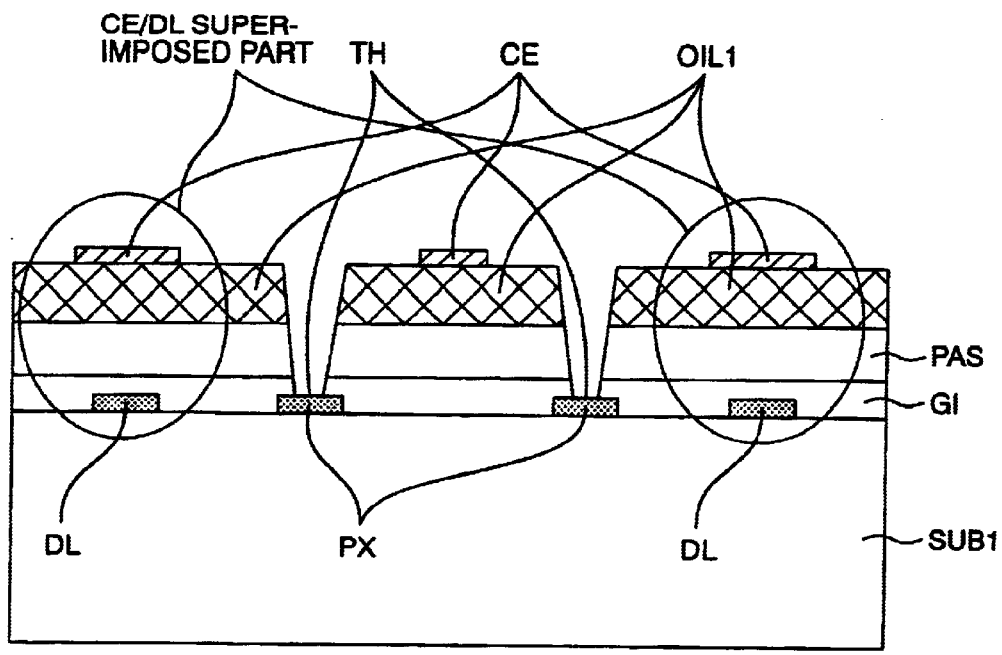
FIG. 42 is a section view taken along line A–A' shown in Embodiment 7 of the present invention in which a positive stagger-type TFT is used for a switching element of a pixel, that is, in the structure in which a TFT surface protective film PAS on a lower layer and a gate insulating film GI are also selectively removed in a collective manner by using an insulating film OIL1 pattern on the pixel electrode PX removed selectively in Embodiment 3.
Figure 43:
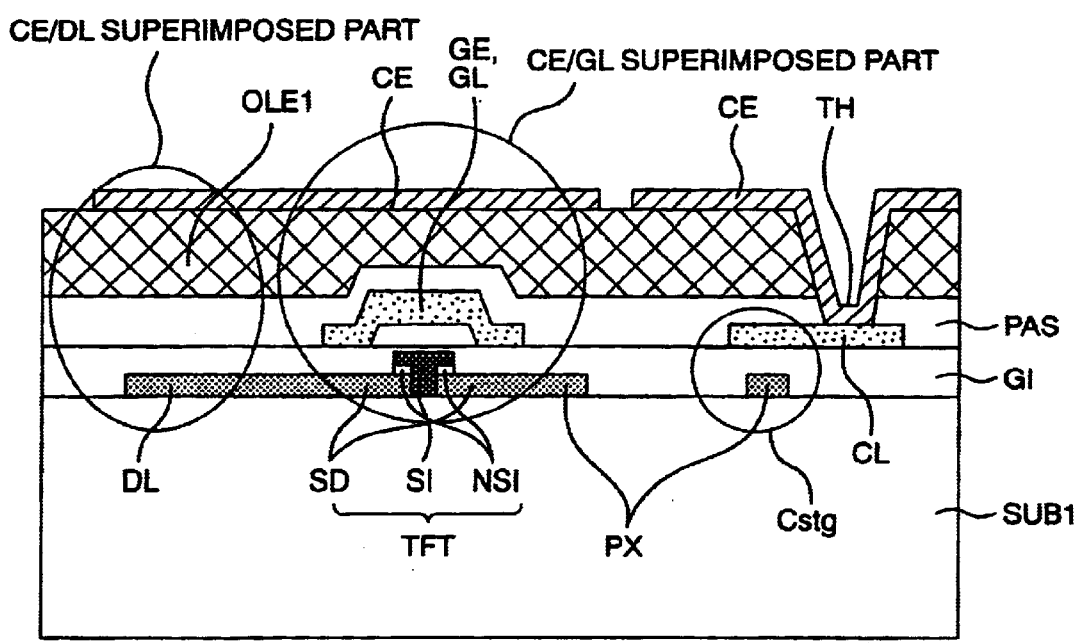
FIG. 43 is a section view taken along line B–B' shown in Embodiment 7 of FIG. 42.

FIGS. 42 and 43 show an embodiment of an active-matrix liquid crystal display apparatus according to Embodiment 7 of the present invention. To be specific, a positive stagger-type TFT is used for a switching element of a pixel in FIGS. 28 and 29 of Embodiment 3.

FIG. 42 is a section view taken along line A–A', and FIG. 43 is a section view taken along line B–B'.

In the case of the structure of the normal positive stagger-type TFT, the order of layers of the scanning signal wiring GL and the data signal wiring DL via the gate insulating film GI is reversed from the structure of the invert staggered TFT, which was discussed in the series of foregoing embodiments.

Therefore, when one of the data signal electrodes SD is extended to form the pixel electrode PX, the pixel electrode PX is disposed on the lowest layer.

An interlayer insulating film on a super-imposed part of the data signal wiring DL and the common signal electrode CE has a three-layer laminated insulating film composed of the gate insulating film GI, the surface protective film PAS of the TFT, and the first coating type insulating film OIL1.

Meanwhile, when the insulating films on the pixel electrode PX are collectively removed, not only the TFT surface protective film PAS on a lower layer but also the gate insulating film GI is selectively removed in a collective manner by using the insulating film OIL1 selectively removed on the pixel electrode PX.

Embodiment 7 using the structure of the positive stagger-type TFT also exerts the same effects of reducing a parasitic capacity of wiring and reducing a driving voltage of liquid crystal.

The present invention is not limited to the structures of the above-mentioned embodiments. Any structure is applicable as long as at least one of the number of insulating film layers, a film thickness of a material constituting the layers, and a permittivity of a material constituting the layers is different between the superimposed part of wiring and on the pixel electrode in order to reduce a parasitic capacity of the superimposed part of wiring and a driving voltage of liquid crystal.

According to the embodiments of the present invention, in the plane switching liquid crystal display apparatus in which the common signal electrode serving as a reference electrode for shielding an electric field is superimposed via the interlayer insulating film on at least one of the data signal wiring and the scanning signal wiring, and another interlayer insulating film for reducing a parasitic capacity is added on a superimposed part of wiring and is selectively formed on the pixel electrode, it is possible to reduce a parasitic capacity on a super-imposed part of wiring and to prevent a short circuit between wiring without increasing a driving voltage of liquid crystal.

Further, when the interlayer insulating film disposed on the pixel electrode in the conventional structure is selectively removed on a superimposed part of wiring, it is possible to increase a capacity connected in series with liquid crystal between the pixel electrode and the common signal electrode and to efficiently apply voltage to liquid crystal. Thus, a driving voltage can decrease.

Moreover, when the two effects are combined, a reduction in parasitic capacity of wiring is compatible with a reduction in driving voltage of liquid crystal.

Hence, it is possible to manufacture a high-permittivity and high-performance liquid crystal display apparatus with a high yield.

What is claimed is:

1. A liquid crystal display apparatus, comprising: a pair of substrates: and a liquid crystal layer sandwiched between the substrates, the pair of substrates including a first substrate having a plurality of scanning signal wiring, a plurality of data signal wiring intersecting the scanning signal wiring in a matrix form, and a plurality of thin-film transistors formed on the intersections, the liquid crystal display apparatus being configured such that at least a single pixel is formed in each region surrounded by the plurality of scanning signal wiring and data signal wiring, each pixel includes a common signal electrode, which is connected to a plurality of pixels via common signal wiring, and a pixel electrode connected to the corresponding thin-film transistor, and a voltage applied to the common signal electrode and the pixel electrode generates in the liquid crystal layer an electric field having a parallel component predominantly to the first substrate, wherein the common signal electrode and at least one of the data signal wiring and the scanning signal wiring are partially superimposed onto each other via an interlayer insulating film, the superimposed part forms a capacity, at least one of insulating films included in the interlayer insulating film is selectively formed at least on a part of a region on the pixel electrode at least in the superimposed part of the common signal electrode and at least one of the data signal wiring and the scanning wiring.

2. The liquid crystal display apparatus according to claim 1, wherein the interlayer insulating film is composed of a single layer and the single layer is selectively formed at least on a part of a region on the pixel electrode, the interlayer insulating film being formed on a superimposed part of the common signal electrode and at least one of signal wiring of the data signal wiring and the scanning signal wiring.

3. The liquid crystal display apparatus according to claim 2, wherein the interlayer insulating film is a part of a first insulating film serving as a gate insulating film of the thin-film transistor or a part of a second insulating film serving as a surface protecting film of the thin-film transistor.

4. The liquid crystal display apparatus according to claim 2, wherein the interlayer insulating film is a third insulating film other than a first insulating film serving as a gate insulating film of the thin-film transistor or a second insulating film serving as a surface protecting film of the thin-film transistor.

5. The liquid crystal display apparatus according to claim 4, wherein the third insulating film is a coating type insulating film.

6. The liquid crystal display apparatus according to claim 5, wherein the coating type insulating film is formed by a method such as printing and spin coating method, and the coating type insulating film is an organic resin insulating film or an insulating film containing Si.

7. The liquid crystal display apparatus according to claim 5, wherein the coating type insulating film used as the third insulating film is a photo-image type.

8. The liquid crystal display apparatus according to claim 4, wherein the first insulating film serving as the gate insulating film of the thin-film transistor, the second insulating film serving as the surface protecting film of the thin-film transistor, or a laminated film of the first insulating film and the second insulating film is collectively processed in a self-aligning manner by using a pattern of the third insulating film formed selectively, and at least on a part of a region on the pixel electrode, the first insulating film, the second insulating film, or the laminated film of the first and second insulating films is formed selectively.

9. The liquid crystal display apparatus according to claim 4, wherein the third insulating film has a thickness of 0.5 to 4.0 µm.

10. The liquid crystal display apparatus according to claim 4, wherein the third insulating film has a permittivity of 1.5 to 6.5.

11. The liquid crystal display apparatus according to claim 1, wherein the interlayer insulating film is composed of two layers, and at least one of the layers is selectively formed at least on a part of a region on the pixel electrode, the interlayer insulating film being formed on a superimposed part of the common signal electrode and at least one of signal wiring of the data signal wiring and the scanning signal wiring.

12. The liquid crystal display apparatus according to claim 11, wherein the interlayer insulating film is composed of two layers including a part of a first insulating film serving as a gate insulating film of the thin-film transistor and a part of a second insulating film serving as a surface protecting film of the thin-film transistor.

13. The liquid crystal display apparatus according to claim 11, wherein in the interlayer insulating film, one of the layers is a part of a first insulating film serving as a gate insulating film of the thin-film transistor or a part of a second insulating film serving as a surface protecting film of the thin-film transistor, and the other layer is a third insulating film other than the first insulating film and the second insulating film, the third insulating film being selectively formed at least on a part of a region on the pixel electrode.

14. The liquid crystal display apparatus according to claim 1, wherein the interlayer insulating film is composed of three or more layers, the insulating film being formed on a superimposed part of the common signal electrode and at least one of signal wiring of the data signal wiring and the scanning signal wiring, and at least one of the layers is selectively formed at least on a part of a region on the pixel electrode.

15. The liquid crystal display apparatus according to claim 14, wherein the interlayer insulating film includes all of a part of a first insulating film serving as a gate insulating film of the thin-film transistor, a part of a second insulating film serving as a surface protecting film of the thin-film transistor, and a third insulating film other than the first insulating film and the second insulating film, the third insulating film being selectively formed at least on a part of a region on the pixel electrode.

16. The liquid crystal display apparatus according to claim 1, wherein at least on a part of a region on the pixel electrode, a pattern of the interlayer insulating film, which is formed selectively on a superimposed part of the common signal electrode and at least one of signal wiring of the data signal wiring or the scanning signal wiring, is formed according to the pattern of the data signal wiring or the scanning signal wiring.

17. The liquid crystal display apparatus according to claim 16, wherein when a width of the data signal wiring is WDL, a width of the common signal electrode is WCOM1 on a part superimposed with the data signal wiring, and a width of the interlayer insulating film selectively formed according to the pattern of the data signal wiring is WIS01, WDL<WIS01<WCOM1 and WDL>0 or WDL<WCOM1<WIS01 and WDL>0 are established.

18. The liquid crystal display apparatus according to claim 16, wherein when a width of the scanning signal wiring is WGL, a width of the common signal electrode is WCOM2 on a part superimposed with the scanning signal wiring, and a width of the interlayer insulating film selectively formed according to the pattern of the scanning signal wiring is WIS02, WGL<WIS02<WCOM2 and WGL>0 or WGL<WCOM2<WIS02 and WGL>0 are established.

19. The liquid crystal display apparatus according to claim 1, wherein on the interlayer insulating film formed on a superimposed part of the common signal electrode and the data signal wiring, at least a part of the insulating film, which is formed at least on a part of a region on the pixel electrode, is selectively removed or reduced in thickness.

20. The liquid crystal display apparatus according to claim 19, wherein at least a part of the insulating film, which is formed at least on a part of a region on the pixel electrode, is selectively removed or reduced in thickness according to a pattern of the pixel electrode.

21. The liquid crystal display apparatus according to claim 20, wherein when a width of the pixel electrode is WPX and a width of the interlayer insulating film is WIS03 on a region in which the insulating film is selectively removed or reduced in thickness according to the pattern of the pixel electrode, WIS03<WPX and WIS03>0 are established.

22. The liquid crystal display apparatus according to claim 19, wherein an insulating film is selectively formed with a permittivity of 7.0 or more so as to fill and flatten a step height, which is formed by selectively removing or reducing in thickness at least a part of an insulating film formed at least on a part of a region on the pixel electrode on the interlayer insulating film formed on a superimposed part of the common signal electrode and the data signal wiring.

23. The liquid crystal display apparatus according to claim 1, wherein at least in a region other than an exposed region for connecting terminals, an other insulating film is formed so as to cover at least the pixel electrode and the common signal electrode.

24. The liquid crystal display apparatus according to claim 23, wherein a coating type insulating film used as the other insulating film has a thickness of 0.1 to 0.5 µm.

25. The liquid crystal display apparatus according to claim 1, wherein an insulating film is selectively formed with a permittivity of 7.0 or more so as to fill and flatten a step height region appearing due to the interlayer insulating film which is formed selectively on a superimposed part of the common signal electrode and the data signal wiring on at least a part of the region on the pixel electrode.

26. The liquid crystal display apparatus according to claim 1, wherein the common signal wiring is formed by extending the common signal electrode on the same layer as the common signal electrode.

27. The liquid crystal display apparatus according to claim 1, wherein the common signal wiring is formed on the same layer as the scanning signal wiring or the data signal wiring, and the common signal wiring and the common signal electrode are connected to each other via a through hole, which is opened on the interlayer insulating film.

28. The liquid crystal display apparatus according to claim 1, wherein the pixel electrode is composed of a transparent conductive film made of indium oxide such as indium tin oxide (ITO), indium zinc oxide (IZO), and indium germanium oxide (IGO).

29. The liquid crystal display apparatus according to claim 28, wherein the pixel electrode is composed of a transparent conductive film made of polycrystalline indium oxide.

30. The liquid crystal display apparatus according to claim 28, wherein a normally black mode is set in which black display is provided when no electric field is generated between the pixel electrode and the common signal electrode.

31. The liquid crystal display apparatus according to claim 1, wherein at least a part of the common signal electrode is composed of a transparent conductive film made of indium oxide such as indium tin oxide (ITO), indium zinc oxide (IZO), and indium germanium oxide (IGO).

32. The liquid crystal display apparatus according to claim 31, wherein the transparent conductive film made of indium oxide is made of amorphous, the transparent conductive film being included in at least a part of the common signal electrode.

33. The liquid crystal display apparatus according to claim 31, wherein a normally black mode is set in which black display is provided when no electric field is generated between the pixel electrode and the common signal electrode.

34. A liquid crystal display apparatus, comprising a pair of substrates and a liquid crystal layer sandwiched between the substrates with liquid crystal of negative $\Delta\epsilon$, the pair of substrates including a first substrate having a plurality of scanning signal wiring, a plurality of data signal wiring intersecting the scanning signal wiring in a matrix form, and a plurality of thin-film transistors formed on the intersections, the liquid crystal display apparatus being configured such that at least a single pixel is formed in each region surrounded by the plurality of scanning signal wiring and data signal wiring, each pixel includes a common signal electrode, which is connected to a plurality of pixels, and a pixel electrode connected to the corresponding thin-film transistor, and a voltage applied to the common signal electrode and the pixel electrode generates in the liquid crystal layer an electric field having a parallel component predominantly to the first substrate, wherein the common signal electrode and at least one of the data signal wiring and the scanning signal wiring are partially superimposed onto each other via an interlayer insulating film, the superimposed part forming a capacity, and when SA denotes Equation 1 and SB denotes Equation 2 (m≧1), SA<SB is satisfied, where n indicates the number of layers of the insulating films included in the interlayer insulating film, $\epsilon_K$ indicates a permittivity of an insulating film on k layer, $d_K$ indicates a film thickness of an insulating film of k layer, m indicates the number of layers of insulating films disposed on the pixel electrode at least in a part of a region on the pixel electrode, $\epsilon_L$ indicates a permittivity of an insulating film on L layer, $d_L$ indicates a film thickness, and $\epsilon_{LC}$ indicates a permittivity of liquid crystal in parallel with a director of liquid crystal.

$$\frac{1}{\sum_{k=1}^{n} \frac{d_k}{\epsilon_k}} \quad (1)$$

$$\frac{1}{\left(\sum_{L=1}^{m} \frac{d_L}{\epsilon_L}\right) + \frac{\sum_{k=1}^{n} d_k - \sum_{L=1}^{m} d_L}{\epsilon_{LC}}}. \quad (2)$$

35. A liquid crystal display apparatus, comprising a pair of substrates and a liquid crystal layer sandwiched between the substrates with liquid crystal of negative $\Delta\epsilon$, the pair of substrates including a first substrate having a plurality of scanning signal wiring, a plurality of data signal wiring intersecting the scanning signal wiring in a matrix form, and a plurality of thin-film transistors formed on the intersections, the liquid crystal display apparatus being configured such that at least a single pixel is formed in each region surrounded by the plurality of scanning signal wiring and data signal wiring, each pixel includes a common signal electrode, which is connected to a plurality of pixels, and a pixel electrode connected to the corresponding thin-film transistor, and a voltage applied to the common signal electrode and the pixel electrode generates in the liquid crystal layer an electric field having a parallel component predominantly to the first substrate, wherein the common signal electrode and at least one of the data signal wiring and the scanning signal wiring are partially superimposed onto each other via an interlayer insulating film, the superimposed part forming a capacity, no insulating film existing between the first alignment film and the pixel electrode which are disposed on the first substrate, and when SA denotes Equation 1 and SB denotes Equation 2, SA<SB is satisfied, where n indicates the number of layers of the insulating films included in the interlayer insulating film, k indicates a permittivity of an insulating film on k layer, $d_K$ indicates a film thickness of an insulating film on k layer, and $\epsilon_{LC}$ indicates a permittivity in a perpendicular direction to a director of liquid crystal $$\frac{1}{\sum_{k=1}^{n} \frac{d_k}{\epsilon_k}} \quad (1)$$

$$\frac{\epsilon_{LC}}{\sum_{k=1}^{n} d_k}. \quad (2)$$

36. The liquid crystal display apparatus according to claims 1, 34 or 35, wherein between the interlayer insulating film and a part of the pixel electrode, the interlayer insulating film being formed on a superimposed part of the common signal electrode and at least one of signal wiring of the data signal wiring and the scanning signal wiring, the insulating film being disposed between a first alignment film and the pixel electrode that are formed on the first substrate at least on a part of a region on the pixel electrode, a difference is made at least in one of the number of layers of the insulating films, a film thickness of a material for forming the layer, and a permittivity of a material for forming the layer.

37. A liquid crystal display apparatus, comprising a pair of substrates and a liquid crystal layer sandwiched between the substrates with liquid crystal of negative $\Delta\epsilon$, the pair of substrates including a first substrate having a plurality of scanning signal wiring, a plurality of data signal wiring intersecting the scanning signal wiring in a matrix form, and a plurality of thin-film transistors formed on the intersections, the liquid crystal display apparatus being configured such that at least a single pixel is formed in each region surrounded by the plurality of scanning signal wiring and data signal wiring, each pixel includes a common signal electrode, which is connected to a plurality of pixels via common signal wiring, and a pixel electrode connected to the corresponding thin-film transistor, and a voltage applied to the common signal electrode and the pixel electrode generates in the liquid crystal layer an electric field having a parallel component predominantly to the first substrate, wherein the common signal electrode and at least one of the data signal wiring and the scanning signal wiring are partially superimposed onto each other via an interlayer insulating film, the super-imposed part forming a capacity, and when SA denotes Equation 1 and SB denotes Equation 2 (m≧1), SA<SB is satisfied, where n indicates the number of layers of the insulating films included in the interlayer insulating film, $\epsilon_K$ indicates a permittivity of an insulating film on k layer, $d_K$ indicates a film thickness of an insulating film of k layer, m indicates the number of layers of insulating films disposed between the pixel electrode and a first alignment film disposed on the pixel electrode on at least a part of a region on the pixel electrode, $\epsilon_L$ indicates a permittivity of an insulating film on L layer, $d_L$ indicates a film thickness of L layer, and $\epsilon_{LC}$ indicates a permittivity of liquid crystal in a perpendicular direction to a director of liquid crystal $$\frac{1}{\sum_{k=1}^{n}\frac{d_k}{\varepsilon_k}} \quad (1)$$

$$\frac{1}{\left(\sum_{L=1}^{m}\frac{d_L}{\varepsilon_L}\right)+\frac{\sum_{k=1}^{n}d_k-\sum_{L=1}^{m}d_L}{\varepsilon_{LC}}}. \quad (2)$$

38. A liquid crystal display apparatus, comprising a pair of substrates and a liquid crystal layer sandwiched between the substrates with liquid crystal of positive Δε, the pair of substrates including a first substrate having a plurality of scanning signal wiring, a plurality of data signal wiring intersecting the scanning signal wiring in a matrix form, and a plurality of thin-film transistors formed on the intersections, the liquid crystal display apparatus being configured such that at least a single pixel is formed in each region surrounded by the plurality of scanning signal wiring and data signal wiring, each pixel includes a common signal electrode, which is connected to a plurality of pixels via common signal wiring, and a pixel electrode connected to the corresponding thin-film transistor, and a voltage applied to the common signal electrode and the pixel electrode generates in the liquid crystal layer an electric field having a parallel component predominantly to the first substrate, wherein the common signal electrode and at least one of the data signal wiring and the scanning signal wiring are partially superimposed onto each other via an interlayer insulating film, the superimposed part forming a capacity, no insulating film existing between a first alignment film and the pixel electrode which are disposed on the first substrate, and when SA denotes Equation 1 and SB denotes Equation 2, SA<SB is satisfied, where n indicates the number of layers of the insulating films included in the interlayer insulating film, $\epsilon_k$ indicates a permittivity of an insulating film on k layer, $d_K$ indicates a film thickness of an insulating film on k layer, and $\epsilon_{LC}$ indicates a permittivity in parallel with a director of liquid crystal $$\frac{1}{\sum_{k=1}^{n}\frac{d_k}{\varepsilon_k}} \quad (1)$$

$$\frac{\varepsilon_{LC}}{\sum_{k=1}^{n}d_k}. \quad (2)$$

39. The liquid crystal display apparatus according to claim 37 or 38, wherein between the interlayer insulating film and part of the pixel electrode, the interlayer insulating film being forming on a superimpose part of the common signal electrode and at least one of signal wiring of the date signal wiring and the scanning signal wiring, the insulating film being disposed between first alignment film and the pixel electrode that are formed on the first substrate at least on a part of a region on the pixel electrode, a difference is made at least in one of the number layer of the insulating films, a film thickness of a material for forming the layer, and a permittivity of a material for forming the layer.

* * * * *